United States Patent
Nakagawa et al.

(10) Patent No.: US 8,573,184 B2
(45) Date of Patent: Nov. 5, 2013

(54) CONTROL APPARATUS FOR CONTROLLING INTAKE AIR FLOW, FUEL INJECTION AMOUNT, AND IGNITION TIMING AT EACH CYLINDER OF A MULTI-CYLINDER ENGINE

(75) Inventors: Shinji Nakagawa, Mito (JP); Kazuhiko Kanetoshi, Hitachinaka (JP); Takanobu Ichihara, Tsuchiura (JP); Minoru Ohsuga, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 503 days.

(21) Appl. No.: 12/860,433

(22) Filed: Aug. 20, 2010

(65) Prior Publication Data
US 2011/0100327 A1    May 5, 2011

(30) Foreign Application Priority Data
Oct. 30, 2009   (JP) .................................. 2009-249641

(51) Int. Cl.
*F02M 69/04*   (2006.01)
(52) U.S. Cl.
USPC ....... 123/436; 123/406.25; 123/419; 123/673
(58) Field of Classification Search
USPC ............... 123/445, 436, 406.24, 406.25, 419, 123/673; 73/114.15, 114.32, 114.38
See application file for complete search history.

(56) References Cited

U.S. PATENT DOCUMENTS

| | | | | |
|---|---|---|---|---|
| 5,086,741 | A | * | 2/1992 | Nakamura et al. .......... 123/406.2 |
| 5,121,724 | A | * | 6/1992 | Anzai et al. ................... 123/336 |
| 5,285,523 | A | | 2/1994 | Takahashi |
| 5,385,129 | A | * | 1/1995 | Eyberg .......................... 123/436 |
| 5,605,132 | A | * | 2/1997 | Hori et al. ................ 123/406.24 |
| 5,630,397 | A | * | 5/1997 | Shimizu et al. ............... 123/436 |
| 5,687,692 | A | * | 11/1997 | Togai et al. ................... 123/436 |
| 5,862,505 | A | * | 1/1999 | Fujiki ............................ 701/111 |
| 6,024,070 | A | * | 2/2000 | May et al. ................ 123/406.25 |

(Continued)

FOREIGN PATENT DOCUMENTS

| | | | |
|---|---|---|---|
| JP | 60-43174 | A | 3/1985 |
| JP | 04022728 | A * | 1/1992 |

(Continued)

OTHER PUBLICATIONS

Japanese Office Action dated Feb. 28, 2012 (three (3) pages).

*Primary Examiner* — Stephen K Cronin
*Assistant Examiner* — John Zaleskas
(74) *Attorney, Agent, or Firm* — Crowell & Moring LLP

(57) ABSTRACT

An engine control apparatus having a unit for calculating the mean value of the angular acceleration with respect to each cylinder; a unit for calculating the variance of the angular acceleration with respect to each cylinder; a unit for estimating the torque and the air/fuel ratio with respect to each cylinder on the basis of the mean value and the variance; and a unit for controlling at least one of the intake air amount, the fuel injection amount and the ignition timing with respect to each cylinder on the basis of the estimated torque and air/fuel ratio.

16 Claims, 42 Drawing Sheets

(56) References Cited

U.S. PATENT DOCUMENTS

| | | | |
|---|---|---|---|
| 6,070,567 A * | 6/2000 | Kakizaki et al. | 123/406.25 |
| 6,848,301 B2 * | 2/2005 | Kondo | 73/114.33 |
| 7,295,912 B2 * | 11/2007 | Yasui et al. | 701/103 |
| 7,363,889 B2 * | 4/2008 | Tsunooka et al. | 123/90.15 |
| 7,455,048 B2 * | 11/2008 | Maier-Landgrebe | 123/436 |
| 7,599,783 B2 * | 10/2009 | Nakane | 701/104 |
| 2003/0131823 A1 * | 7/2003 | Asakawa | 123/436 |
| 2005/0092299 A1 * | 5/2005 | Tonetti et al. | 123/436 |
| 2006/0293828 A1 * | 12/2006 | Ishizuka et al. | 701/105 |
| 2007/0244625 A1 * | 10/2007 | Hakariya et al. | 701/105 |
| 2008/0060427 A1 * | 3/2008 | Hoshi et al. | 73/117.3 |
| 2009/0100920 A1 * | 4/2009 | Sakayanagi | 73/114.15 |
| 2009/0210131 A1 * | 8/2009 | Tabata et al. | 701/103 |
| 2009/0211554 A1 * | 8/2009 | Tabata et al. | 123/435 |
| 2009/0292440 A1 * | 11/2009 | Ichihara et al. | 701/102 |

FOREIGN PATENT DOCUMENTS

| | | | | |
|---|---|---|---|---|
| JP | 4-131561 A | | | 5/1992 |
| JP | 5-71319 A | | | 3/1993 |
| JP | 06010733 A | * | | 1/1994 |
| JP | 09032710 A | * | | 2/1997 |
| JP | 9-303243 A | | | 11/1997 |
| JP | 10-115248 A | | | 5/1998 |
| JP | 2000-205025 A | | | 7/2000 |
| JP | 2000205025 A | * | | 7/2000 |
| JP | 2004-052620 | | | 2/2004 |
| JP | 2004316613 A | * | | 11/2004 |
| JP | 2004332600 A | * | | 11/2004 |
| JP | 2005-16392 A | | | 1/2005 |
| JP | 2006125264 A | * | | 5/2006 |
| JP | 2006257989 A | * | | 9/2006 |

* cited by examiner

FIG.18

THE SPECIFIC CYLINDER WITH RESPECT TO WHICH A MEAN VALUE OF THE ANGULAR ACCELERATION IS MINIMUM, IS PREFERENTIALLY LOCATED; AND WHEN A MEAN VALUE OF THE ANGULAR ACCELERATION OF THE SPECIFIC CYLINDER IS NOT GREATER THAN THE PREDETERMINED VALUE A1 AND WHEN THE DISPERSION OF THE ANGULAR ACCELERATION OF THE SPECIFIC CYLINDER IS NOT SMALLER THAN THE PREDETERMINED VALUE B1, THE FUEL INJECTION AMOUNT OF THE SPECIFIC CYLINDER IS PREFERENTIALLY CORRECTED AND INCREASED UNTIL THE MEAN BECOMES GREATER THAN A1 AND UNTIL THE DISPERSION BECOMES SMALLER THAN B1

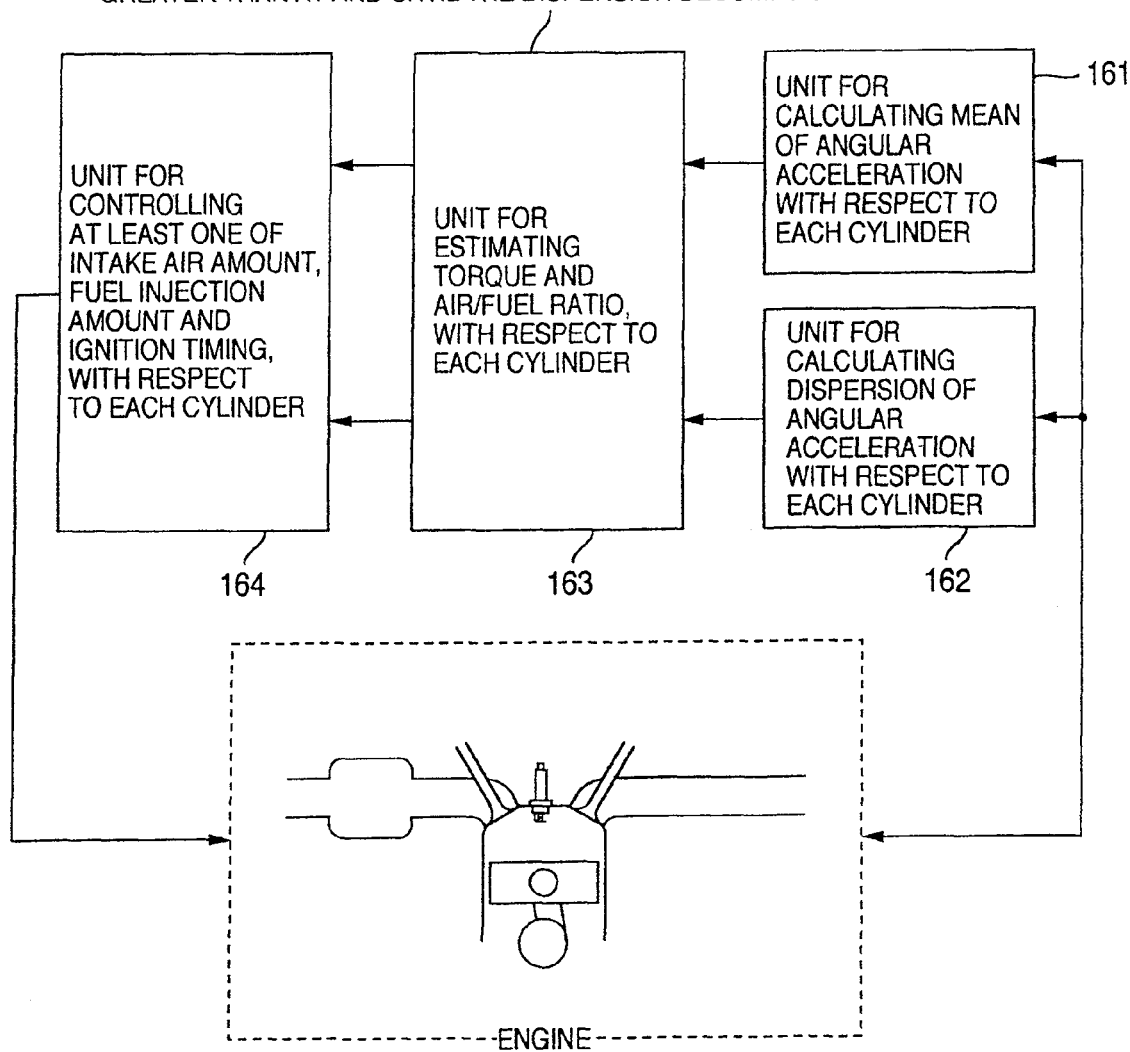

FIG.22 EMBODIMENTS 1~3

EMBODIMENTS 1~3

EMBODIMENTS 1 ~ 3

REFERENCE FUEL INJECTION AMOUNT CALCULATION SECTION

EMBODIMENT 1

CONTROL PERMISSION FLAG CALCULATION SECTION

FIG.27
EMBODIMENT 1
PER-CYLINDER ANGULAR ACCELERATION CHARACTERISTIC CALCULATION SECTION
WHEN CONTROL PERMISSION FLAG (fp_seigyo)
INDICATES 1, FOLLOWING PROCESS IS CARRIED OUT
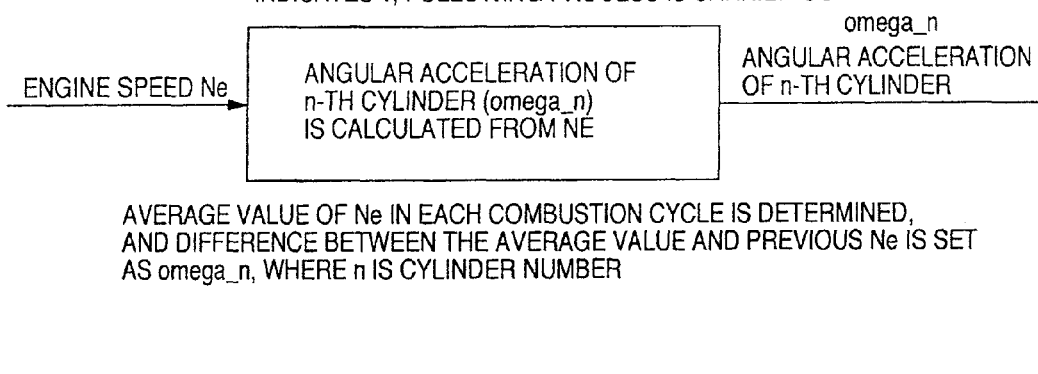
AVERAGE VALUE OF Ne IN EACH COMBUSTION CYCLE IS DETERMINED,
AND DIFFERENCE BETWEEN THE AVERAGE VALUE AND PREVIOUS Ne IS SET
AS omega_n, WHERE n IS CYLINDER NUMBER
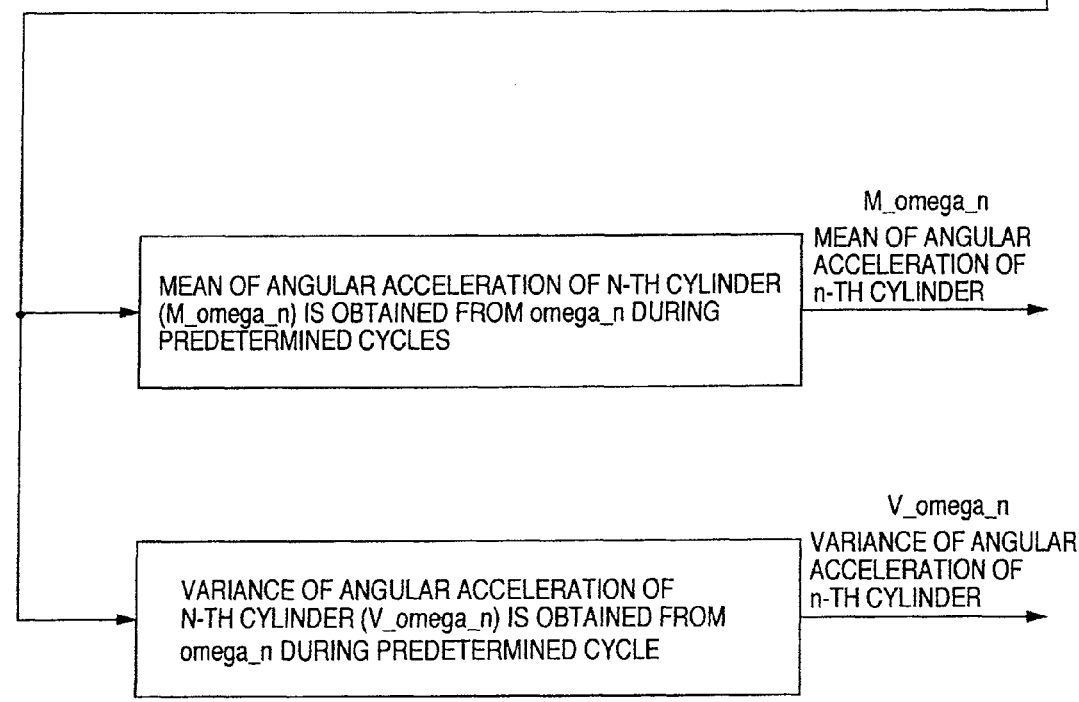

FIG.31
EMBODIMENT 1
PER-CYLINDER FUEL INJECTION AMOUNT CORRECTION VALUE CALCULATION SECTION
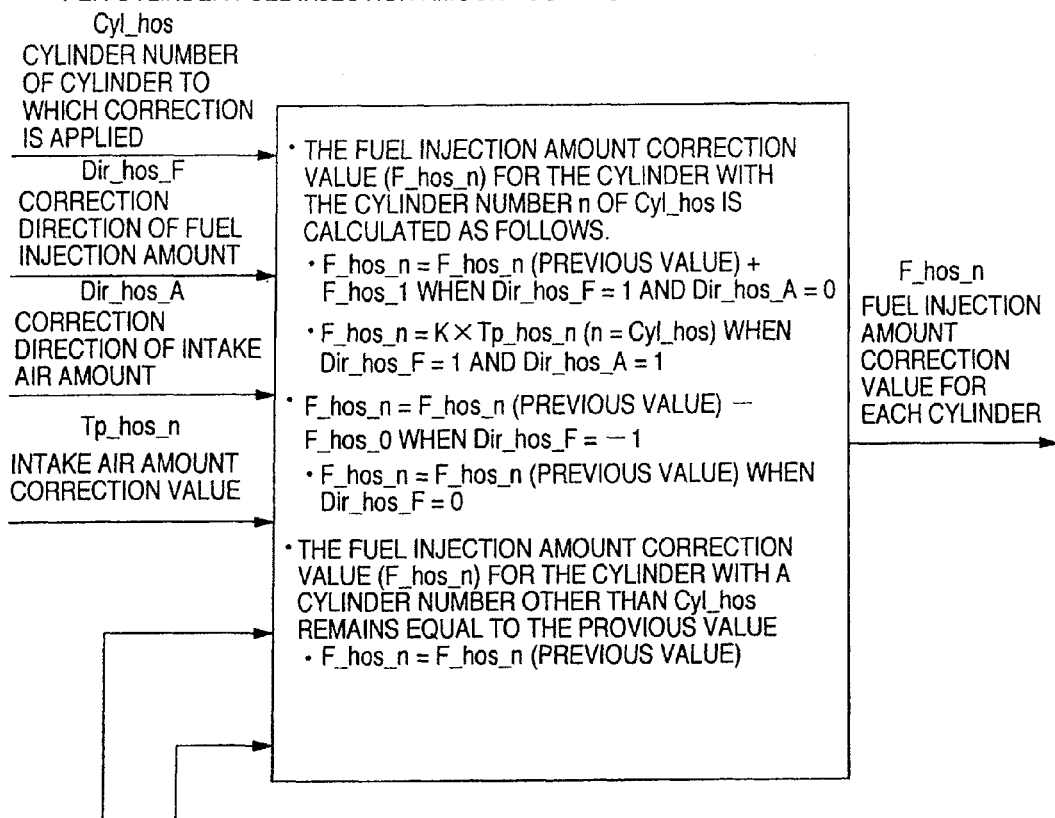
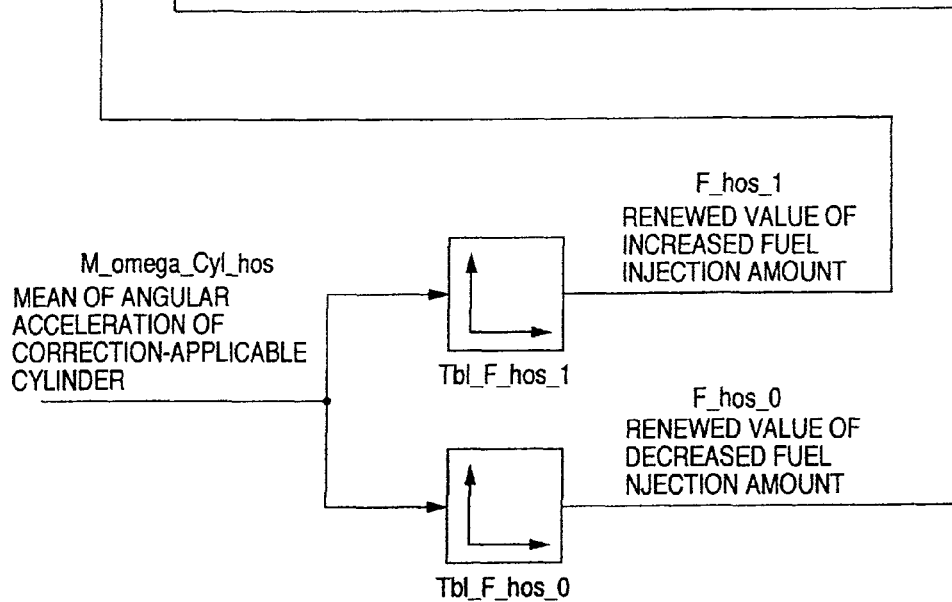

EMBODIMENTS 2, 3

CONTROL PERMISSION FLAG CALCULATION SECTION

EMBODIMENTS 2, 3

PER-CYLINDER ANGULAR ACCELERATION CHARACTERISTIC CALCULATION SECTION

WHEN CONTROL PERMISSION FLAG (fp_seigyo) INDICATES 1, FOLLOWING PROCESS IS CARRIED OUT AVERAGE VALUE OF Ne IN EACH COMBUSTION CYCLE IS DETERMINED, AND DIFFERENCE BETWEEN THE AVERAGE VALUE AND PREVIOUS Ne IS SET AS omega_n, WHERE n IS CYLINDER NUMBER

EMBODIMENT 3

PER-CYLINDER FUEL INJECTION AMOUNT CORRECTION VALUE CALCULATION SECTION

FIG.42

EMBODIMENT 3
PER-CYLINDER INTAKE AIR AMOUNT CORRECTION VALUE CALCULATION SECTION

Cyl_hos
CYLINDER NUMBER OF CYLINDER TO WHICH CORRECTION IS APPLIED

Dir_hos_A
CORRECTION DIRECTION OF INTAKE AIR AMOUNT

- THE INTAKE AIR AMOUNT CORRECTION VALUE (Tp_hos_n) FOR THE CYLINDER WITH THE CYLINDER NUMBER OF Cyl_hos IS CALCULATED AS FOLLOWS
  - Tp_hos_a_n = Tp_hos_n (PREVIOUS VALUE) − Tp_hos_0 WHEN Dir_hos_A = −1
  - Tp_hos_a_n = Tp_hos_n (PREVIOUS VALUE) WHEN Dir_hos_A = 0
- (Tp_hos_A_n) FOR THE CYLINDER WITH A CYLINDER NUMBER OTHER THAN Cyl_hos REMAINS EQUAL TO THE PROVIOUS VALUE
  - Tp_hos_a_n = Tp_hos_n (PREVIOUS VALUE)
- LET M_Tp_hos DENOTE THE MEAN OF F_hos_n (PREVIOUS VALUES) FOR ALL THE CYLINDERS, AND LET Tp_hos_n DENOTE THE VALUE EQUAL TO Tp_hos_a_n MINUS M_Tp_hos Tp_hos_n
INTAKE AIR AMOUNT CORRECTION VALUE M_omega_Cyl_hos
MEAN OF ANGULAR ACCELERATION OF CORRECTION-APPLICABLE CYLINDER Tbl_F_hos_1

Tp_hos_1
RENEWED VALUE OF INCREASED INTAKE AIR AMOUNT

V_omega_Cyl_hos
VARIANCE OF ANGULAR ACCELERATION OF CORRECTION-APPLICABLE CYLINDER Tbl_F_hos_0

Tp_hos_0
RENEWED VALUE OF DECREASED INTAKE AIR AMOUNT

Tp_hos_n
INTAKE AIR AMOUNT CORRECTION VALUE

Tbl_M_omega_IVO

IVO_Hos_n
INTAKE VALVE OPENING TIMING CORRECTION VALUE FOR EACH CYLINDER

Tbl_M_omega_IVC

IVC_Hos_n
INTAKE VALVE CLOSING TIMING CORRECTION VALUE FOR EACH CYLINDER

EMBODIMENTS 3

PER-CYLINDER IGNITION TIMING CORRECTION VALUE CALCULATION SECTION

CONTROL APPARATUS FOR CONTROLLING INTAKE AIR FLOW, FUEL INJECTION AMOUNT, AND IGNITION TIMING AT EACH CYLINDER OF A MULTI-CYLINDER ENGINE

BACKGROUND OF THE INVENTION

This invention relates to an apparatus for controlling an internal combustion engine, and more particularly to a control apparatus capable of detecting and correcting both the dispersion of the torques and the dispersion of the air/fuel ratios, with respect to the respective cylinders.

With the growing concern about the global environmental problem, the requirement has been more and more increasing for reduction of the exhaust gas emission, namely the emission of $CO_2$ or the fuel consumption, from an automobile. In order to improve the performance of operation, there have recently come to be disseminated the engines that employ variable control valves for the purpose of controlling not only the amount of fuel but also the amount of intake air, fed into the respective cylinders of the engine. For the same purpose, the pressure of injected fuel tends to be increased with the result that there is an increasing tendency that the amounts of fuel injection into the respective cylinders become uneven. With this type of engine, it is necessary to long secure, in the surroundings where the engine is used, the capability to control both the fuel injection amount and the intake air amount, that is, both the torques and the air/fuel ratios, for the respective cylinders of the engine.

JP-A-2004-52620 discloses an invention according to which the dispersion of the intake air amounts for the respective cylinders is detected/corrected by the air-flow sensor and then the dispersion of the air/fuel (A/F) ratios (i.e. fuel injection amounts) for the respective cylinders is detected/corrected by the air/fuel ratio sensor.

SUMMARY OF THE INVENTION

In general, the intake air flow sensor is disposed apart from the combustion chamber, and therefore such components as an air intake pipe and a throttle that actually dilute the information on the intake air amount for each cylinder, are located between them. Thus, a certain precision deterioration occurs in detecting the intake air amount for each cylinder by the intake air flow sensor. Since the air/fuel ratio sensor is also disposed usually in the exhaust manifold, the air/fuel ratio sensor is located apart from the combustion chamber. Hence, the information on the air/fuel ratio contained in the signal detected by the air/fuel ratio sensor is diluted especially in the operating range of engine where the rotational speed and the fuel flow rate are both low.

According to this invention, which has been made to solve the above-mentioned problem, there is provided a unit (i.e. control apparatus) for detecting/correcting the dispersion of the air/fuel ratios and the dispersion of the torques, with respect to the respective cylinders with high precision for a short period of time.

FIG. 1 schematically shows an engine control apparatus comprising a unit 161 for calculating a mean value of the angular acceleration with respect to each cylinder; a unit 162 for calculating the dispersion of the angular acceleration with respect to each cylinder; a unit 163 for estimating the torque and the air/fuel ratio, with respect to each cylinder on the basis of the calculated mean and the calculated dispersion; and a unit 164 for controlling at least one of the intake air amount, the fuel injection amount and the ignition timing, with respect to each cylinder on the basis of the estimated torque and the estimated air/fuel ratio.

If the fuel injection amount for one of the cylinders becomes smaller than the target fuel injection amount, the torque generated as a result of the fuel combustion in that cylinder decreases. In this case, since the air/fuel ratio for the interested cylinder becomes lean, the generated torque becomes unstable (with increased dispersion). If the intake air amount for one of the cylinders becomes larger than the target intake air amount, the torque generated as a result of the fuel combustion in that cylinder remains almost the same (as the fuel injection amount is invariable), but the air/fuel ratio for the cylinder becomes lean. Accordingly, the generated torque becomes unstable (with increased dispersion).

On the other hand, if the fuel injection amount for one of the cylinders becomes larger than the target fuel injection amount, the torque generated as a result of fuel combustion in that cylinder increases but the air/fuel ratio becomes rich, so that the torque does not become unstable (with non-increasing dispersion). If the intake air amount for one of the cylinders becomes smaller than the target intake air amount, the air/fuel ratio for that cylinder becomes rich. As a result, the torque generated as a result of fuel combustion in the cylinder increases a little, remains invariable, or becomes almost non-unstable (with non-increasing dispersion).

Further, if both the fuel injection amount and the intake air amount, for one of the cylinders become smaller than their target values, the torque generated as a result of fuel combustion in that cylinder decreases. Since the air/fuel ratio for that cylinder remains almost invariable, the torque does not become unstable (with non-increasing dispersion). On the other hand, if both of the fuel injection amount and the intake air amount, for one of the cylinders become greater than their target values, the torque generated as a result of fuel combustion in that cylinder increases. Since the air/fuel ratio remains almost invariable, the torque does not become unstable (with non-increasing dispersion).

There is a correlation between torque and angular acceleration. Accordingly, it becomes possible to detect the torque and the air/fuel ratio, for each cylinder on the basis of the magnitude (or mean) and the instability (or dispersion), of the angular acceleration with respect to the individual cylinder. Further, it becomes possible to decide on whether the torque dispersion from the target value is ascribed to the error in the fuel injection amount or the intake air amount. If the torque dispersion is due to the error in the fuel injection amount, the fuel injection amount with respect to the related cylinder is corrected through control. If the torque dispersion is due to the error in the intake air amount, the intake air amount with respect to the related cylinder is corrected through control. Moreover, since the torque can be controlled by adjusting the ignition timing, the torque correction control through the control of the ignition timing is performed as needed if, for example, the intake air amounts for the respective cylinders cannot be controlled individually. The details of such controls will be given later. Incidentally, it is preferable that the angular accelerations with respect to the respective cylinders should be obtained, in synchronism with the fuel combustion cycles of the respective cylinders, from the signals derived from such sensors capable of obtaining the information on the engine shaft angular position as the crankshaft angular position sensor and the camshaft angular position sensor.

FIG. 2 schematically shows a unit for controlling at least one of the intake air amount, the fuel injection amount and the ignition timing, with respect to each cylinder on the basis of the estimated torque and the estimated air/fuel ratio with respect to each cylinder, in such a manner that the differences among the estimated torques and the estimated air/fuel ratios with respect to the respective cylinders become small.

That is to say, the control of the intake air amount, the fuel injection amount and the ignition timing with respect to each cylinder are so performed, as one of the functions described with FIG. 1, as to make the differences among the torques and the differences among the air/fuel ratios, with respect to the respective cylinders as small as possible.

FIG. 3 schematically shows an engine control apparatus wherein the unit 163 for estimating the torque and the air/fuel ratio of each cylinder specifies that cylinder of which the mean of angular acceleration is minimum, and judges that the torque of the specified cylinder is smaller than the torques of any other cylinders and that the air/fuel ratio of the specified cylinder is comparable with the air/fuel ratios of all the other cylinders, when a mean value of the angular acceleration of the specified cylinder is not greater than the predetermined value A1 and the dispersion of the angular acceleration of the specified cylinder is smaller than the predetermined value B1.

In other words, as described with FIG. 1, the torque with respect to the cylinder having the smallest mean of angular acceleration is considered smaller than the torque of any other cylinder. And when the dispersion of the angular acceleration with respect to one of the cylinders is small, the air/fuel ratio with respect to that cylinder is considered comparable with the air/fuel ratios with respect to all other cylinders. In this case, it is judged that both the fuel injection amount and the intake air amount, with respect to the cylinder decreased.

FIG. 4 schematically shows an engine control apparatus wherein the unit 163 for estimating the torque and the air/fuel ratio of each cylinder specifies the cylinder of which the mean of angular acceleration is minimum, and judges that the torque of the specified cylinder is smaller than the torques of any other cylinders and that the air/fuel ratio of the specified cylinder is lean as compared with the air/fuel ratios of all the other cylinders, when a mean value of the angular acceleration of the specified cylinder is not greater than the predetermined value A1 and the dispersion of the angular acceleration of the specified cylinder is not smaller than the predetermined value B1.

That is to say, as described with FIG. 1, the torque of the cylinder having the smallest mean of angular acceleration is considered smaller than the torque of any other cylinder. And when the dispersion of the angular acceleration of one of the cylinders is large, the air/fuel ratio of that cylinder is considered lean as compared with the air/fuel ratios of all the other cylinders. In this case, it is judged that the fuel injection amount of the cylinder decreases, and the intake air amount of the cylinder is invariant or increases.

FIG. 5 schematically shows an engine control apparatus wherein the unit 163 for estimating the torque and the air/fuel ratio of each cylinder specifies the cylinder of which the mean of angular acceleration is maximum, and judges that the torque of the specified cylinder is greater than the torques of any other cylinders and that the air/fuel ratio of the specified cylinder is comparable with or rich as compared with, the air/fuel ratios of all the other cylinders, when a mean value of the angular acceleration of the specified cylinder is not smaller than the predetermined value A2 and the dispersion of the angular acceleration of the specified cylinder is smaller than the predetermined value B1.

That is to say, as described with FIG. 1, the torque of the cylinder having the greatest mean of angular acceleration is considered greater than the torque of any other cylinder. And when the dispersion of the angular acceleration of one of the cylinders is small, the air/fuel ratio of that cylinder is considered comparable with or rich as compared with, the air/fuel ratios of all the other cylinders. In this case, it is judged that the fuel injection amount of the cylinder increases (with the intake air amount invariable), or the intake air amount of the cylinder decreases (with the fuel injection amount invariable).

FIG. 6 schematically shows an engine control apparatus wherein the unit 163 for estimating the torque and the air/fuel ratio of each cylinder specifies the cylinder of which the dispersion of angular acceleration is maximum, and judges that the torque of the specified cylinder is comparable with the torques of any other cylinders and that the air/fuel ratio of the specified cylinder is lean as compared with the air/fuel ratios of all the other cylinders, when a mean value of the angular acceleration of the specified cylinder is greater than the predetermined value A1 and smaller than the predetermined value A2 and the dispersion of the angular acceleration of the specified cylinder is not smaller than the predetermined value B1.

As described with FIG. 1, if a mean value of the angular acceleration of one of the cylinders is not largely different from the angular acceleration of any other cylinder, the torque of that cylinder is considered nearly equal to the torque of any other cylinder. If the dispersion of the angular acceleration of one of the cylinders is large, the air/fuel ratio of that cylinder is considered lean as compared with the air/fuel ratios of all the other cylinders. In this case, it is judged that the fuel injection amount of the cylinder remains invariable and the intake air amount of the cylinder increases.

FIG. 7 schematically shows an engine control apparatus wherein the predetermined value A1 is smaller than a mean value of the angular accelerations of all the cylinders during a predetermined period of time.

As described with FIG. 3, the predetermined value A1 is chosen as the threshold for angular acceleration that is used to locate a cylinder whose torque is smaller than the torques of all the other cylinders. Therefore, the predetermined value A1 is set smaller than a mean value of the angular accelerations of all the cylinders.

FIG. 8 schematically shows an engine control apparatus wherein the predetermined value A2 is greater than a mean value of the angular accelerations of all the cylinders during the predetermined period of time.

As described with FIG. 5, the predetermined value A2 is chosen as the threshold for angular acceleration that is used to locate a cylinder whose torque is greater than the torques of any other cylinders. Therefore, the predetermined value A2 is set greater than a mean value of the angular accelerations of all the cylinders.

FIG. 9 schematically shows an engine control apparatus wherein the predetermined value A1 is negative and the predetermined value A2 is positive when the engine is idling.

In other words, while the engine is idling, a mean value of the angular accelerations of all the cylinders nearly vanishes. Accordingly, the value A1 chosen as the threshold for angular acceleration that is used to locate a cylinder whose torque is smaller than the torques of any other cylinders, is set negative whereas the value A2 chosen as the threshold for angular acceleration that is used to locate a cylinder whose torque is greater than the torques of any other cylinders, is set positive.

FIG. 10 schematically shows an engine control apparatus wherein the dispersion of the angular acceleration of each cylinder is represented by the standard deviation or the variance, of the acceleration of that particular cylinder.

In other words, the standard deviation or the variance is introduced as the general index of indicating the dispersion.

FIG. 11 schematically shows an engine control apparatus wherein the dispersion of the angular acceleration of each of the cylinders is calculated by applying the weighted moving average method to the square of the absolute value of the angular acceleration of that cylinder, or by applying the weighted moving average method to the absolute value of the angular acceleration of that cylinder.

As described with FIG. 10, although the variance or the standard deviation is known as the index of indicating the dispersion, they are not suitable for on-board successive calculation. Therefore, the variance is approximately calculated by using the value, which is suitable for on-board successive calculation, obtained through the application of the weighted moving average method to the square of the absolute value of the angular acceleration of each cylinder, or the standard deviation is approximately calculated by using the value, which is suitable for on-board successive calculation, obtained through the application of the weighted moving average method to the absolute value of the angular acceleration of each cylinder.

FIG. 12 schematically shows an engine control apparatus wherein the intake air amount of the specific cylinder the torque of which is judged smaller than those of any other cylinders and the air/fuel ratio of which is judged comparable with those of all the other cylinders, is corrected and increased until a mean value of the angular acceleration of the specific cylinder becomes greater than the predetermined value A1; and the fuel injection amount of the specific cylinder is also corrected and increased so as to keep the air/fuel ratio of the specific cylinder in accordance with the increased intake air amount.

As described with FIG. 3, with respect to the specific cylinder the torque of which is judged smaller than those of any other cylinders and the air/fuel ratio of which is judged comparable with those of all the other cylinders, it is considered that both the fuel injection amount and the intake air amount of the specific cylinder decreased. Accordingly, until a mean value of the angular acceleration of the specific cylinder becomes greater than the predetermined value A1 (that is, until the decrease in the torque of the specific cylinder ceases), the intake air amount of the specific cylinder is corrected and increased; and the fuel injection amount of the specific cylinder is also corrected and increased so as to keep the air/fuel ratio of the specific cylinder in accordance with the increased intake air amount, in order not to render the air/fuel ratio of the specific cylinder lean.

FIG. 13 schematically shows an engine control apparatus wherein the fuel injection amount of the specific cylinder the torque of which is judged smaller than those of any other cylinders and the air/fuel ratio of which is judged lean as compared with those of all the other cylinders, is corrected and increased until a mean value of the angular acceleration of the specific cylinder becomes greater than the predetermined value A1 and until the dispersion of the angular acceleration of the specific cylinder becomes smaller than the predetermined value B1.

As described with FIG. 4, with respect to the specific cylinder the torque of which is judged smaller than those of any other cylinders and the air/fuel ratio of which is judged leaner than those of any other cylinders, it is considered that the fuel injection amount of the specific cylinder decreased and the intake air amount of the specific cylinder remains invariable or increased. Accordingly, the intake air amount of the specific cylinder is corrected and increased until a mean value of the angular acceleration of the specific cylinder becomes greater than the predetermined value A1 (that is, until the decrease in the torque of the specific cylinder ceases) and until the dispersion of the angular acceleration of the specific cylinder becomes smaller than the predetermined value B1 (that is, until the air/fuel ratio of the specific cylinder ceases becoming lean).

FIG. 14 schematically shows an engine control apparatus wherein the fuel injection amount of the specific cylinder the torque of which is judged greater than those of any other cylinders and the air/fuel ratio of which is judged comparable with or rich as compared with, those of all the other cylinders, is corrected and decreased until a mean value of the angular acceleration of the specific cylinder becomes smaller than the predetermined value A2.

As described with FIG. 5, with respect to the specific cylinder the torque of which is judged greater than those of any other cylinders and the air/fuel ratio of which is judged comparable with or rich as compared with, those of all the other cylinders, it is considered that the fuel injection amount of the specific cylinder increased (with the intake air amount invariable) or the intake air amount of the specific cylinder decreased (with the fuel injection amount invariable). Accordingly, the fuel injection amount of the specific cylinder is corrected and decreased until a mean value of the angular acceleration of the specific cylinder becomes smaller than the predetermined value A2 (that is, until the increase in the torque of the specific cylinder ceases).

FIG. 15 schematically shows an engine control apparatus wherein the intake air amount of the specific cylinder the torque of which is judged comparable with those of all the other cylinders and the air/fuel ratio of which is judged leaner than those of any other cylinders, is corrected and decreased until the dispersion of the angular acceleration of the specific cylinder becomes smaller than the predetermined value B1.

As described with FIG. 6, with respect to the specific cylinder the torque of which is judged comparable with those of all the other cylinders and the air/fuel ratio of which is judged leaner than those of any other cylinders, it is considered that the fuel injection amount of the specific cylinder is invariable and the intake air amount of the specific cylinder increased. Accordingly, the intake air amount of the specific cylinder is corrected and decreased until the dispersion of the angular acceleration of the specific cylinder becomes smaller than the predetermined value B1 (that is, until the air/fuel ratio of the specific cylinder ceases becoming lean).

FIG. 16 schematically shows an engine control apparatus wherein the ignition timing of the specific cylinder the torque of which is judged smaller than those of any other cylinders and the air/fuel ratio of which is judged comparable with those of all the other cylinders, is corrected and advanced in angle until a mean value of the angular acceleration of the specific cylinder becomes greater than the predetermined value A1.

As described with FIG. 3, with respect to the specific cylinder the torque of which is judged smaller than those of any other cylinders and the air/fuel ratio of which is judged comparable with those of all the other cylinders, it is considered that both the fuel injection amount and the intake air amount, of the specific cylinder decreased. In the case where the intake air amounts for the respective cylinders cannot be controlled, if only the fuel injection amount for the specific cylinders is increased, the decrease in the torque of the specific cylinder is indeed prevented, but the air/fuel ratio of the specific cylinder becomes rich. If this happens, the decrease in the torque can be prevented by correcting and advancing in angle the ignition timing of the specific cylinder.

FIG. 17 schematically shows an engine control apparatus wherein the ignition timing of the specific cylinder the torque of which is judged greater than those of any other cylinders and the air/fuel ratio of which is judged comparable with or rich as compared with, those of all the other cylinders, is corrected and retarded in angle until a mean value of the angular acceleration of the specific cylinder becomes smaller than the predetermined value A2.

As described with FIG. 5, with respect to the specific cylinder the torque of which is judged greater than those of any other cylinders and the air/fuel ratio of which is judged comparable with or rich as compared with, those of all the other cylinders, it is considered that the fuel injection amount of the specific cylinder increased (with the intake air amount invariable) or the intake air amount of the specific cylinder decreased (with the fuel injection amount invariable). The torque can also be decreased by correcting and retarding in angle the ignition timing of the specific cylinder.

FIG. 18 schematically shows an engine control apparatus wherein the specific cylinder with respect to which a mean value of the angular acceleration is minimum, is preferentially located; and when a mean value of the angular acceleration of the specific cylinder is not greater than the predetermined value A1 and when the dispersion of the angular acceleration of the specific cylinder is not smaller than the predetermined value B1, the fuel injection amount of the specific cylinder is preferentially corrected and increased until the mean becomes greater than A1 and until the dispersion becomes smaller than B1.

As described with FIG. 1, the torque of the cylinder of which a mean value of the angular acceleration is minimum, is judged smaller than those of any other cylinders. Also, if the dispersion of the angular acceleration of the specific cylinder is great, the air/fuel ratio of the specific cylinder is judged lean as compared with those of all the other cylinders. The cylinder the torque of which is smaller than those of any other cylinders and the air/fuel ratio of which is judged lean as compared with those of all the other cylinders, is the most unstable cylinder. Accordingly, the most unstable cylinder is preferentially located and the fuel injection amount of the most unstable cylinder is preferentially corrected and increased.

FIG. 19 schematically shows an engine control apparatus wherein the mean value of the fuel injection amount correction values for all the cylinders is calculated, and the final fuel injection amount correction value for one of the cylinders is obtained by subtracting the mean from the fuel injection amount correction value for that cylinder.

That is to say, according to the fuel injection amount correction procedures described with the engine control apparatuses shown in FIGS. 12~14, and 18, the fuel injection amount for one of the cylinders is corrected, and increased or decreased at a time, and this process is successively repeated for all the cylinders. In such a successive correction procedure, there is a possibility that the DC component of the fuel injection amount correction value (i.e. mean of the fuel injection amount correction values for all the cylinders) is drifted. In order to correct the drift component, the mean of the fuel injection amounts for all the cylinders is calculated, and the final fuel injection amount correction value for one of the cylinders is obtained by subtracting the mean from the fuel injection amount correction value for that cylinder.

FIG. 20 schematically shows an engine control apparatus wherein the mean value of the intake air amount correction values for all the cylinders is calculated, and the final intake air amount correction value for one of the cylinders is obtained by subtracting the mean from the intake air amount correction value for that cylinder.

That is to say, according to the intake air amount correction procedures described with FIGS. 12 and 15, the intake air amount for one of the cylinders is corrected, and increased or decreased, and this process is successively repeated for all the cylinder. As described with FIG. 20, in order to correct the drift component, the mean of the intake air amount correction values for all the cylinders is calculated, and the final intake air amount correction value for one of the cylinders is obtained by subtracting the mean from the intake air amount correction value for that cylinder.

FIG. 21 schematically shows an engine control apparatus wherein the mean value of the ignition timing correction values for all the cylinders is calculated, and the final ignition timing correction value for one of the cylinders is obtained by subtracting the mean from the ignition timing correction value for that cylinder.

That is to say, according to the ignition timing correction procedures described with FIGS. 16 and 17, the ignition timing for one of the cylinders is corrected, and advanced or retarded in angle, and this process is successively repeated for all the cylinders. As described with FIG. 20, in order to correct the drift component, the mean of the ignition timing correction values for all the cylinders is calculated, and the final ignition timing correction value for one of the cylinders is obtained by subtracting the mean from the ignition timing correction value for that cylinder.

According to the present procedure of control, a single stage of correction does not necessarily complete the correction of errors in the fuel injection amount and the intake air amount. For example, if both the fuel injection amount and the intake air amount are deviated from the target value in such a manner that they tend to increase, the fuel injection amount is first corrected and decreased in accordance with the procedure described with FIG. 14 until the increase in torque is canceled. Since the intake air amount is not corrected and decreased in this case, the air/fuel ratio becomes lean. Then, the intake air amount is corrected and decreased in accordance with the procedure described with FIG. 15 so that the fuel injection amount and the intake air amount are properly corrected through this two stage correction procedure. The same effect can be obtained in some other cases. However, since this type of control is rather often employed, the cylinder for which either the fuel injection amount or the intake air amount is erroneous can be located quickly (i.e. located before both of them become erroneous). There are four cases where error occurs in the fuel injection amount or the intake air amount: (1) superfluous fuel amount, (2) meager fuel amount, (3) superfluous intake air amount, and (4) meager intake air amount. Of those four cases, the three cases ((1) superfluous fuel amount, (2) meager fuel amount, (3) superfluous intake air amount) can be corrected for each cylinder through a single stage correction procedure. Even in the case of (3) superfluous intake air amount or in the case where errors occur in both the fuel injection amount and the intake air amount, the errors can be corrected through a two-stage location/correction procedure.

As described above, the dispersions of the air/fuel ratios and the torques, with respect to the respective cylinders can be detected and corrected with high precision and for a short period of time.

According to this invention, since the intake air amount, the fuel injection amount and the ignition timing of each cylinder are properly corrected in such a manner that the differences among the torques and the air/fuel ratios of the respective cylinders become small, the performance of the engine whose structure is ever becoming complicated can be long secured in practical environments, and therefore exhaust gas, $CO_2$ and fuel cost can be prevented from increasing.

Other objects, features and advantages of the invention will become apparent from the following description of the embodiments of the invention taken in conjunction with the accompanying drawings.

BRIEF DESCRIPTION OF THE DRAWINGS

FIG. 18 shows in block diagram another engine control apparatus according to this invention;
FIG. 27 shows in block diagram the per-cylinder angular acceleration characteristic calculation section used in the first embodiment of this invention;
FIG. 31 shows in block diagram the per-cylinder fuel injection amount correction value calculation section used in the first embodiment of this invention;
FIG. 42 shows in block diagram the per-cylinder intake air amount correction value calculation section used in the third embodiment of this invention.

DETAILED DESCRIPTION OF THE EMBODIMENTS

Embodiment 1

Figure 22:
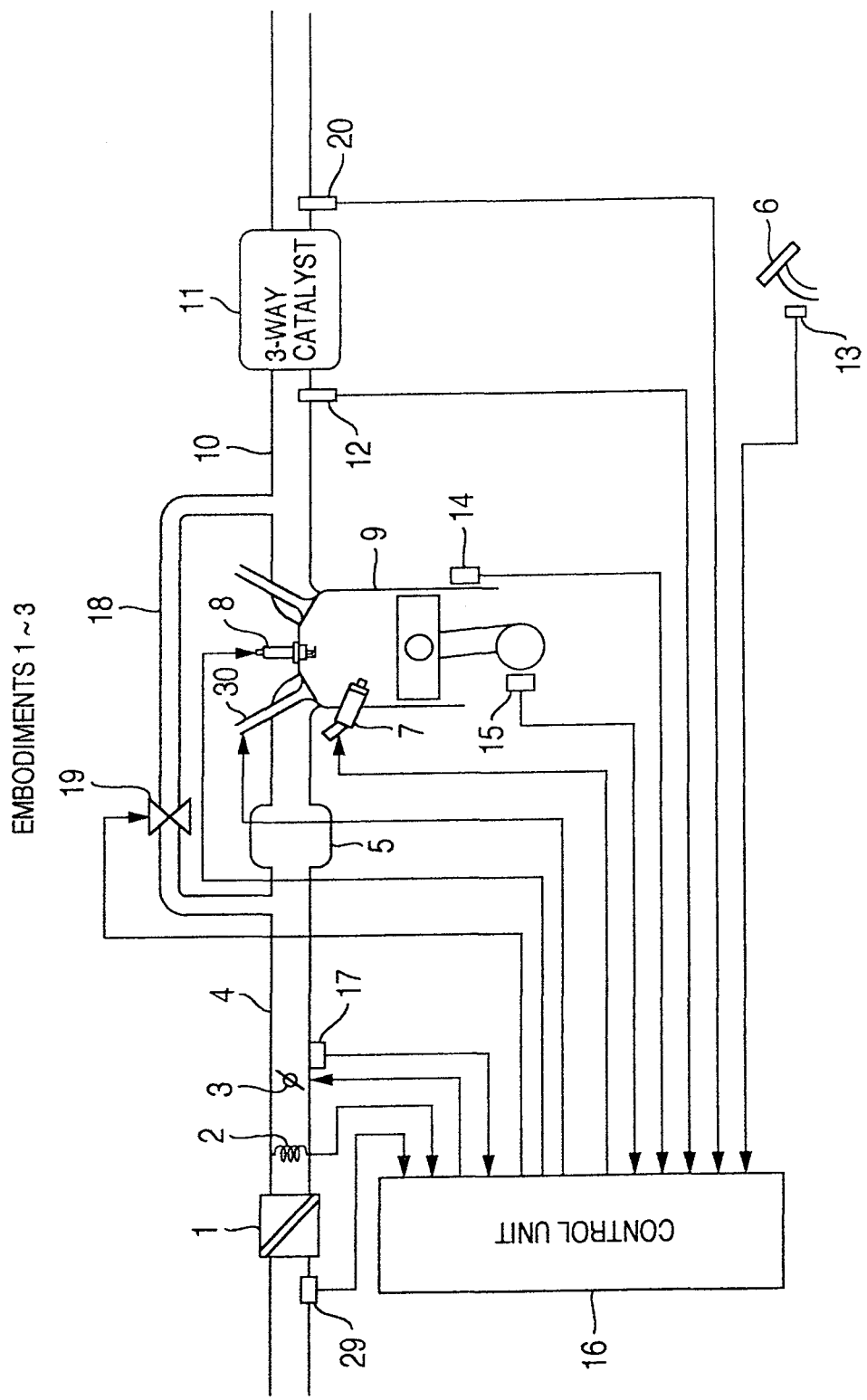
FIG. 22 schematically shows an engine control system used in the first through third embodiments of this invention.

FIG. 22 schematically shows a system for controlling an engine according to an embodiment of this invention. In a multiple-cylinder engine 9 (e.g. four-cylinder engine in this embodiment), ambient air flows into a cylinder through an air cleaner 1 via an intake manifold 4 and a collector 5. The flow rate of the intake air is detected by an air-flow sensor 2 and then adjusted by an electronic throttle 3. The temperature of the intake air is detected by an intake-air temperature sensor

29. A crank angle sensor 15 outputs a signal generated every 10 degrees of the rotation of the crankshaft and a signal generated every combustion cycle. A water temperature sensor 14 detects the temperature of the engine coolant. An accelerator depression sensor 13 detects the degree of the actuation of the accelerator 6 so as to detect the torque demanded by the driver.

The signals outputted from the accelerator depression sensor 13, the air-flow sensor 2, the intake-air temperature sensor 29, a throttle aperture sensor 17 attached to the electronic throttle 3, the crank angle sensor 15, and the water temperature sensor 14, are delivered to a control unit 16 which, described in detail later, determines the operating condition of the engine 9 on the basis of those signals and calculates the optimal values of the main manipulated variables for engine operation such as intake-air amount, fuel injection amount and ignition timing.

The target intake air amount calculated by the control unit 16 is converted to a signal for determining the target throttle aperture and further to a signal which is sent to the electronic throttle 3 to drive the same. The fuel injection amount is converted to a valve-opening signal, which is sent to a fuel injector 7. To the ignition plug 8 is applied a signal for firing the plug 8 in synchronism with the timing calculated by the control unit 16.

The injected fuel is mixed with the air flowing into the cylinder of the engine 9 through the intake manifold so that air-fuel mixture is formed in the cylinder 9. The air-fuel mixture is explosively combusted by being ignited with sparks generated by the spark plug 8 in accordance with a predetermined timing, and the pressure of explosion pushes the piston to generate the motive force of the engine. After the explosion, exhaust gas is sent to a 3-way catalyst 11 via an exhaust manifold 10. Part of the exhaust gas is returned to the intake manifold 4 through an exhaust gas recirculation pipe 18. The amount of the recirculated exhaust gas is controlled by an exhaust gas recirculation (EGR) control valve 19.

A catalyst-upstream A/F sensor 12 is disposed between the engine 9 and the 3-way catalyst 11 whereas a catalyst-downstream $O_2$ sensor 20 is disposed downstream of the 3-way catalyst 11.

Figure 23:
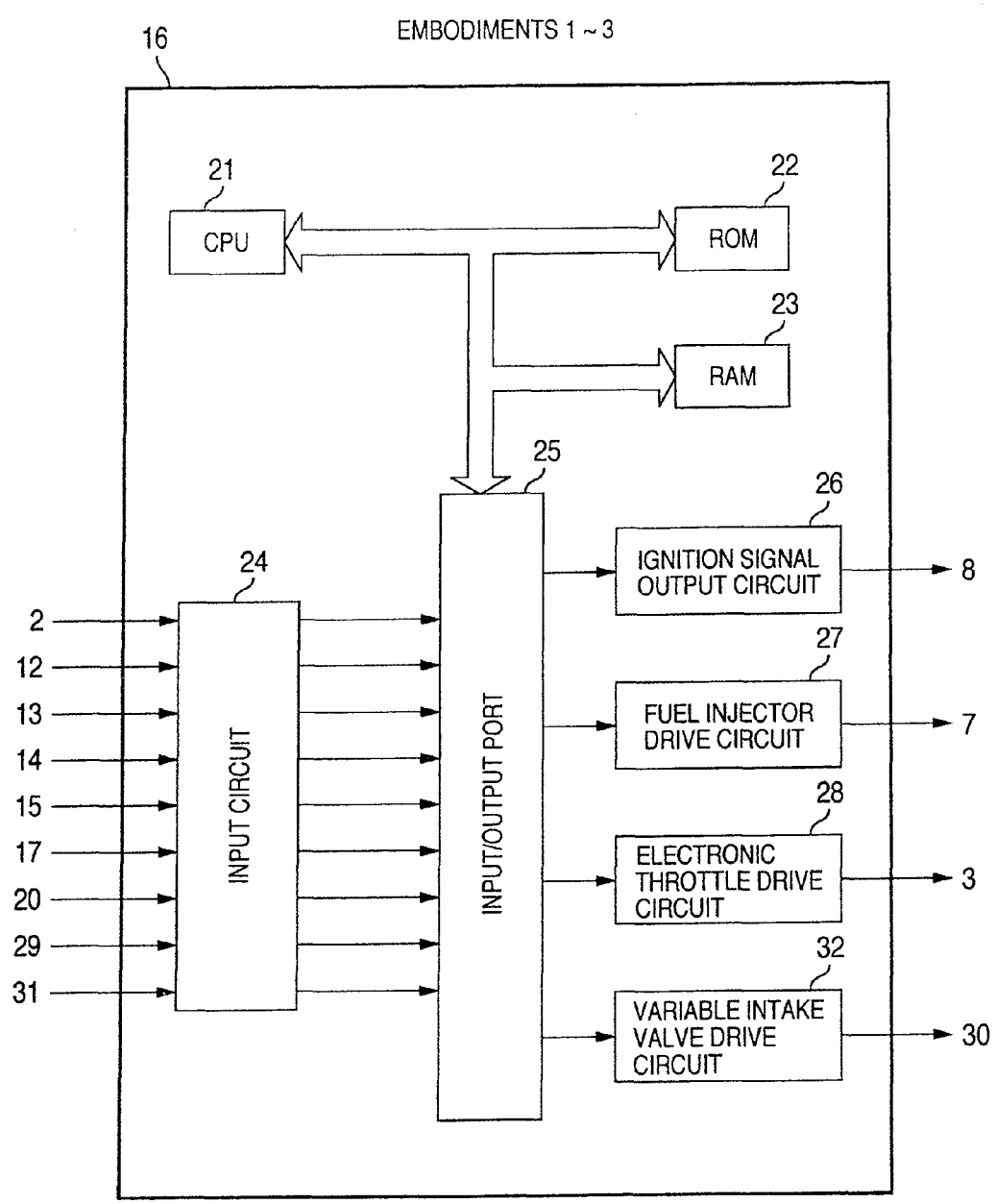
FIG. 23 shows in block diagram the internal structure of a control unit used in the first through third embodiments of this invention.

FIG. 23 shows in block diagram the internal structure of the control unit 16. The control unit (ECU) 16 receives the outputs of the air-flow sensor 2, the catalyst-upstream A/F sensor 12, the accelerator depression sensor 13, the water temperature sensor 14, a crank angle sensor 15, the throttle aperture sensor 17, the catalyst-downstream $O_2$ sensor 20, the intake-air temperature sensor 29, and a vehicle speed sensor 31. These signals are initially processed by an input circuit 24 so as to remove noise, and then sent to an input/output port 25. The values received by the input/output port 25 are stored in a RAM 23 and subjected to calculation in CPU 21. The control program which executes the algorithm of the calculation is previously written in a ROM 22. The values that have been calculated according to the control program and that represent the actuating signals for actuating the respective control elements (or actuators), are stored in the RAM 23 and then sent to the input/output port 25. The actuating signal for the ignition plug is an ON/OFF signal which appears when the primary coil of the ignition output circuit draws current, and disappears when the current through the primary coil is interrupted. The instant at which ignition takes place occurs in response to the transition of the actuating signal from ON-state to OFF-state. The signal for firing the ignition plug, which has been set in the output port, is amplified by an ignition signal output circuit 26 to such an extent that it has energy enough to fire the plug, before it is supplied to the plug.

The actuation signal for the fuel injector is also an ON/OFF signal that appears when fuel is to be injected and disappears when fuel is not to be injected. This signal is sent to the fuel injector 7 after it has been amplified by a fuel injector drive circuit 27 to such an extent that it has energy enough to actuate the fuel injector 7. The actuating signal for setting the target aperture of the electronic throttle 3 is sent to the electronic throttle 3 via an electronic throttle drive circuit 28. The actuating signal for setting the target lift of a variable intake valve 30 and the target instant for opening or closing the valve 30, is sent to the variable intake valve 30 via a variable intake valve drive circuit 32.

Figure 24:
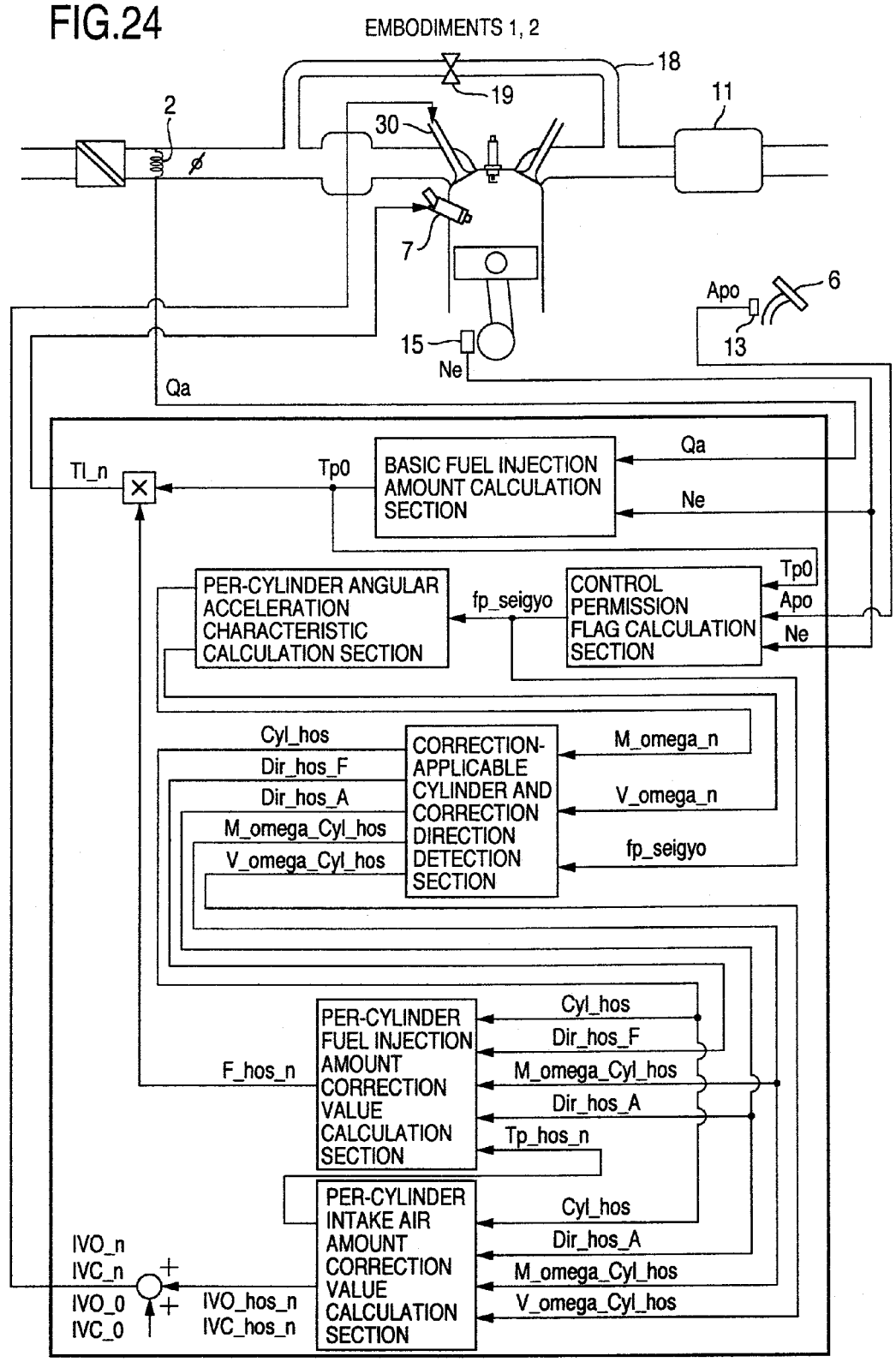
FIG. 24 shows in block diagram the entire control system used in the first and second embodiments of this invention.
Figure 25:
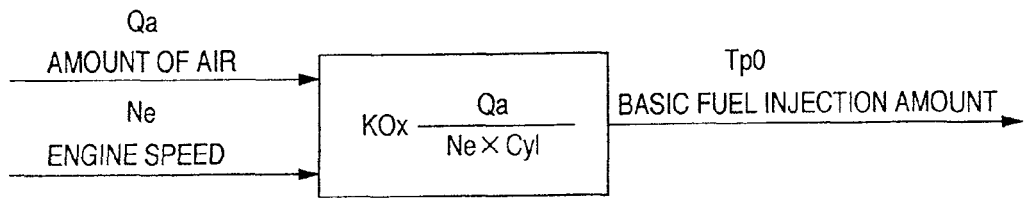
FIG. 25 shows in block diagram the basic fuel injection amount calculation section used in the first through third embodiments of this invention.
Figure 28:
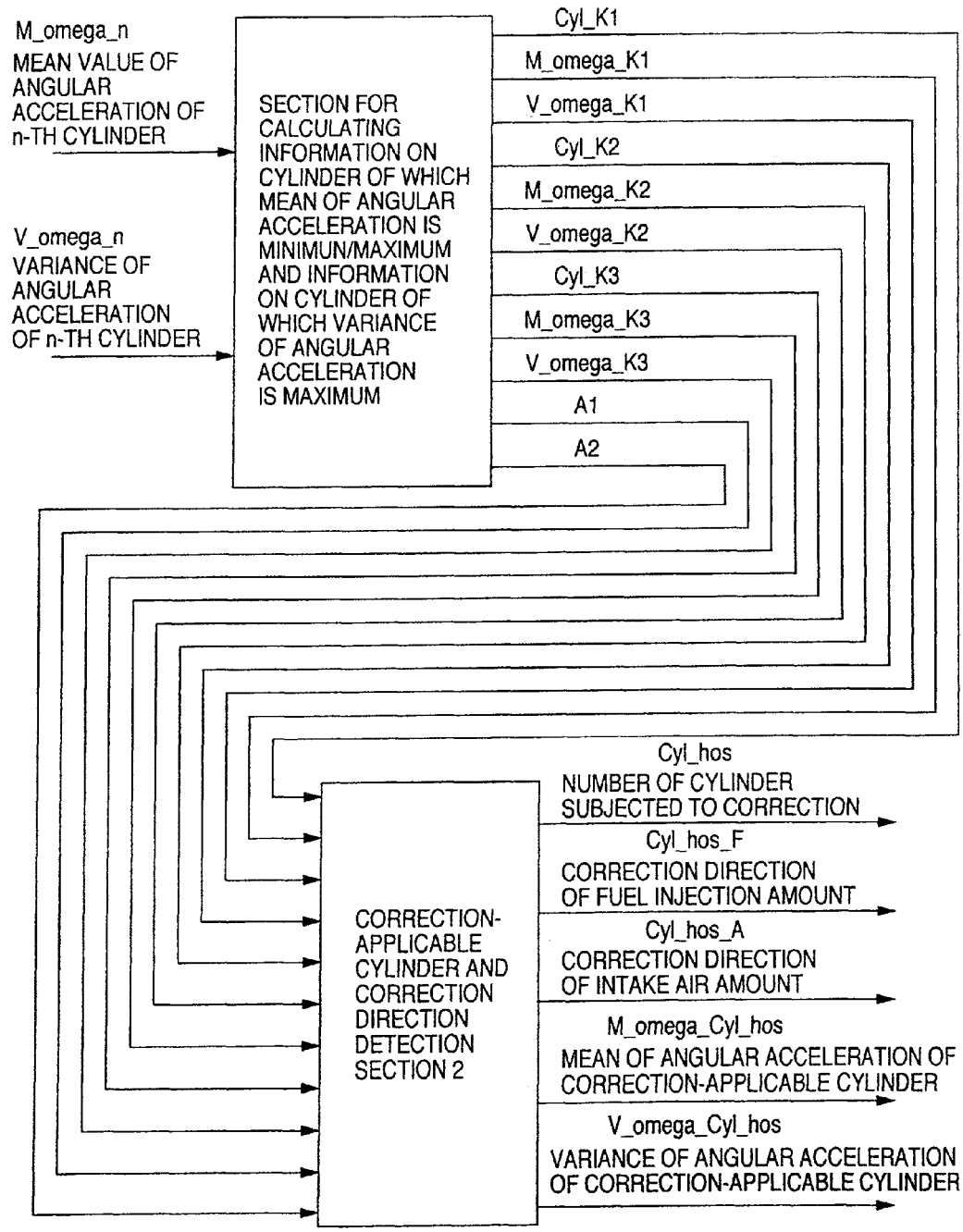
FIG. 28 shows in block diagram the correction-applicable cylinder and correction direction detection section used in the first and second embodiments of this invention.
Figure 32:
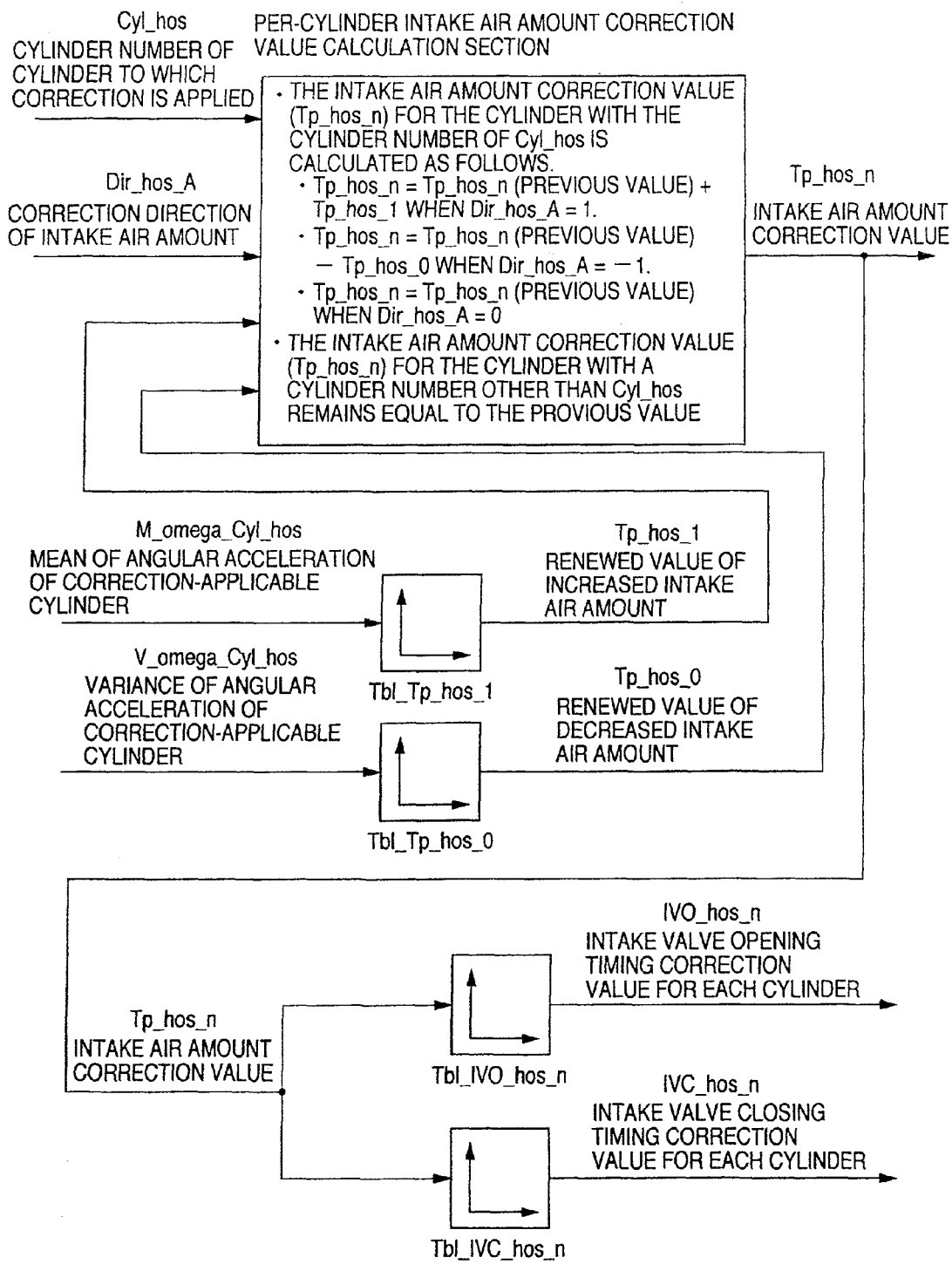
FIG. 32 shows in block diagram the per-cylinder intake air amount correction value calculation section used in the first embodiment of this invention.

Now, the control program to be written into the ROM 22 will be described. FIG. 24 shows in block diagram the entire control system, which comprises:

Basic fuel injection amount Calculation Section (FIG. 25)
Control Permission Flag Calculation Section (FIG. 26)
Per-cylinder Angular Acceleration Characteristic Calculation Section (FIG. 27)
Correction-Applicable Cylinder and Correction Direction Detection Section (FIG. 28)
Per-cylinder Fuel Injection Amount Correction Value Calculation Section (FIG. 31)
Per-cylinder Intake Air Amount Correction Value Calculation Section (FIG. 32)

The "basic fuel injection amount calculation section" calculates the basic fuel injection amount (Tp0). The "control permission flag calculation section" calculates the flag (fp_seigyo) for permitting the execution of the correction of fuel injection amount and intake air amount for each cylinder. The "per-cylinder angular acceleration characteristic calculation section" calculates the mean (M_omega_n (n: cylinder number)) of the angular acceleration of each cylinder and the variance (V_omega_n (n: cylinder number)) of the angular acceleration of each cylinder, representative of the angular acceleration characteristics of each cylinder, when the control permission is issued. The "correction-applicable cylinder and correction direction detection section" calculates, on the basis of the above mentioned angular acceleration characteristics, the cylinder numbers (Cyl_hos) of the correction-applicable cylinders; the correction direction (Dir_hos_F) of whether the fuel injection amount for each correction-applicable cylinder is to be increased or decreased; the correction direction (Dir_hos_A) of whether the intake air amount for each correction-applicable cylinder is to be increased or decreased; the mean (M_omega_Cyl_hos) of the angular acceleration with respect to the correction-applicable cylinder; and the variace (V_omega_Cyl_hos) of the angular acceleration with respect to the correction-applicable cylinder. The "per-cylinder fuel injection amount correction value calculation section" calculates the fuel injection amount correction value (F_hos_n (n: cylinder number)) for each cylinder on the basis of the various parameters calculated by the correction-applicable cylinder and correction direction detection section. The "per-cylinder intake air amount correction value calculation section" calculates the intake air amount correction value (IVO_hos_n, IVC_hos_n) for each cylinder on the basis of the various parameters calculated by the correction-applicable cylinder and correction direction detection section. Here, (IVO_hos_n) is the correction value applied to the opening instant (IVO_n) of the fuel injector of the number "n" cylinder, and (IVC_hos_n) is the correction value applied to the closing instant (IVC_n) of the fuel injector of the number "n" cylinder. Various methods of calculating IVO_n and IVC_n have been already proposed to date, and since those methods are not directly related to this invention, the detailed description thereof is omitted here. The respective calculation sections mentioned above will be described in detail below.

[Basic Fuel Injection Amount Calculation Section (FIG. 25)]

This calculation section calculates the basic fuel injection amount (Tp0). To be concrete, it is calculated by using the expression shown in FIG. 25. In that expression, Cyl denotes the number of cylinders, and K0 is determined on the basis of the specification (i.e. relationship between fuel injection pulse width and fuel injection amount) of the injectors associated with the cylinders.

[Control Permission Flag Calculation Section (FIG. 26)]

Figure 26:
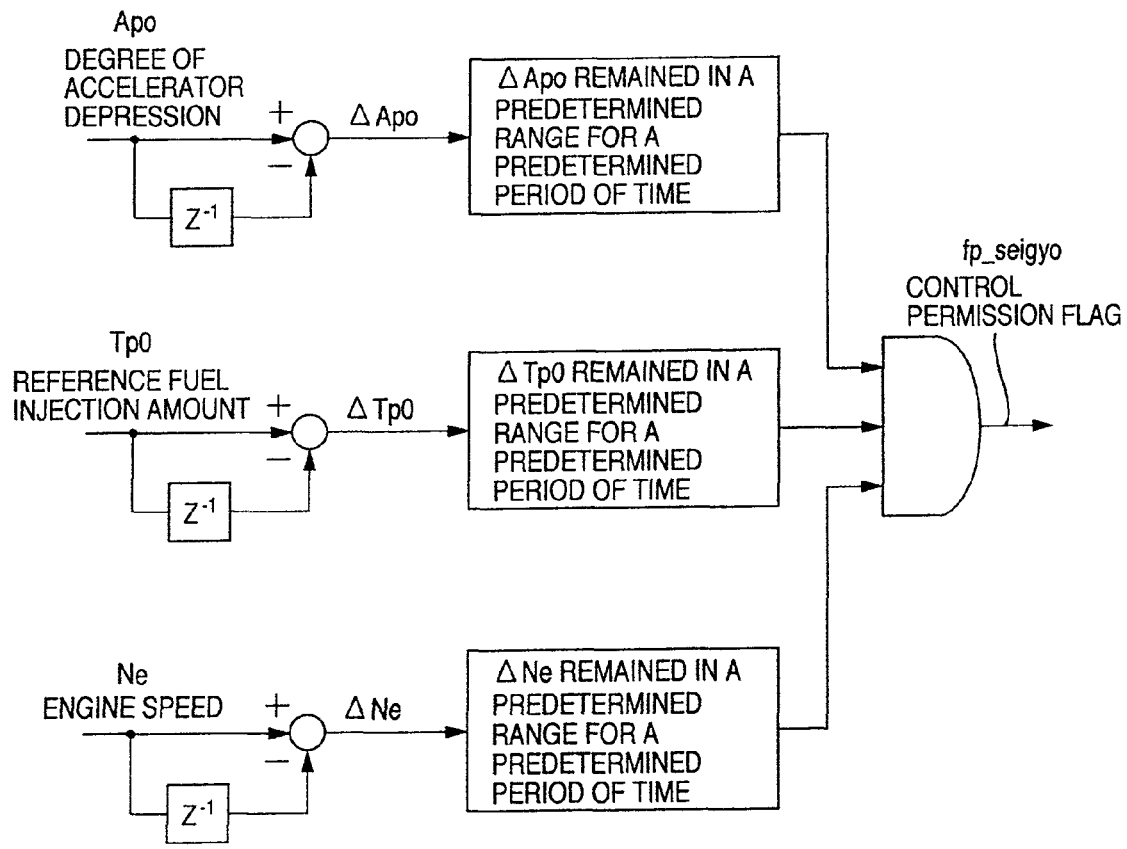
FIG. 26 shows in block diagram the control permission flag calculation section used in the first embodiment of this invention.

This calculation section calculates the control permission flag (fp_seigyo). The flow of calculation is as shown in FIG. 26. The execution of control is permitted if the difference (ΔApo) between the present and previous values of accelerator depression remains within a predetermined range for a predetermined period of time, if the difference (ΔTp0) between the present and previous values of the basic fuel injection amount remains within a predetermined range for a predetermined period of time, and if the difference (ΔNe) between the present and previous values of engine rotational speed remains within a predetermined range for a predetermined period of time.

[Per-Cylinder Angular Acceleration Characteristic Calculation Section (FIG. 27)]

This calculation section calculates the mean (M_omega_n (n: cylinder number)) of the angular acceleration of one of the cylinders representative of the angular acceleration characteristic of that cylinder, and the variance (V_omega_n (n: cylinder number)) of the angular acceleration of one of the cylinders. The flow of calculation is as shown in FIG. 27. The angular acceleration (omega_n) of the n-th cylinder is obtained from the engine rotational speed (Ne). In more concrete terms, the mean of Ne's is calculated every combustion cycle; the difference between the mean and previous value of Ne is termed (omega_n); and the mean (M_omega_n) of the angular acceleration of the n-th cylinder over a predetermined number of cycles is derived from (omega_n). The variance (V_omega_n) of the angular acceleration of the n-th cylinder over a predetermined number of cycles is also derived from (omega_n).

[Correction-Applicable Cylinder and Correction Direction Detection Section (FIG. 28)]

This calculation section consists of a "section for calculating both the information on the cylinder of which the mean of angular acceleration is minimum/maximum and the information on the cylinder of which the variance of angular acceleration is maximum" and a "correction-applicable cylinder and correction direction detection section 2". The details of the respective calculation sections will be described in the following.

[Section for Calculating Both the Information on the Cylinder of which the Mean of Angular Acceleration is Minimum/Maximum and the Information on the Cylinder of which the Variance of Angular Acceleration is Maximum (FIG. 29)]

Figure 29:
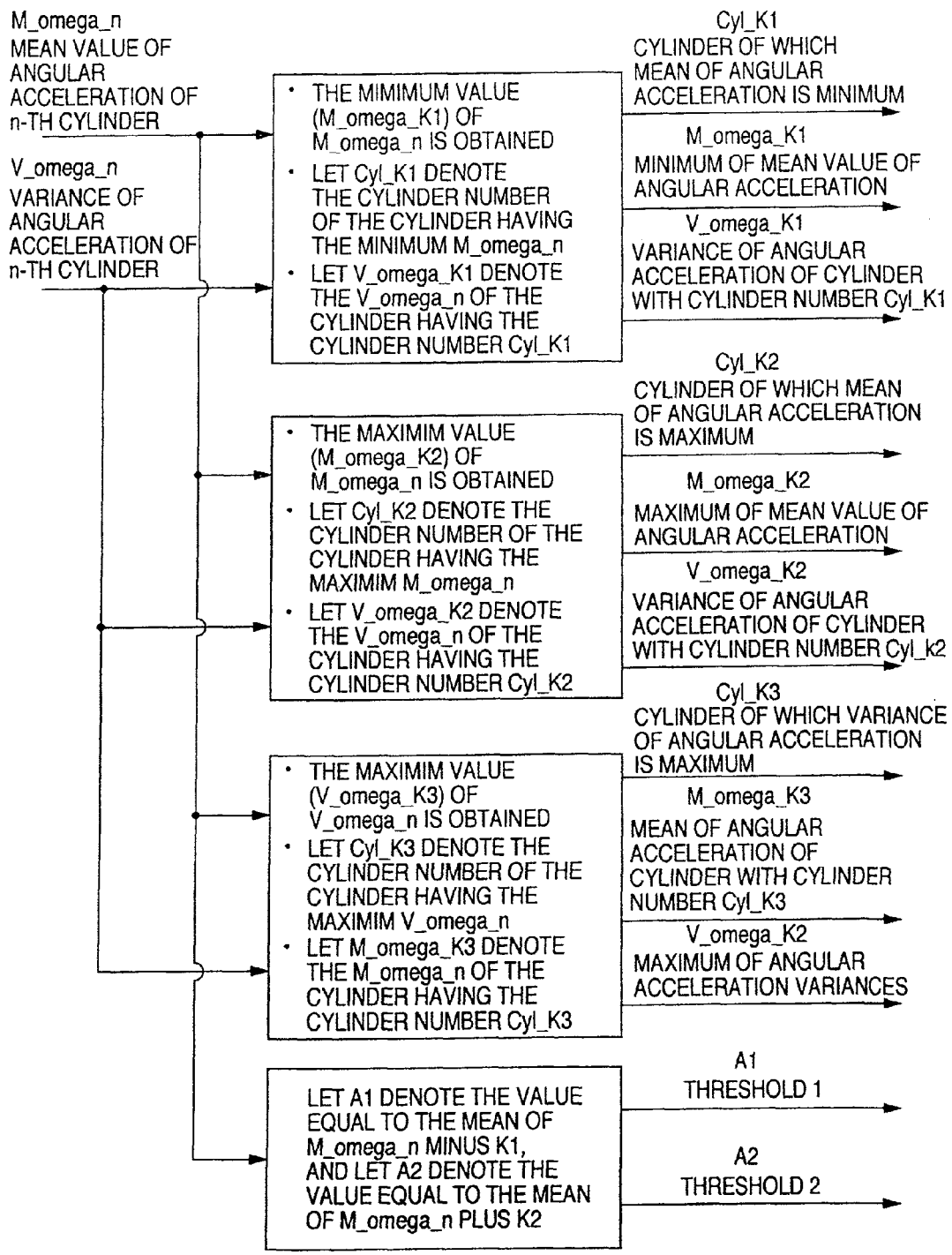
FIG. 29 shows in block diagram the section for calculating the information on the cylinder a mean value of the angular acceleration of which is minimum/maximum and the information on the cylinder the dispersion of the angular acceleration of which is maximum, the section being used in the first embodiment of this invention.

This calculation section calculates both the information on the cylinder of which the mean of angular acceleration is minimum/maximum and the information on the cylinder of which the variance of angular acceleration is maximum. The details are shown in FIG. 29:

The minimum value (M_omega_K1) of M_omega_n is obtained. Let Cyl_K1 denote the cylinder number of the cylinder having the minimum M_omega_n, and let V_omega_K1 denote the V_omega_n of the cylinder having the cylinder number Cyl_K1.

The maximum value (M_omega_K2) of M_omega_n is obtained. Let Cyl_K2 denote the cylinder number of the cylinder having the maximum M_omega_n, and let V_omega_K2 denote the V_omega_n of the cylinder having the cylinder number Cyl_K2.

The maximum value (V_omega_K3) of V_omega_n is obtained. Let Cyl_K3 denote the cylinder number of the cylinder having the maximum V_omega_n, and let M_omega_K3 denote the M_omega_n of the cylinder having the cylinder number Cyl_K3.

Let A1 denote the value equal to the mean of M_omega_n minus K1, and let A2 denote the value equal to the mean of M_omega_n plus K2.

[Correction-Applicable Cylinder and Correction Direction Detection Section 2 (FIG. 30)]

Figure 30:
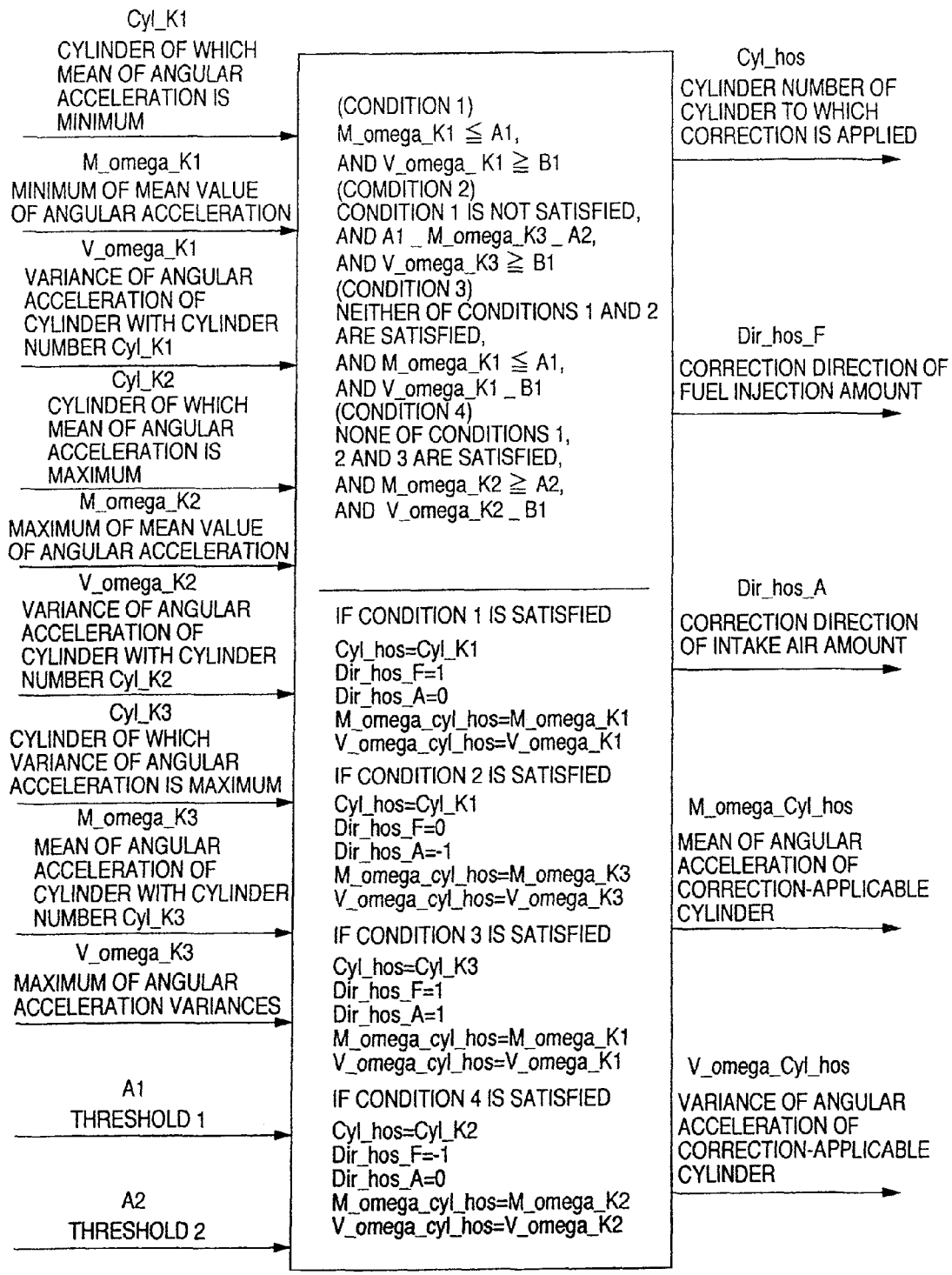
FIG. 30 shows in block diagram the correction-applicable cylinder and correction direction detection section 2 used in the first and second embodiments of this invention.

This detection section detects the correction-applicable cylinders and the correction directions. The details are shown in FIG. 30.

$M\_omega\_K1 \leq A1$, and $V\_omega\_K1 \geq B1$.  [Condition 1]

Condition 1 is not satisfied, and $A1 < M\_omega\_K3 < A2$, and $V\_omega\_K3 \geq B1$.  [Condition 2]

Neither of Conditions 1 and 2 are satisfied, and $M\_omega\_K1 \leq A1$, and $V\_omega\_K1 < B1$.  [Condition 3]

None of Conditions 1, 2 and 3 are satisfied, and $M\_omega\_K2 \geq A2$, and $V\_omega\_K2 < B1$.  [Condition 4]

If Condition 1 is satisfied, then Cyl_hos=Cyl_K1, Dir_hos_F=1, Dir_hos_A=0, M_omega_cyl_hos=M_omega_K1, and V_omega_cyl_hos=V_omega_K1.

If Condition 2 is satisfied, then Cyl_hos=Cyl_K1, Dir_hos_F=0, Dir_hos_A=1, M_omega_cyl_hos=M_omega_K3, and V_omega_cyl_hos=V_omega_K3.

If Condition 3 is satisfied, then Cyl_hos=Cyl_K3, Dir_hos_F=1, Dir_hos_A=1, M_omega_cyl_hos=M_omega_K1, and V_omega_cyl_hos=V_omega_K1.

If Condition 4 is satisfied, then Cyl_hos=Cyl_K2, Dir_hos_F=−1, Dir_hos_A=0, M_omega_cyl_hos=M_omega_K2, and V_omega_cyl_hos=V_omega_K2.

When the correction direction flags (Dir_hos_F, Dir_hos_A) take the value of "1", correction is in the direction of increase. When they take the value of "−1", correction is in the direction of decrease. When they take the value of "0", no correction takes place.

[Per-Cylinder Fuel Injection Amount Correction Value Calculation Section (FIG. 31)]

This calculation section calculates the fuel injection amount correction value (F_hos_n) for each cylinder. The details are shown in FIG. 31: the fuel injection amount correction value (F_hos_n) for the cylinder with the cylinder number of Cyl_hos is calculated as follows.

$F\_hos\_n = F\_hos\_n(\text{previous value}) + F\_hos\_1$
when Dir_hos_F=1 and Dir_hos_A=0.

$F\_hos\_n = K \times Tp\_hos\_n(n=Cyl\_hos)$ when Dir_hos_F=1 and Dir_hos_A=1.

$F\_hos\_n = F\_hos\_n(\text{previous value}) - F\_hos\_0$
when Dir_hos_F=−1.

$F\_hos\_n = F\_hos\_n(\text{previous value})$ when Dir_hos_F=0.

The fuel injection amount correction value (F_hos_n) for the cylinder with a cylinder number other than Cyl_hos remains equal to the previous value, i.e. F_hos_n=F_hos_n (previous value).

Further, the renewed value (F_hos_1) of increased fuel injection amount is obtained from M_omega_Cyl_hos by referring to the table value (Tbl_F_hos_1). The renewed value (F_hos_0) of decreased fuel injection amount is obtained from M_omega_Cyl_hos by referring to the table value (Tbl_F_hos_0). The values obtained by referring to the table are determined depending on how much fuel injection amount should be corrected per one renewal with respect to the magnitude (decreased or increased amount) of a mean value of the angular acceleration.

[Per-Cylinder Intake Air Amount Correction Value Calculation Section (FIG. 32)]

This calculation section calculates the intake air amount correction value (Tp_hos_n) for each cylinder. The details are shown in FIG. 32: the intake air amount correction value (Tp_hos_n) for the cylinder with the cylinder number of Cyl_hos is calculated as follows.

$Tp\_hos\_n = Tp\_hos\_n(\text{previous value}) + Tp\_hos\_1$ when $Dir\_hos\_A=1$.

$Tp\_hos\_n = Tp\_hos\_n(\text{previous value}) - Tp\_hos\_0$ when $Dir\_hos\_A=-1$.

$Tp\_hos\_n = Tp\_hos\_n(\text{previous value})$ when $Dir\_hos\_A=0$.

The intake air amount correction value (Tp_hos_n) for the cylinder with a cylinder number other than Cyl_hos remains equal to the previous value, i.e. Tp_hos_n=Tp_hos_n (previous value).

The intake air valve opening time correction value (IVO_hos_n) for each cylinder is calculated from Tp_hos_n by referring to the table value (Tbl_IVO_hos_n).

The intake air valve closing time correction value (IVC_hos_n) for each cylinder is calculated from Tp_hos_n by referring to the table value (Tbl_IVC_hos_n).

Further, the renewed value (Tp_hos_1) of increased intake air amount is obtained from M_omega_Cyl_hos by referring to the table value (Tbl_Tp_hos_1). The renewed value (Tp_hos_0) of decreased intake air amount is obtained from V_omega_Cyl_hos by referring to the table value (Tbl_Tp_hos_0). The values obtained by referring to the table are determined depending on how much intake air amount should be corrected per one renewal with respect to the magnitude (decreased or increased amount) of a mean value of the angular accelerations. The table values (Tbl_Tp_hos_1) and (Tbl_Tp_hos_0) are determined depending on how much opening and closing times of the intake air valve should be corrected with respect to the intake air amount correction value. The engine operating conditions such as rotational speed and intake air amount may be referred to for the determination of those values.

Embodiment 2

Figure 1:
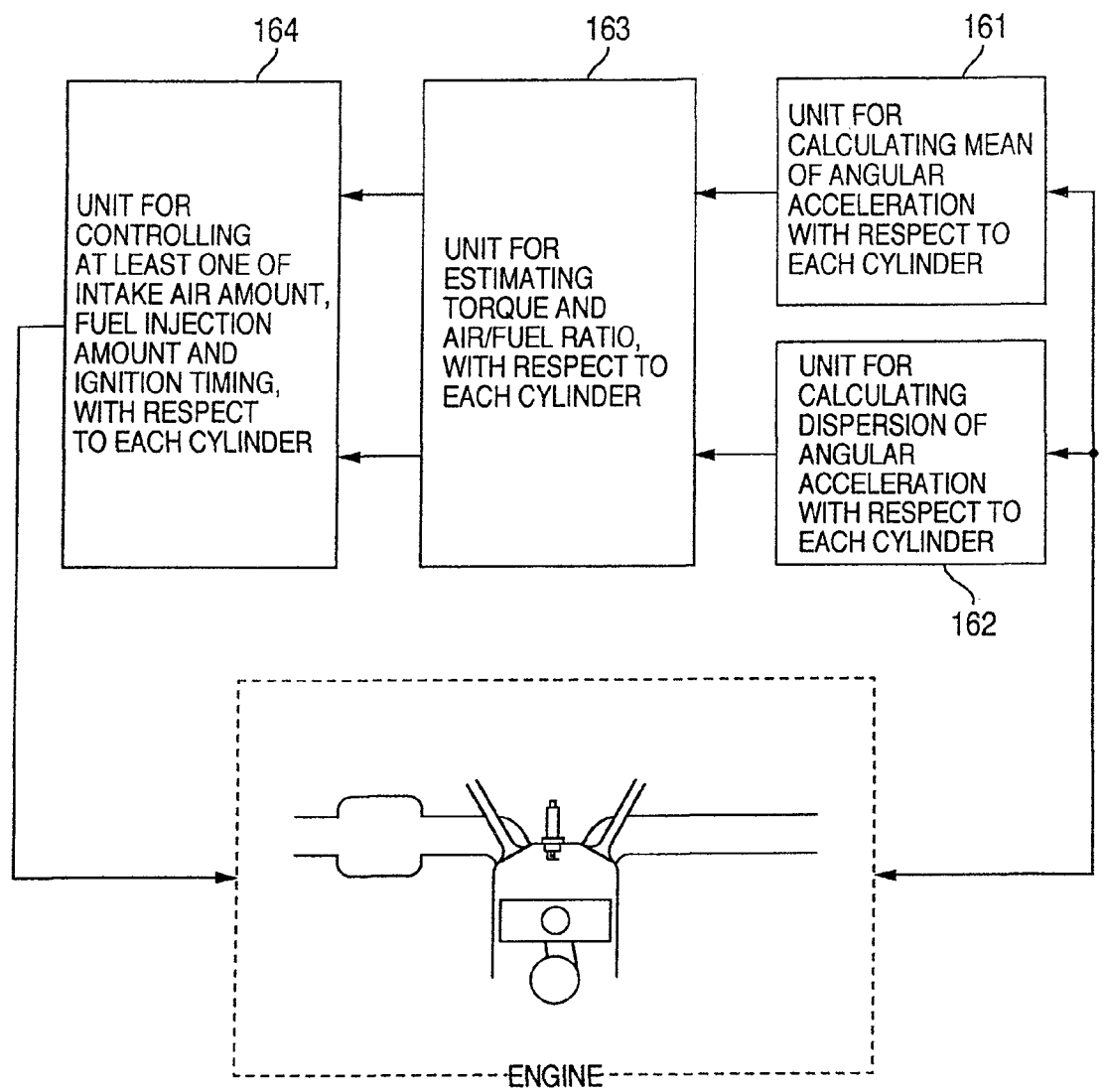
FIG. 1 shows in block diagram an engine control apparatus according to this invention.
Figure 2:
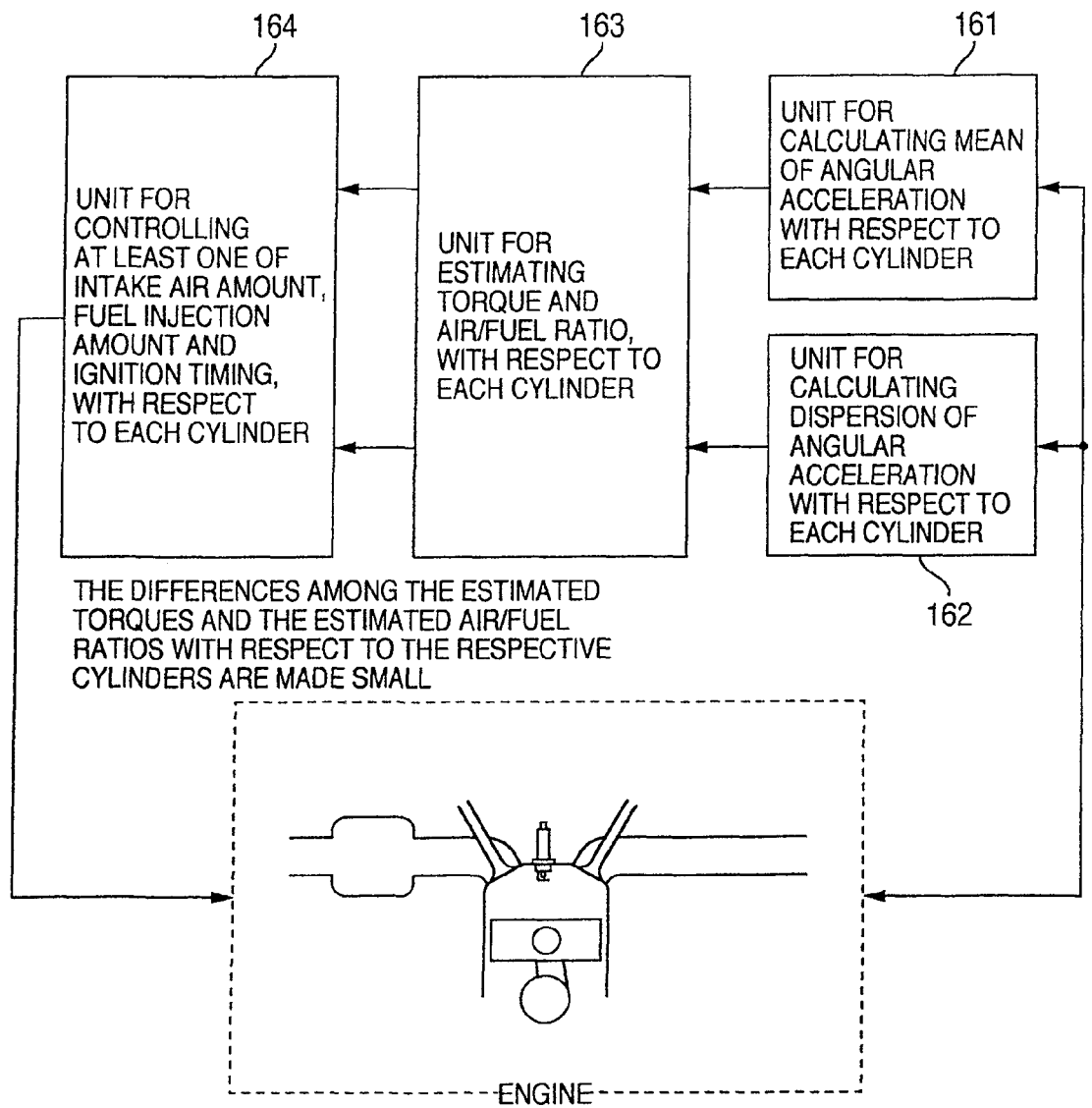
FIG. 2 shows in block diagram another engine control apparatus according to this invention.
Figure 3:
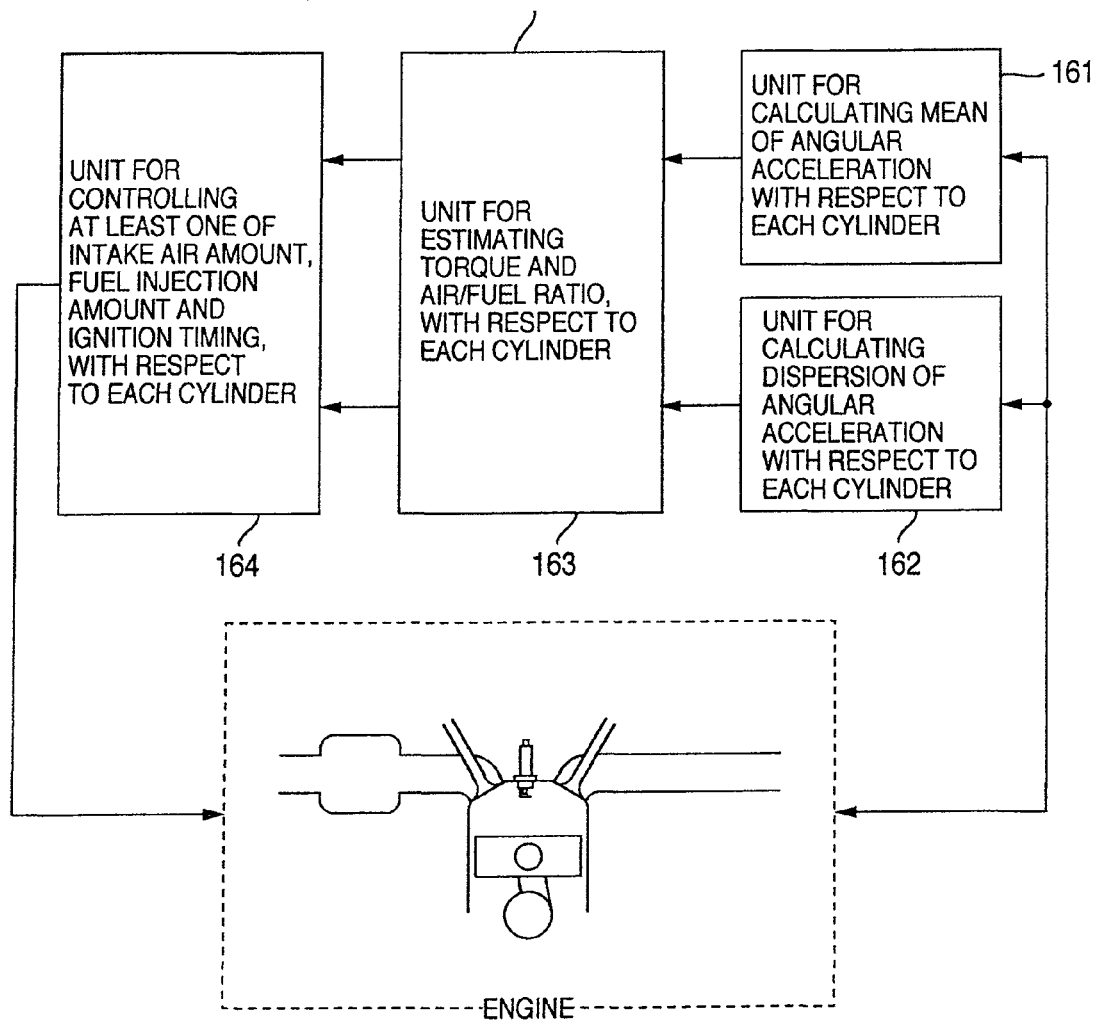
FIG. 3 shows in block diagram another engine control apparatus according to this invention.
Figure 4:
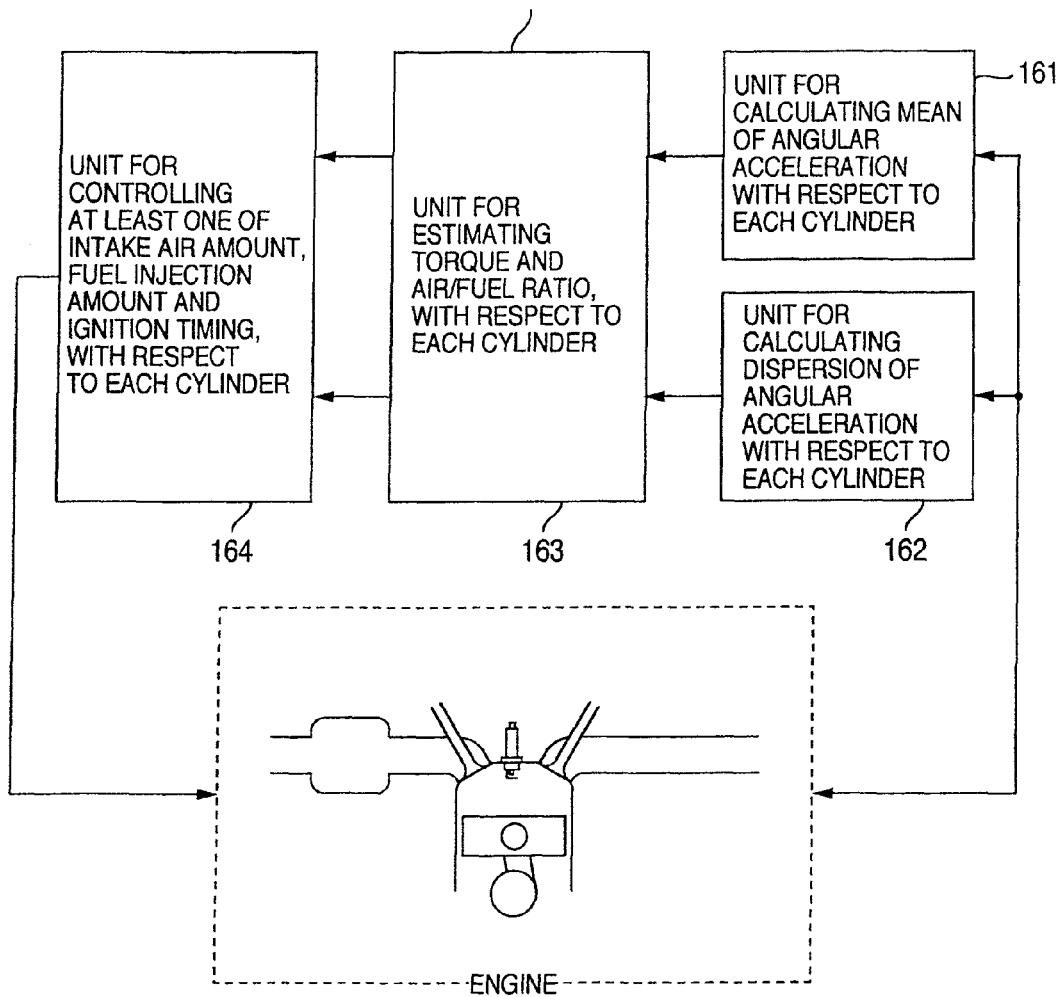
FIG. 4 shows in block diagram another engine control apparatus according to this invention.
Figure 5:
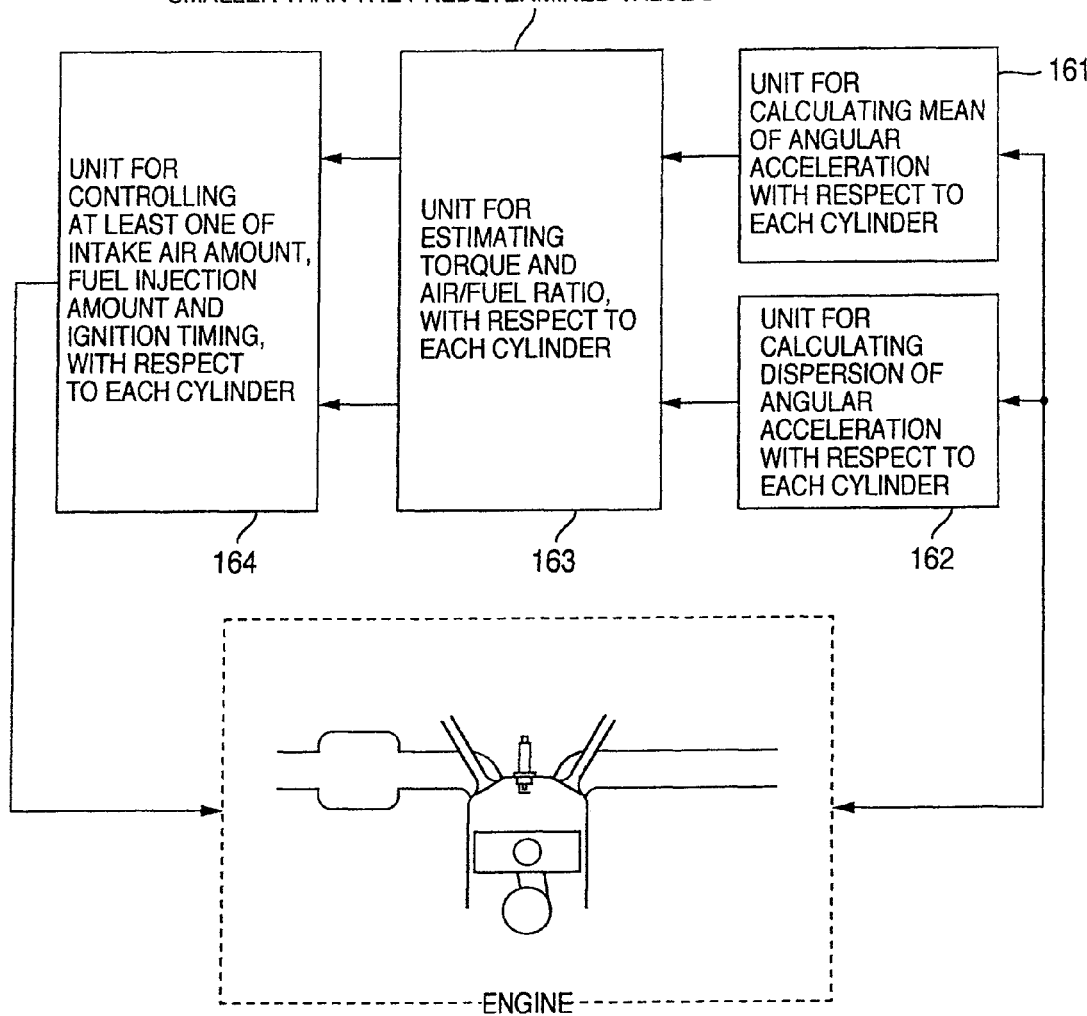
FIG. 5 shows in block diagram another engine control apparatus according to this invention.
Figure 6:
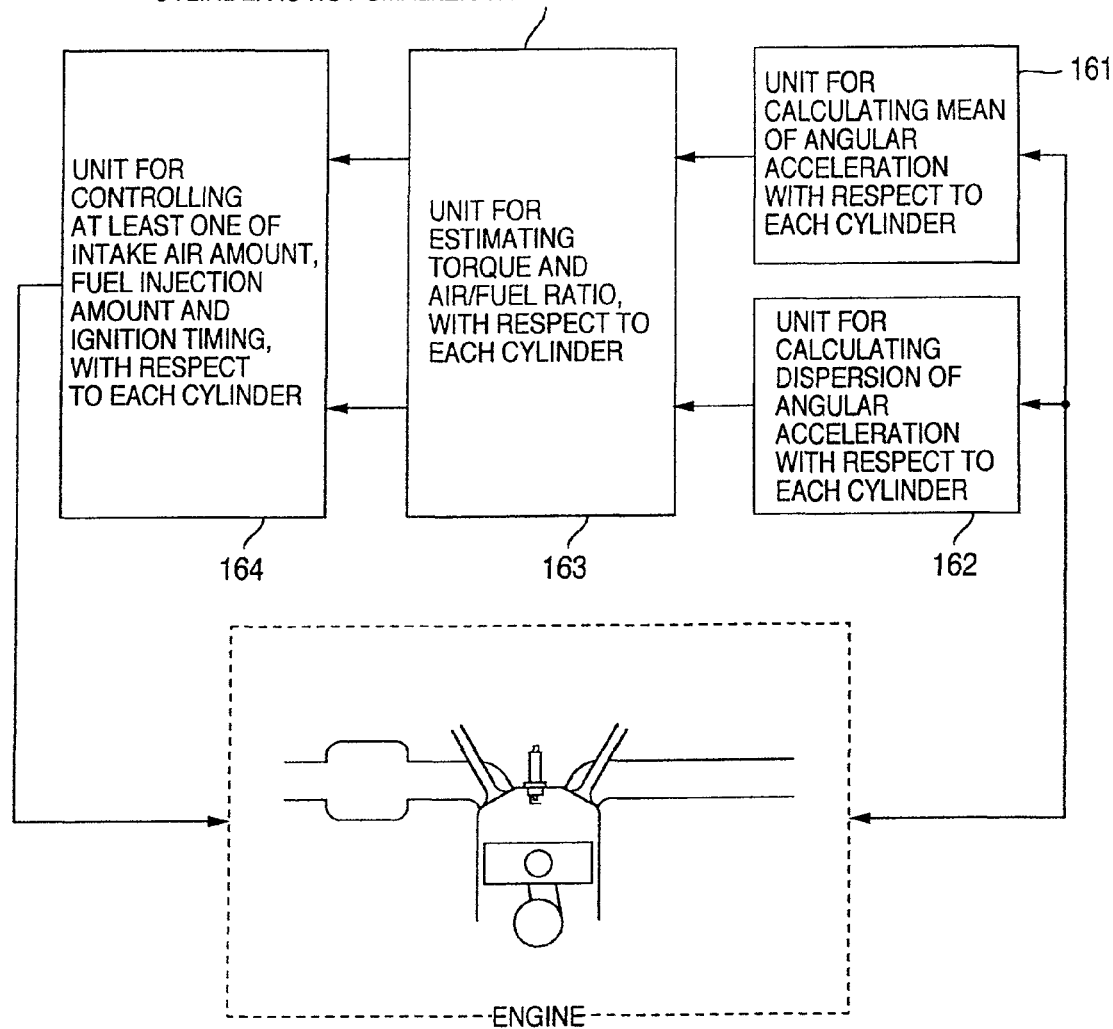
FIG. 6 shows in block diagram another engine control apparatus according to this invention.
Figure 7:
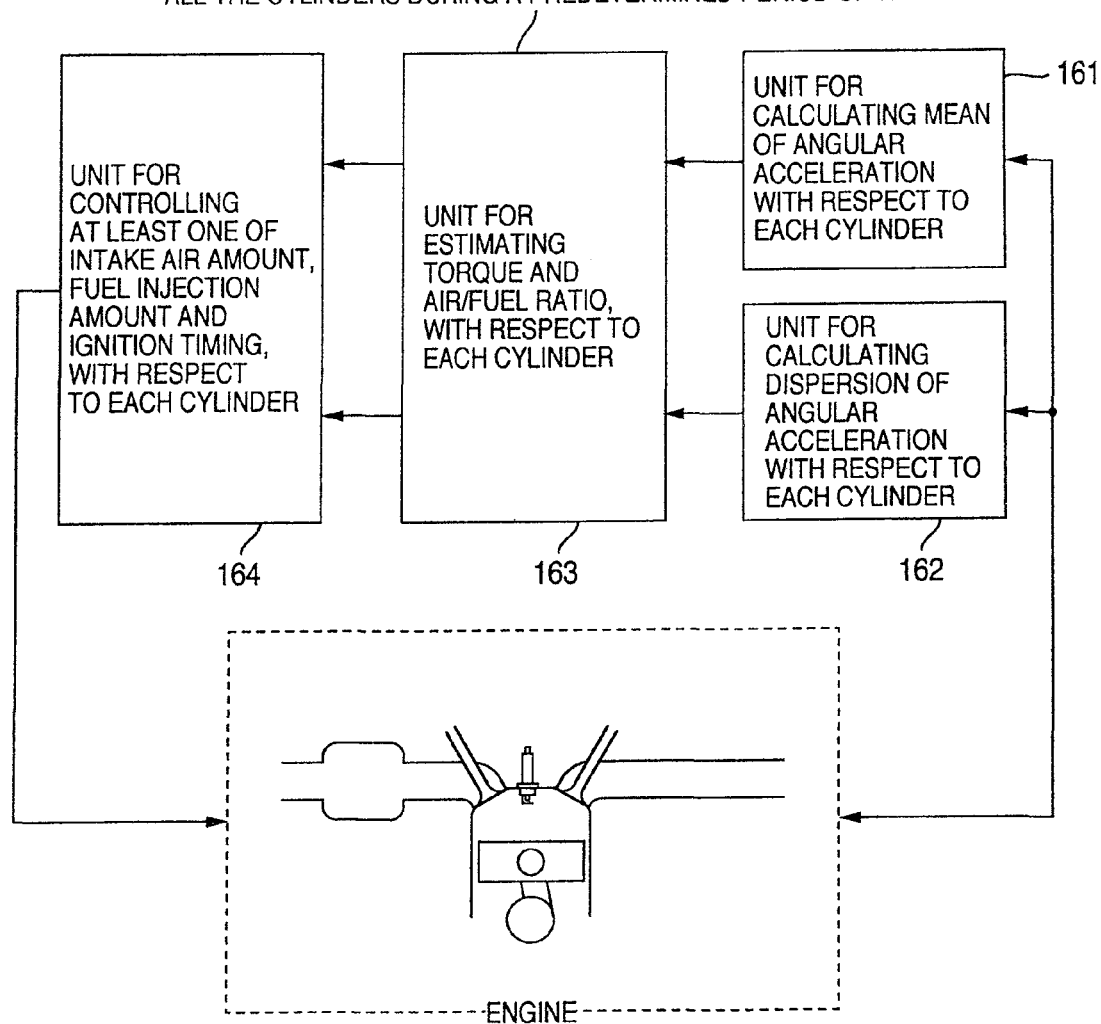
FIG. 7 shows in block diagram another engine control apparatus according to this invention.
Figure 8:
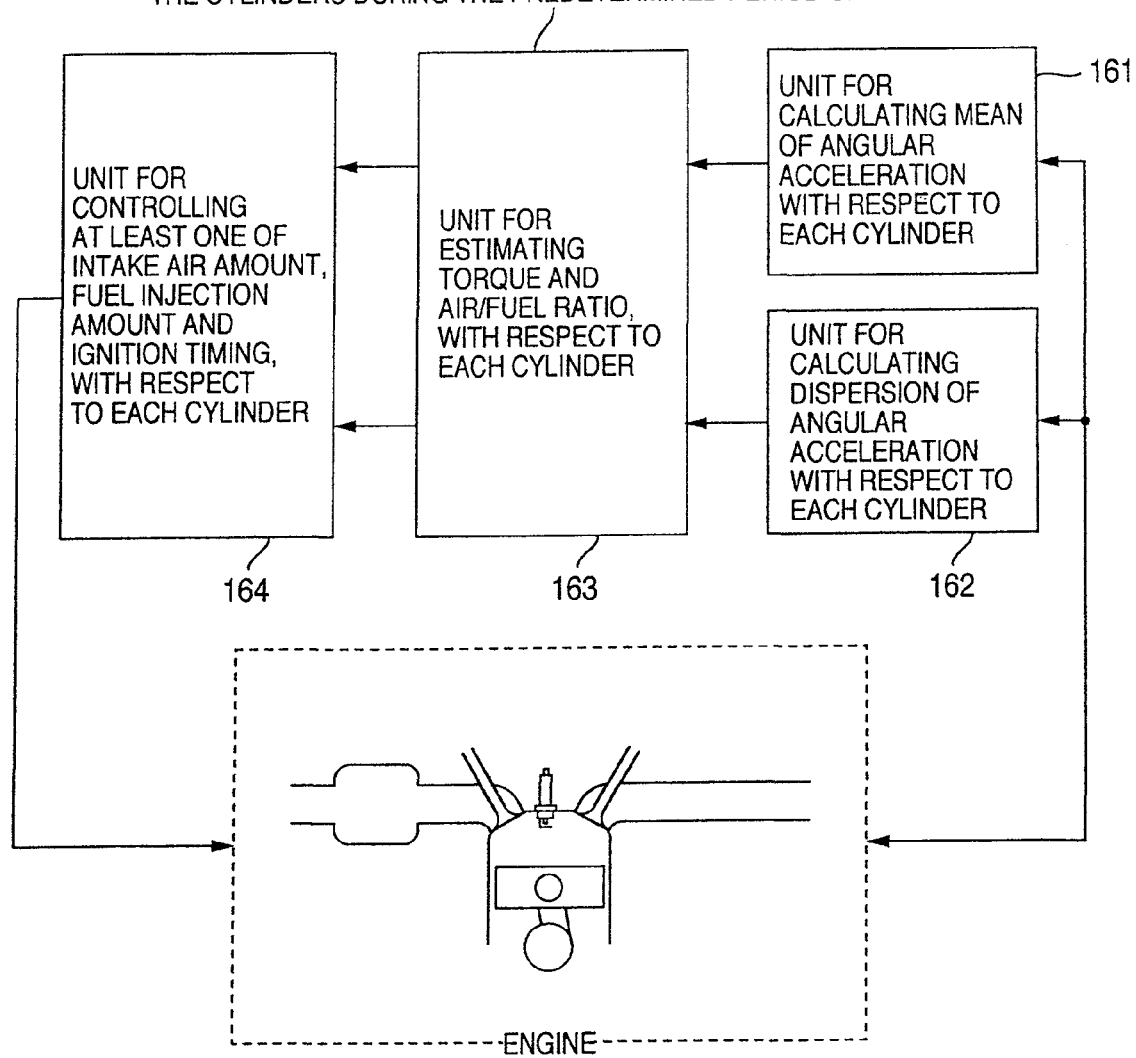
FIG. 8 shows in block diagram another engine control apparatus according to this invention.
Figure 9:
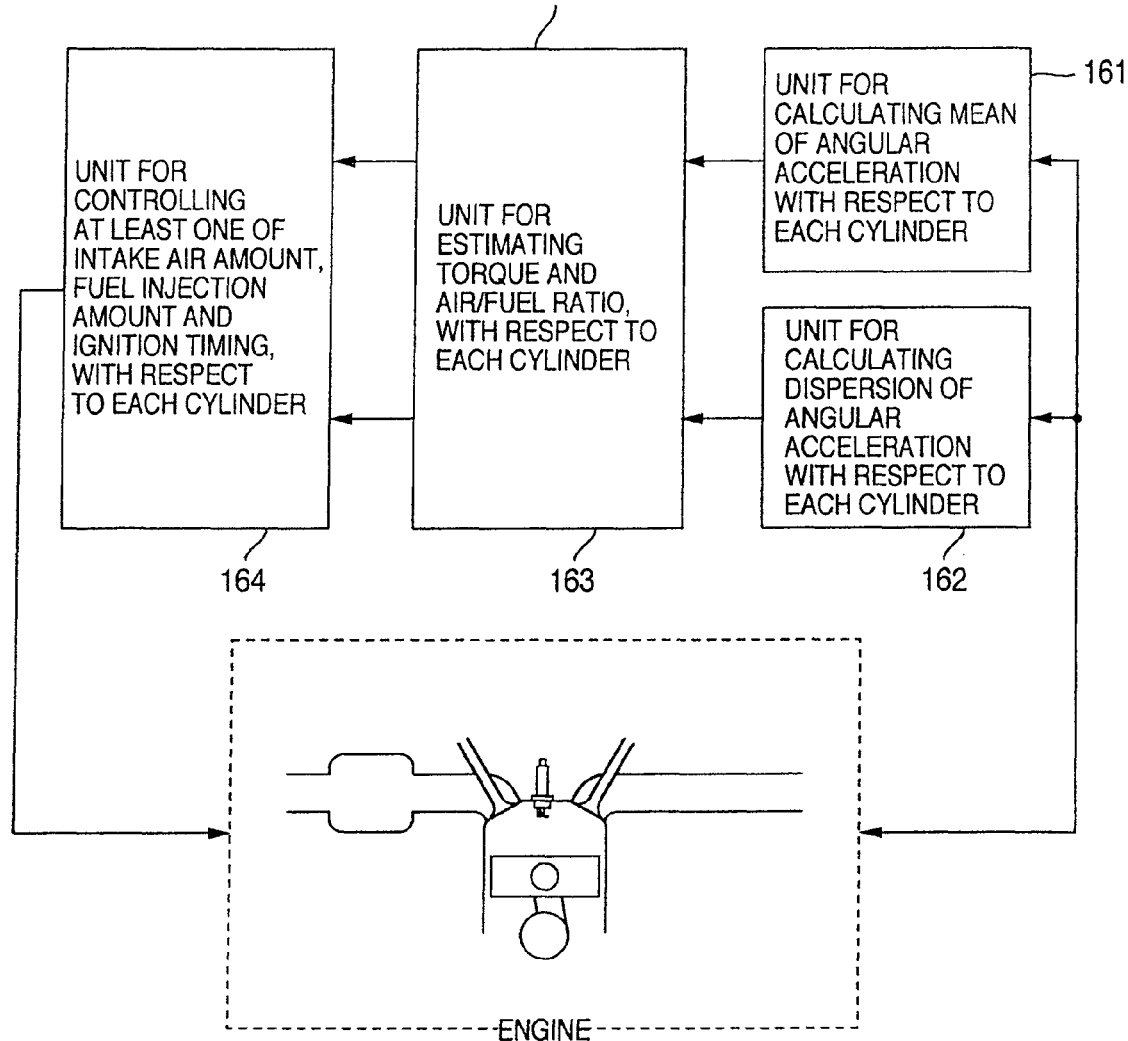
FIG. 9 shows in block diagram another engine control apparatus according to this invention.
Figure 10:
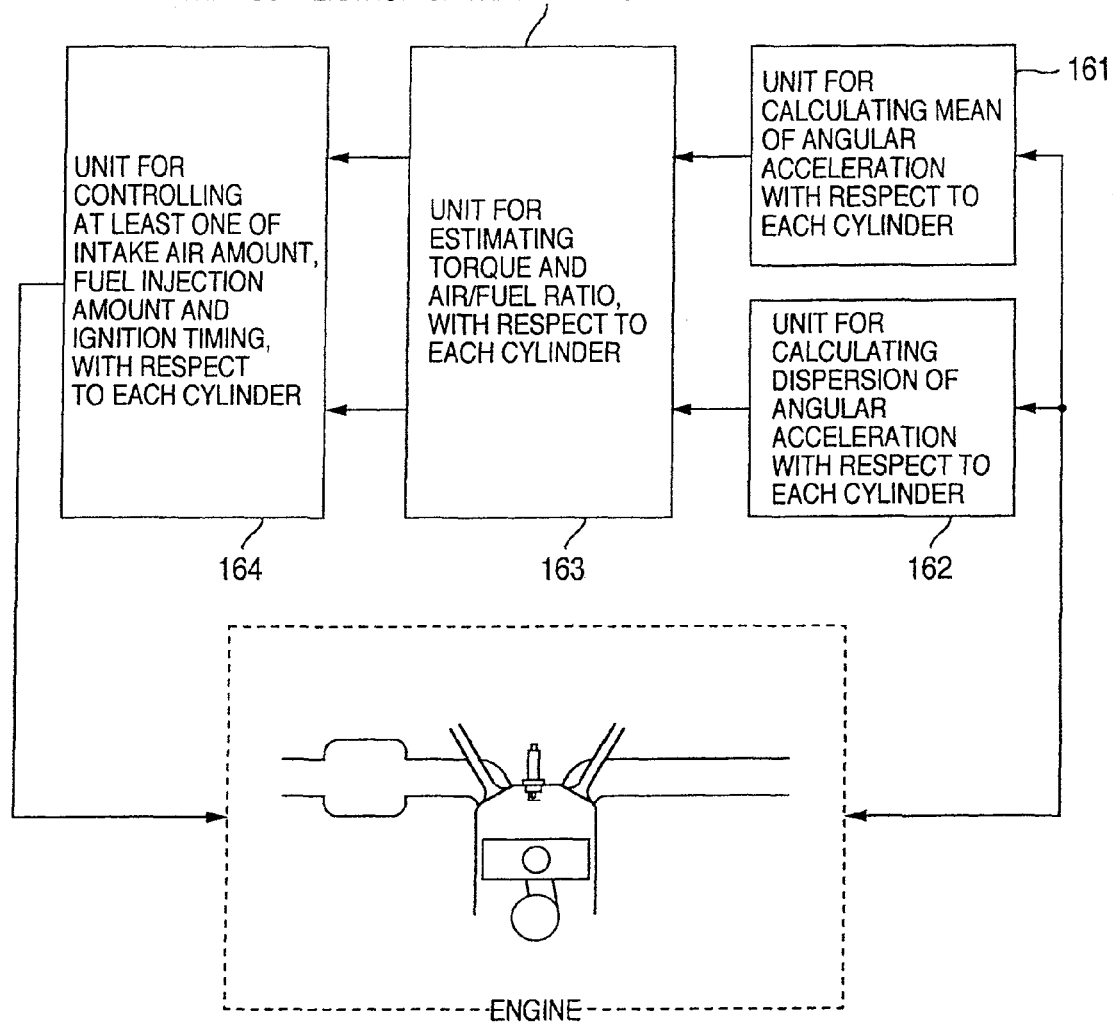
FIG. 10 shows in block diagram another engine control apparatus according to this invention.
Figure 11:
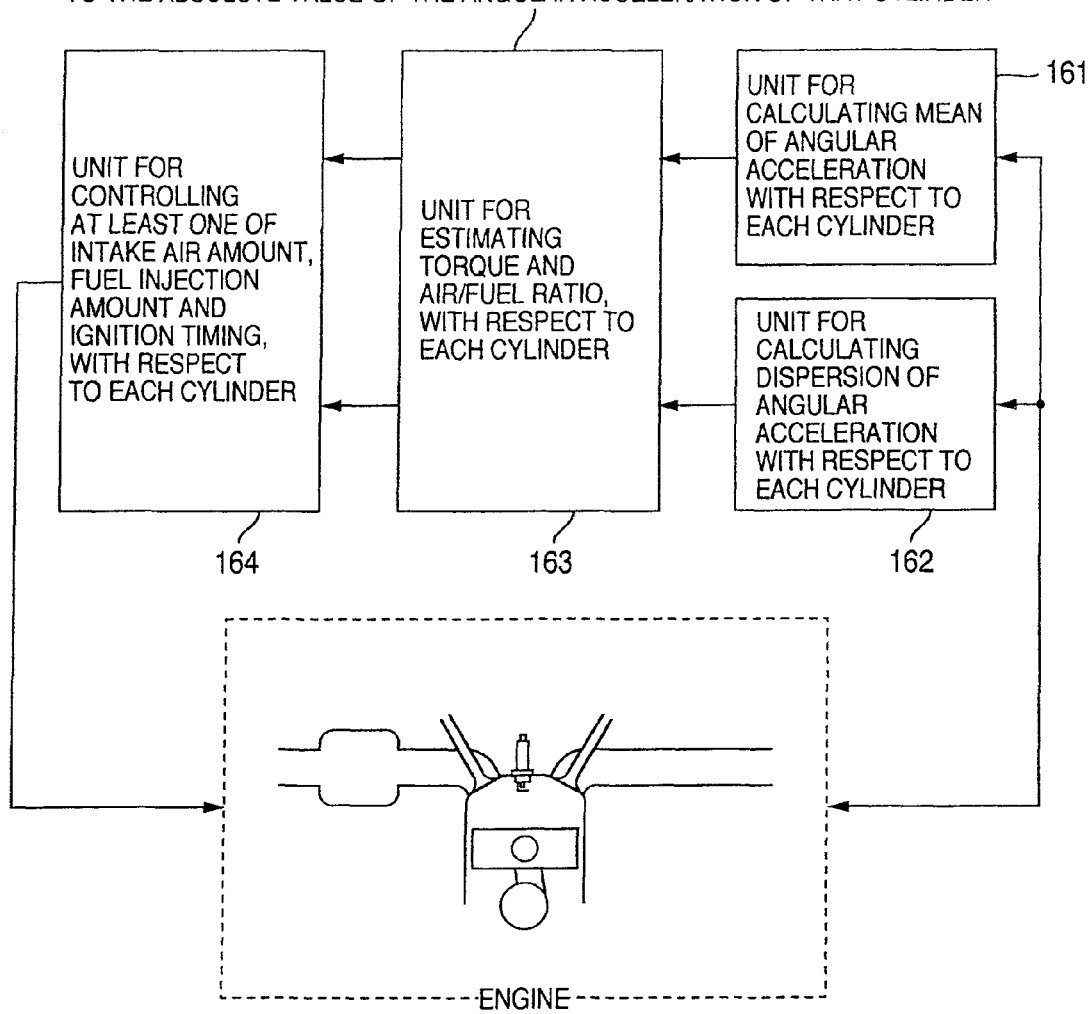
FIG. 11 shows in block diagram another engine control apparatus according to this invention.
Figure 12:
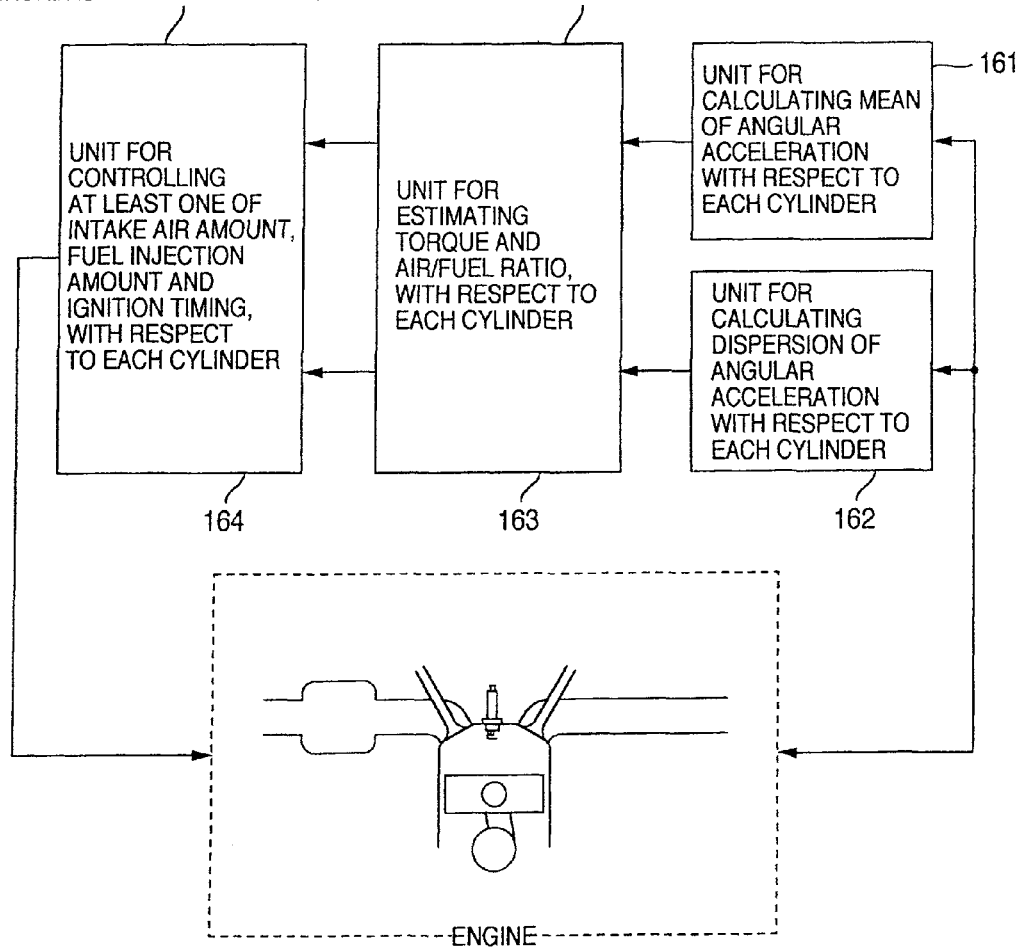
FIG. 12 shows in block diagram another engine control apparatus according to this invention.
Figure 13:
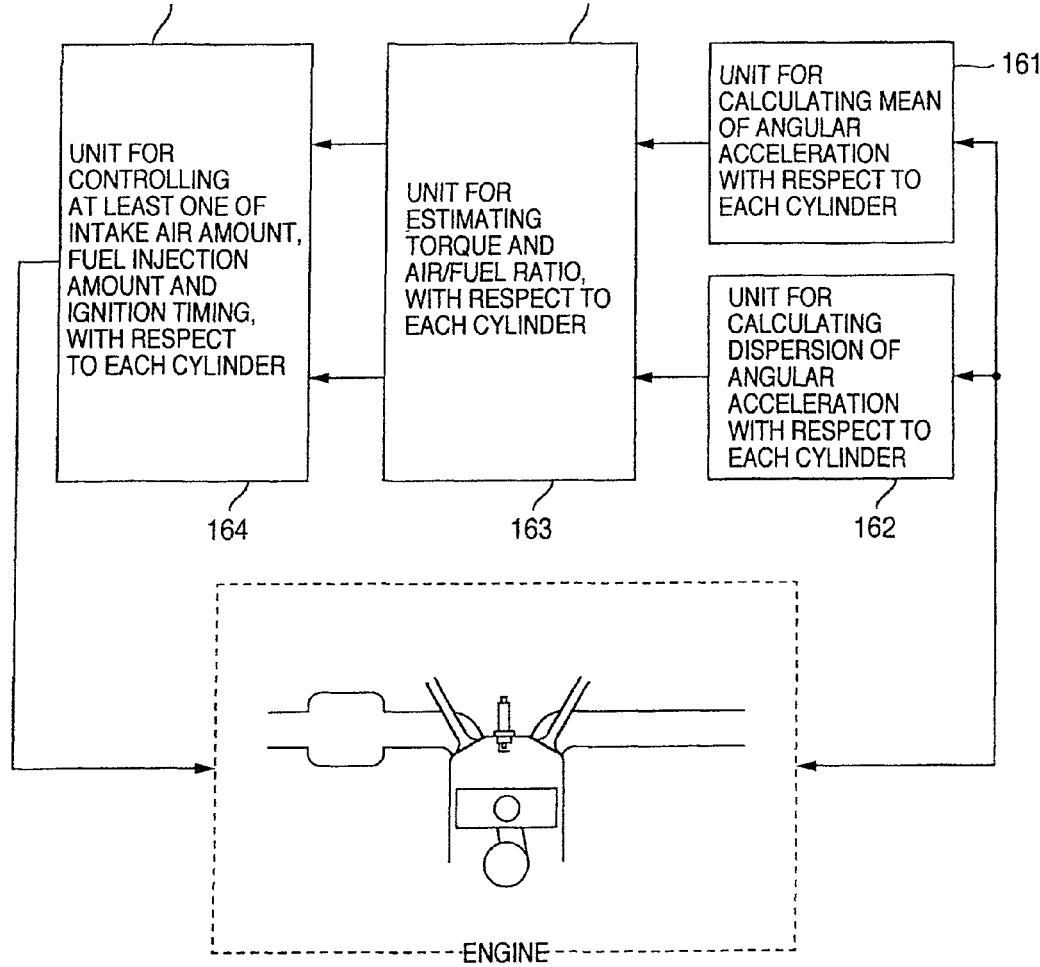
FIG. 13 shows in block diagram another engine control apparatus according to this invention.
Figure 14:
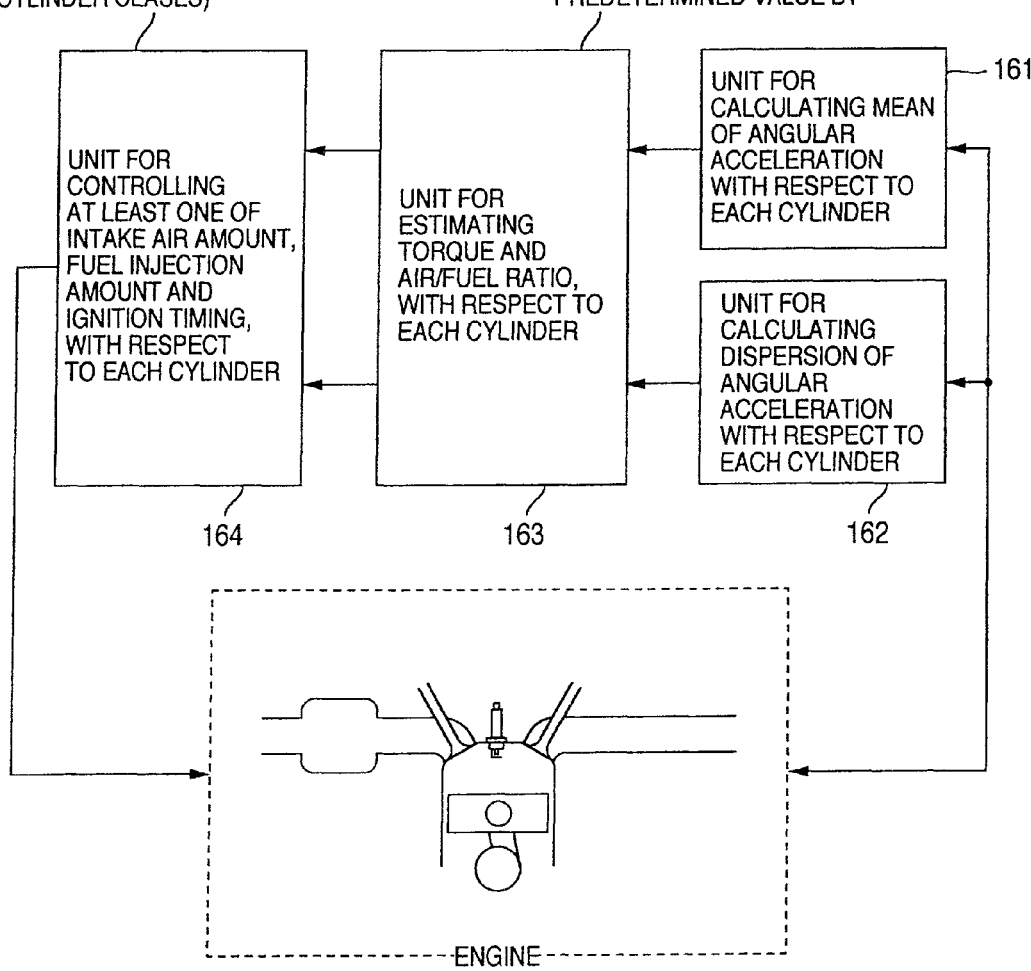
FIG. 14 shows in block diagram another engine control apparatus according to this invention.
Figure 15:
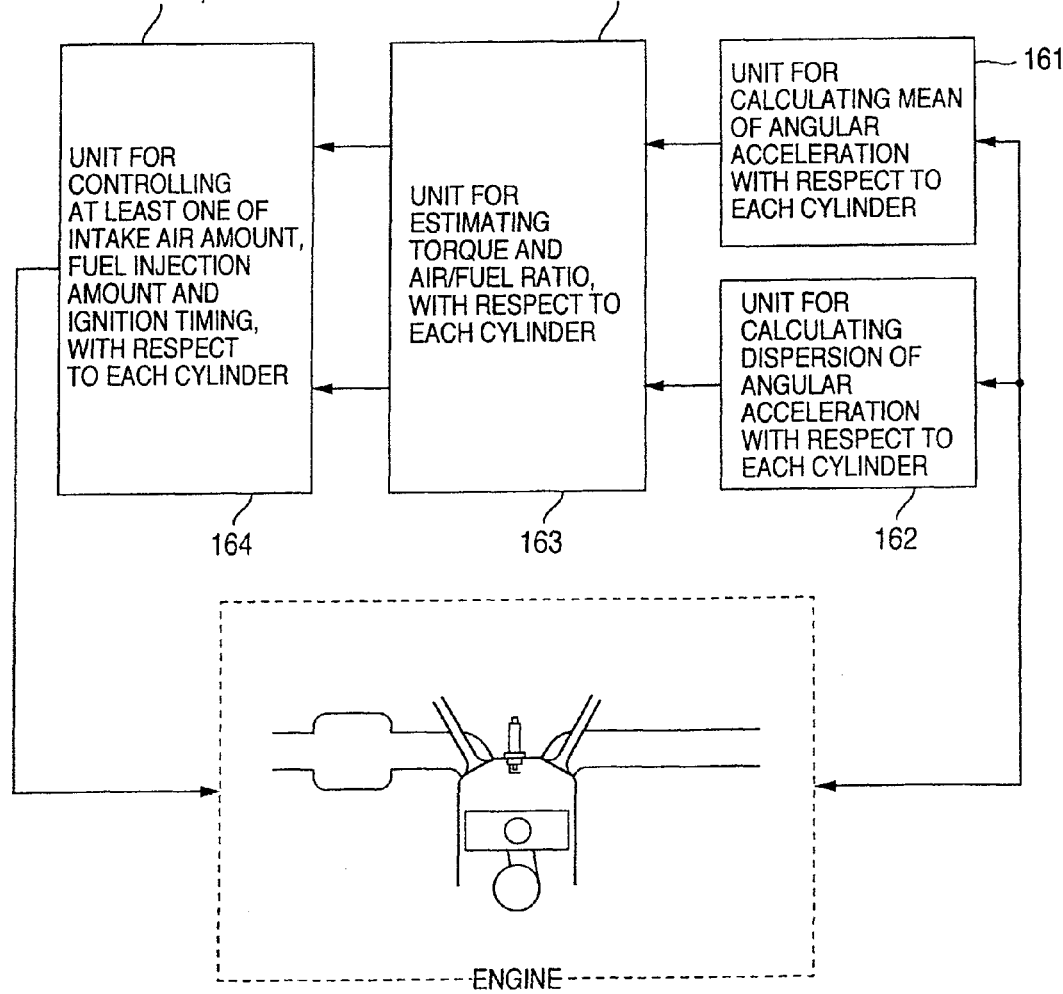
FIG. 15 shows in block diagram another engine control apparatus according to this invention.
Figure 19:
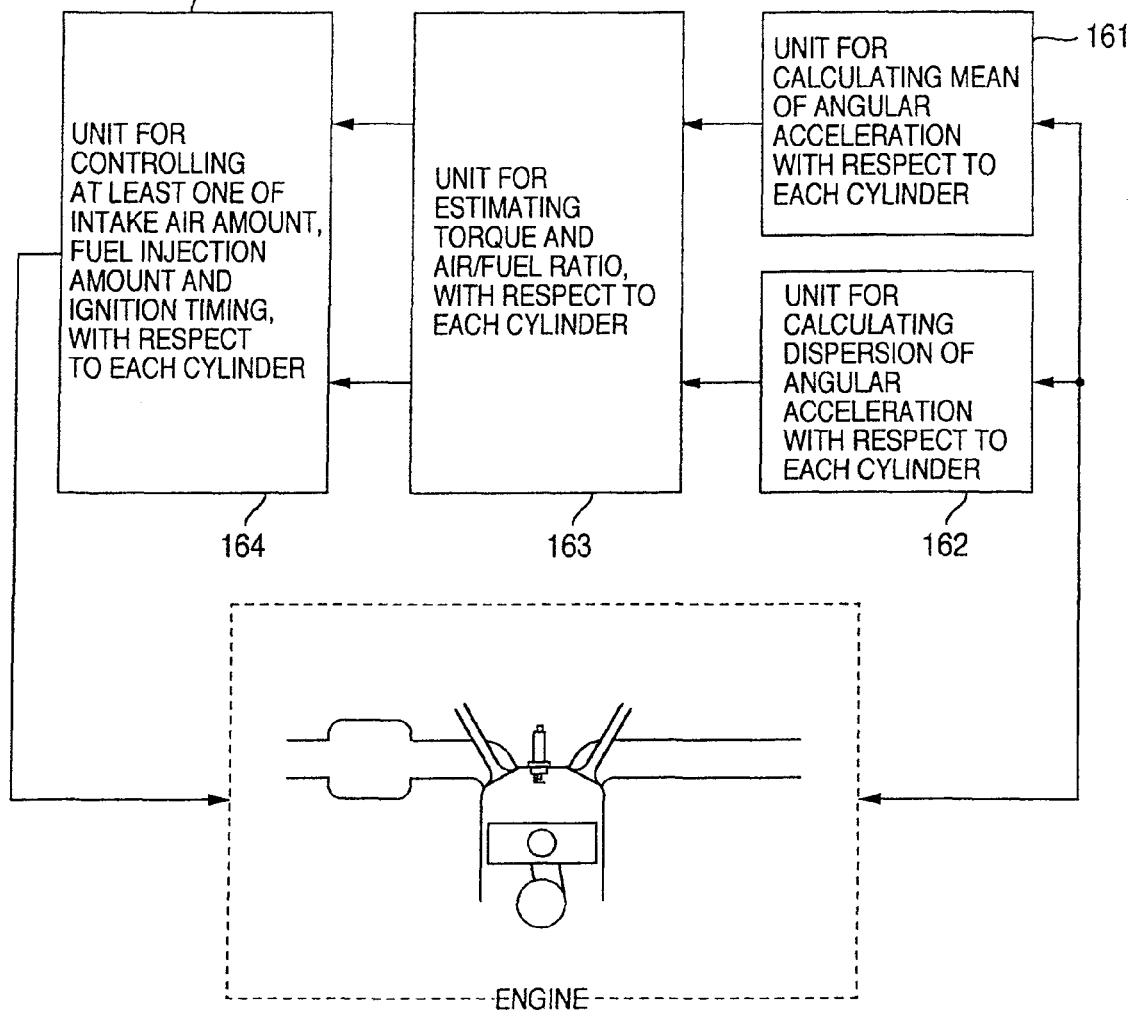
FIG. 19 shows in block diagram another engine control apparatus according to this invention.
Figure 20:
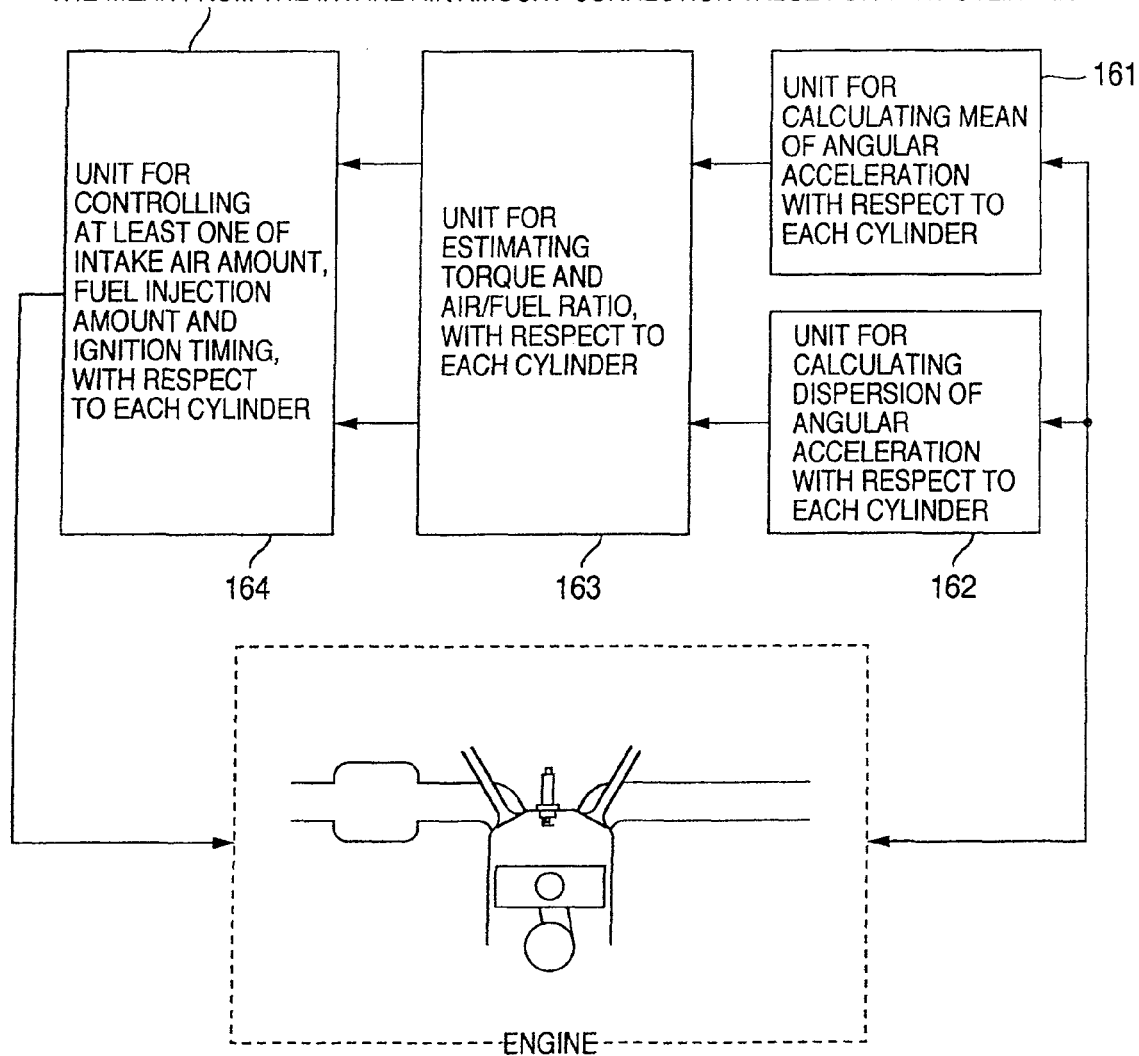
FIG. 20 shows in block diagram another engine control apparatus according to this invention.
Figure 21:
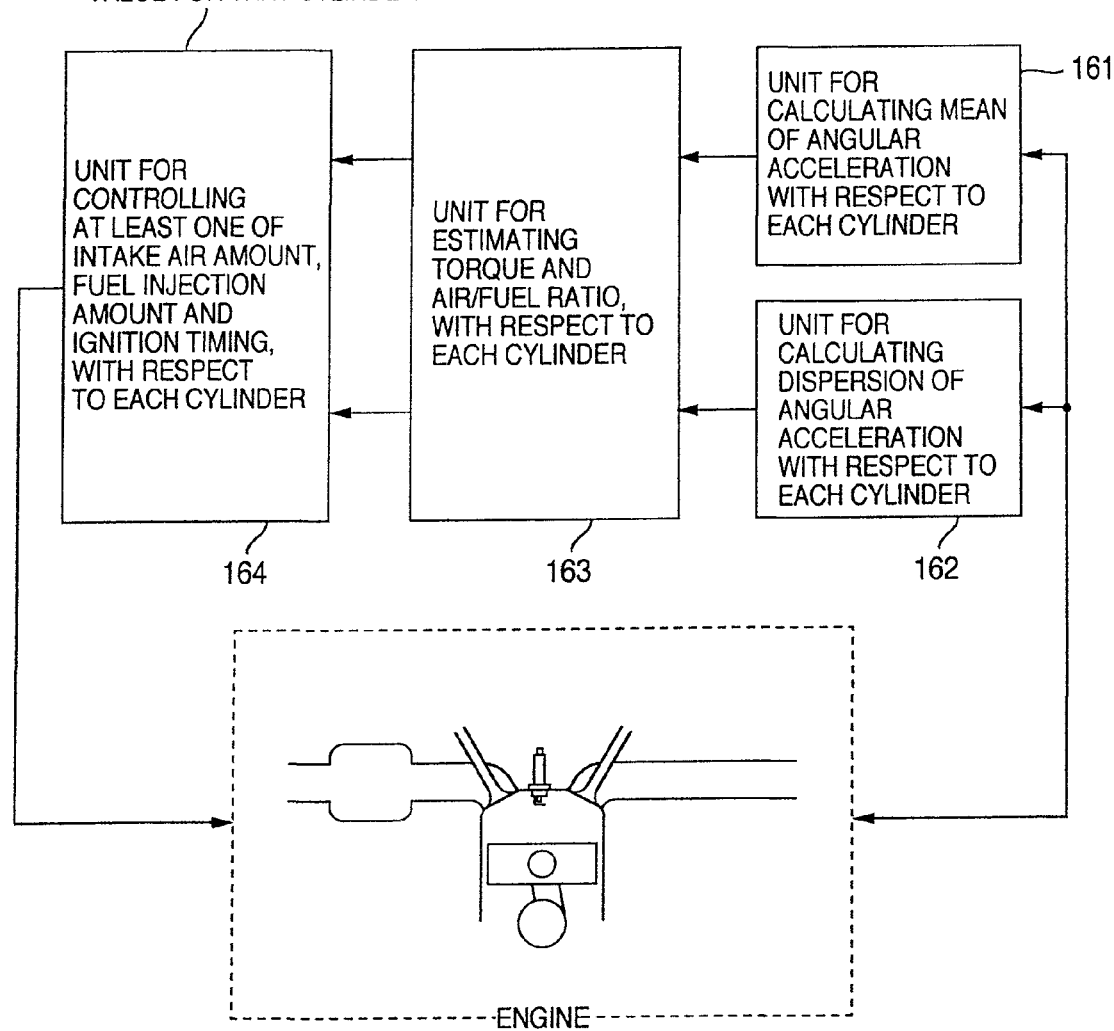
FIG. 21 shows in block diagram another engine control apparatus according to this invention.

In the second embodiment of this invention, the control of interest is performed during engine idling. As described with FIG. 11, the dispersion of the angular acceleration for each cylinder is obtained by processing the square of the absolute value of the acceleration with the weighted moving average method. Moreover, as shown with FIGS. 19 and 20, the drift components of the fuel injection amount correction value and the intake air amount correction value, for each cylinder are subjected to correction.

FIG. 22 schematically shows an engine control system according to another embodiment of this invention. Since this system is similar to the system described above as the first embodiment of this invention, the detailed description thereof is omitted. FIG. 23 schematically shows the internal structure of a control unit 16. Since the control unit 16 is the same as that described above in the first embodiment, its detailed description is omitted. FIG. 24 shows in block diagram an engine control system as a whole, which is the same as that described above in the first embodiment, and its detailed description is omitted. The details of the respective calculation sections will be described as follows.

[Basic Fuel Injection Amount Calculation Section (FIG. 25)]

This calculation section calculates the basic fuel injection amount (Tp0). The procedure of the calculation is specifically shown in FIG. 18. However, since the procedure is the same as that described above in the first embodiment, the detail thereof is omitted.

Figure 33:
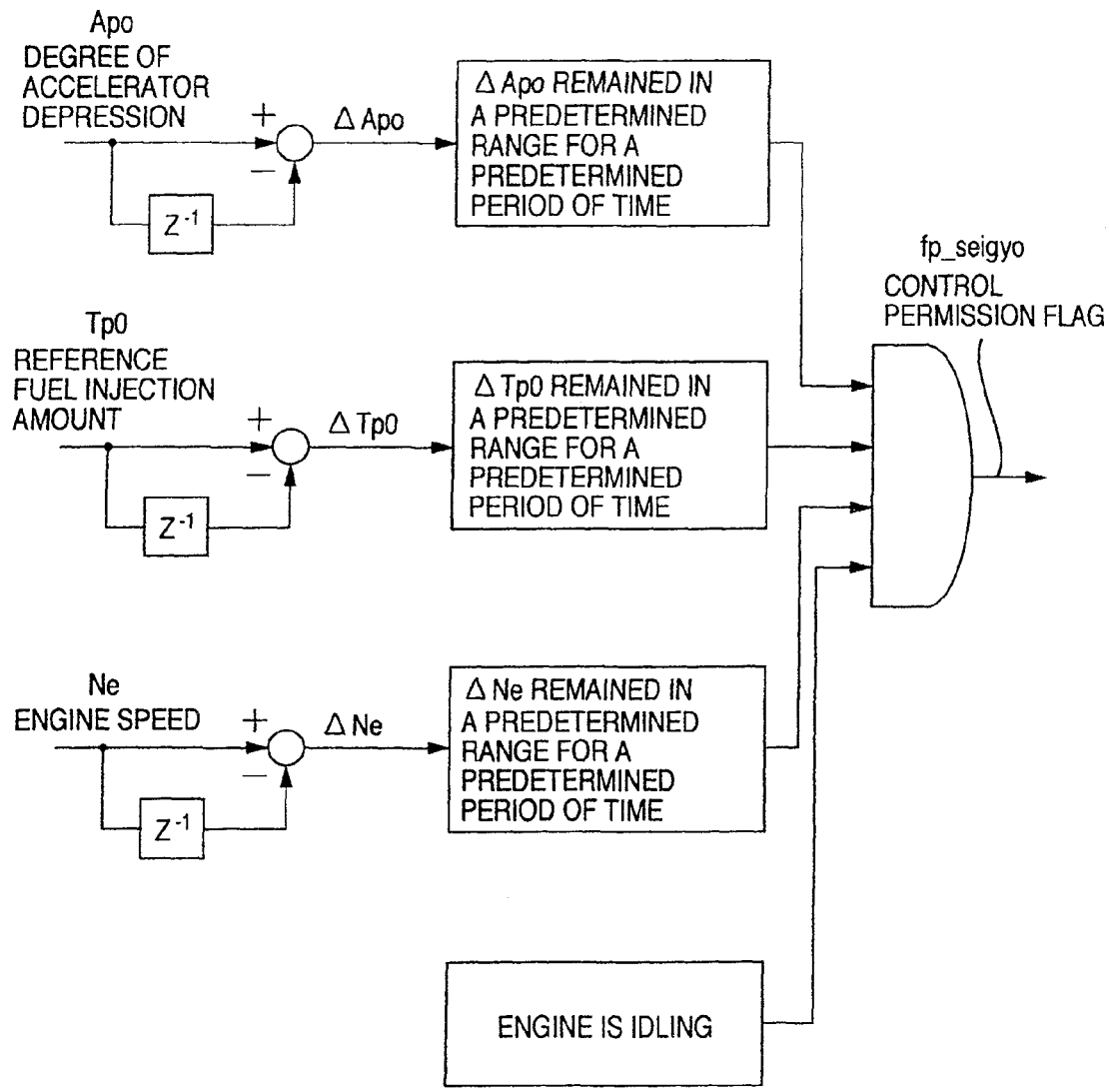
FIG. 33 shows in block diagram the control permission flag calculation section used in the second and third embodiments of this invention.

[Control Permission Flag Calculation Section (FIG. 33)]

This calculation section calculates the control permission flag (fp_seigyo). The procedure of the calculation is specifically shown in FIG. 33. The execution of control is permitted (i.e. fp_seigyo=1) if the difference (ΔApo) between the present and previous values of accelerator depression remains within a predetermined range for a predetermined period of time, if the difference (ΔTp0) between the present and previous values of the basic fuel injection amount remains within a predetermined range for a predetermined period of time, if the difference (ΔNe) between the present and previous values of engine rotational speed remains within a predetermined range for a predetermined period of time, and if the engine is idling.

[Per-Cylinder Angular Acceleration Characteristic Calculation Section (FIG. 34)]

Figure 34:
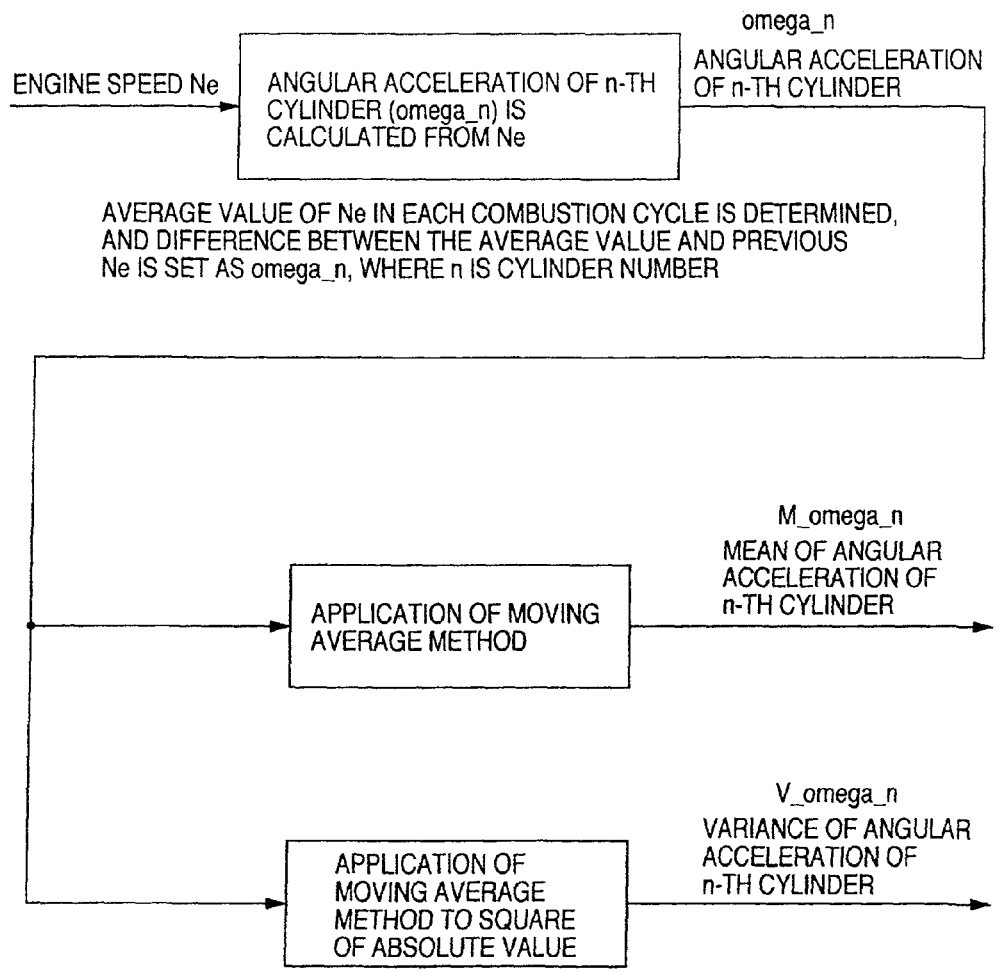
FIG. 34 shows in block diagram the per-cylinder angular acceleration characteristic calculation section used in the second and third embodiments of this invention.

This calculation section calculates the mean (M_omega_n (n: cylinder number)) and the variance (V_omega_n (n: cylinder number)) of the angular acceleration for each cylinder, representing the angular acceleration characteristic for each cylinder. The flow of calculation is as shown in FIG. 34. The angular acceleration (omega_n) of the n-th cylinder is obtained from the engine rotational speed (Ne). In more concrete terms, the mean of Ne is calculated every combustion cycle; the difference between the means for the current and previous cycles is termed omega_n; and the mean (M_omega_n) of the angular acceleration of the n-th cylinder is approximately obtained by applying the moving average procedure to (omega_n). Further, the variance (V_omega_n) of the angular acceleration of the n-th cylinder is obtained by processing the square of the absolute value of (omega_n) with the moving average procedure.

[Correction-Applicable Cylinder and Correction Direction Detection Section (FIG. 28)]

This calculation section consists of a "section for calculating both the information on the cylinder of which a mean value of the angular acceleration is minimum/maximum and the information on the cylinder of which the variance of the angular acceleration is maximum" and a "correction-applicable cylinder and correction direction detection section 2". These calculation sections are the same in structure as those described above in the first embodiment. The details of the respective calculation sections will be described in the following.

[Section for Calculating Both the Information on the Cylinder of which a Mean Value of the Angular Acceleration is Minimum/Maximum and the Information on the Cylinder of which Variance of the Angular Acceleration is Maximum (FIG. 29)]

Figure 35:
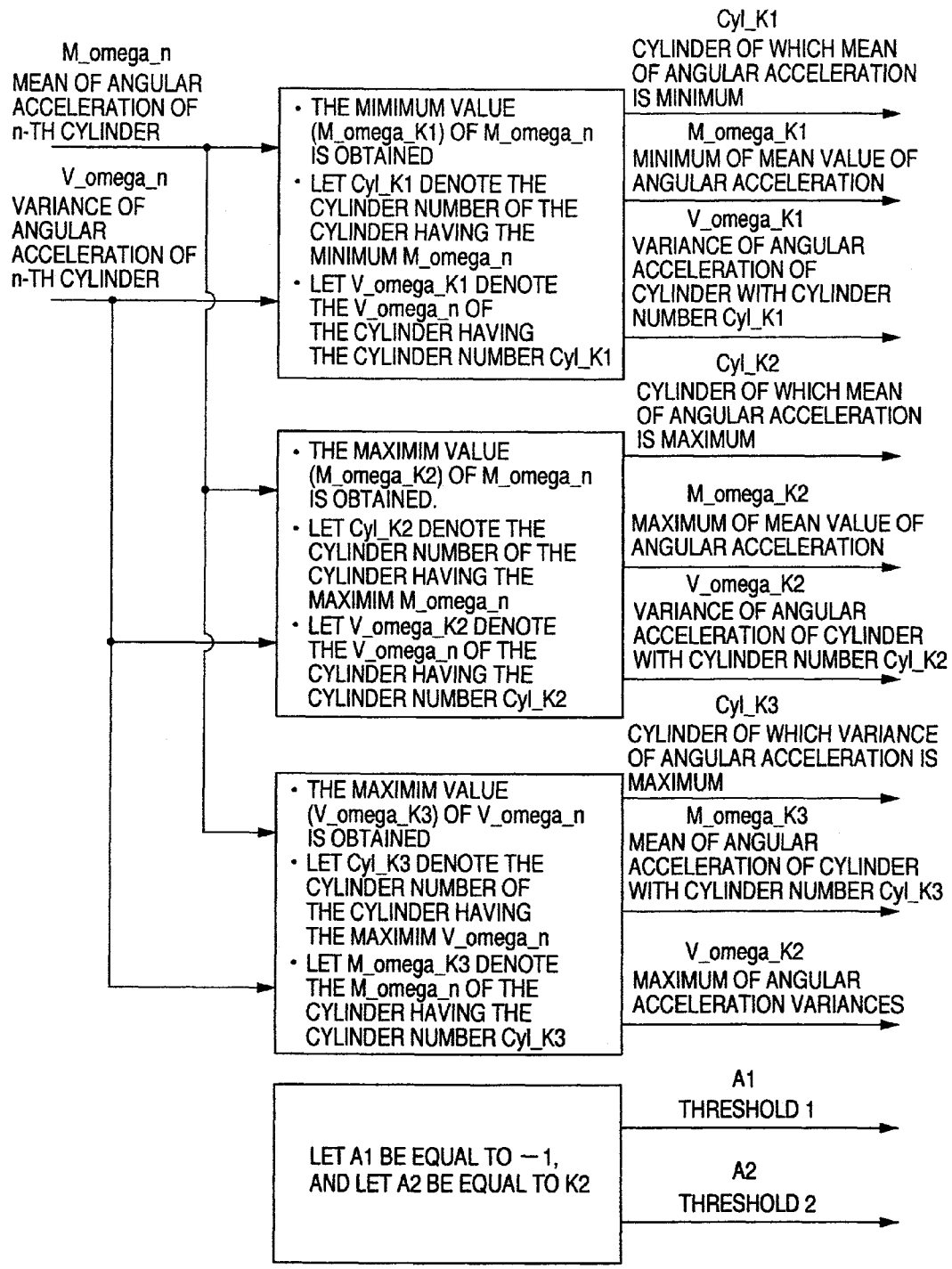
FIG. 35 shows in block diagram the section for calculating the information on the cylinder a mean value of the angular acceleration of which is minimum/maximum and the information on the cylinder the dispersion of the angular acceleration of which is maximum, the section being used in the second and third embodiments of this invention.

This calculation section calculates both the information on the cylinder of which a mean value of the angular acceleration is minimum/maximum and the information on the cylinder of which the variance of the angular acceleration is maximum. The details are shown in FIG. 35:

- The minimum value (M_omega_K1) of M_omega_n is obtained. Let Cyl_K1 denote the cylinder number of the cylinder having the minimum M_omega_n, and let V_omega_K1 denote the V_omega_n of the cylinder having the cylinder number Cyl_K1.
- The maximum value (M_omega_K2) of M_omega_n is obtained. Let Cyl_K2 denote the cylinder number of the cylinder having the maximum M_omega_n, and let V_omega_K2 denote the V_omega_n of the cylinder having the cylinder number Cyl_K2.
- The maximum value (V_omega_K3) of V_omega_n is obtained. Let Cyl_K3 denote the cylinder number of the cylinder having the maximum V_omega_n, and let M_omega_K3 denote the M_omega_n of the cylinder having the cylinder number Cyl_K3.
- Let A1 be equal to −1, and let A2 be equal to K2. That is, let the mean of M_omega_n be 0.

[Correction-Applicable Cylinder and Correction Direction Detection Section (FIG. 30)]

This detection section detects the correction-applicable cylinder and the correction direction. The procedure of the detection is as shown in FIG. 30. The detection section is the same in structure as that described above in the first embodiment, and therefore the detail thereof is omitted.

[Per-Cylinder Fuel Injection Amount Correction Value Calculation Section (FIG. 36)]

Figure 36:
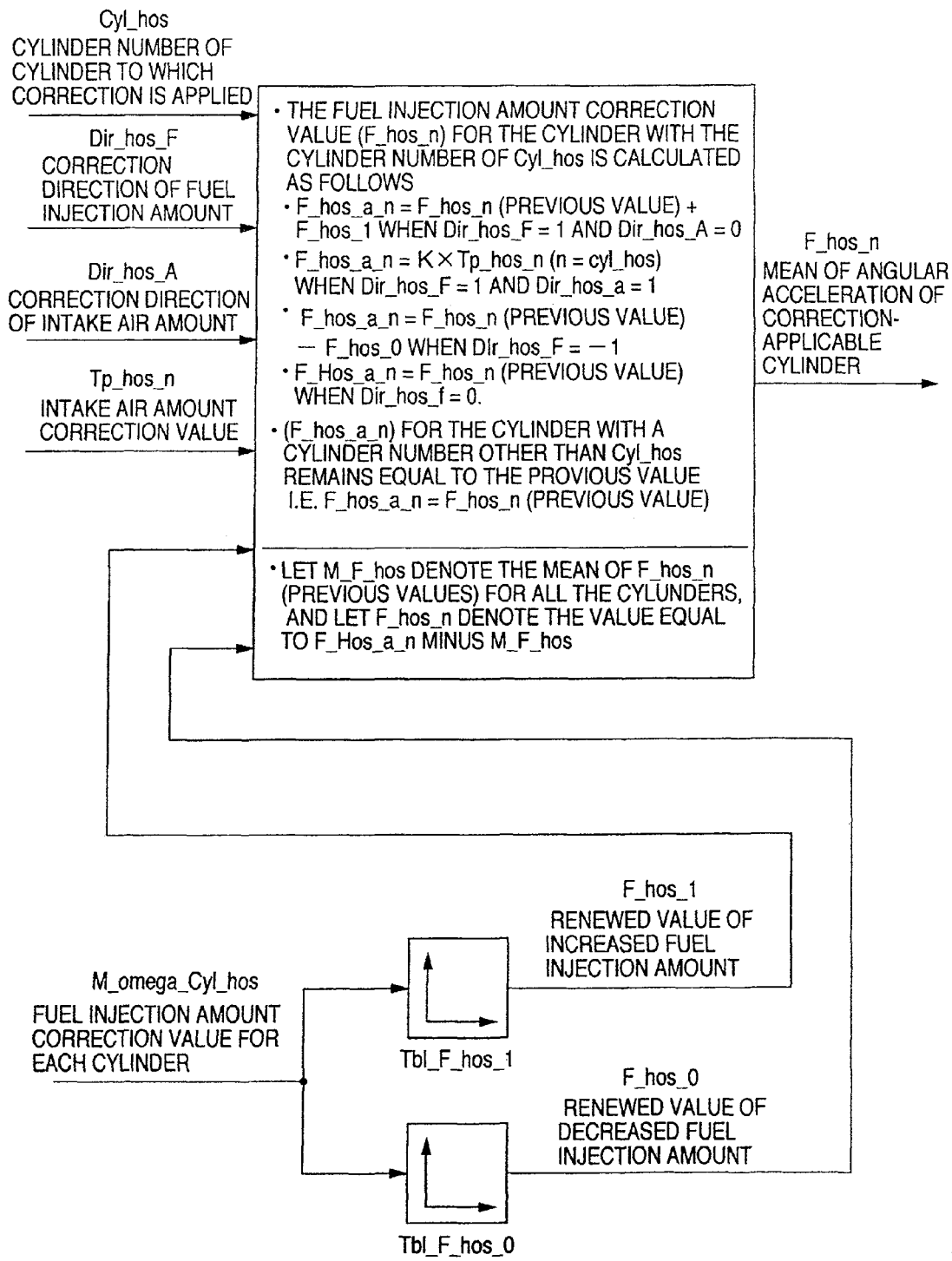
FIG. 36 shows in block diagram the per-cylinder fuel injection amount correction value calculation section used in the second embodiment of this invention.

This calculation section calculates the fuel injection amount correction value (F_hos_n) for each cylinder. The details are shown in FIG. 36: the fuel injection amount correction value (F_hos_n) for the cylinder with the cylinder number of Cyl_hos is calculated as follows.

$$F\_hos\_a\_n = F\_hos\_n(\text{previous value}) + F\_hos\_1$$
when Dir_hos_F=1 and Dir_hos_A=0.

$$F\_hos\_a\_n = K \times Tp\_hos\_n(n=Cyl\_hos) \text{ when}$$
Dir_hos_F=1 and Dir_hos_A=1.

$$F\_hos\_a\_n = F\_hos\_n(\text{previous value}) - F\_hos\_0$$
when Dir_hos_F=−1.

$$F\_hos\_a\_n = F\_hos\_n(\text{previous value}) \text{ when Dir\_hos\_F}=0.$$

(F_hos_a_n) for the cylinder with a cylinder number other than Cyl_hos remains equal to the previous value, i.e. F_hos_a_n=F_hos_n (previous value).

Let M_F_hos denote the mean of F_hos_n (previous values) for all the cylinders, and let F_hos_n denote the value equal to F_hos_a_n minus M_F_hos. This process is equivalent to the correction of drift component.

The renewed value (F_hos_1) of increased fuel injection amount is obtained from M_omega_Cyl_hos by referring to the table value (Tbl_F_hos_1). The renewed value (F_hos_0) of decreased fuel injection amount is obtained from M_omega_Cyl_hos by referring to the table value (Tbl_F_hos_0). The values obtained by referring to the table are determined depending on how much fuel injection amount should be corrected per one renewal with respect to the magnitude (decreased or increased amount) of a mean value of the angular acceleration.

[Per-Cylinder Intake Air Amount Correction Value Calculation Section (FIG. 37)]

Figure 37:
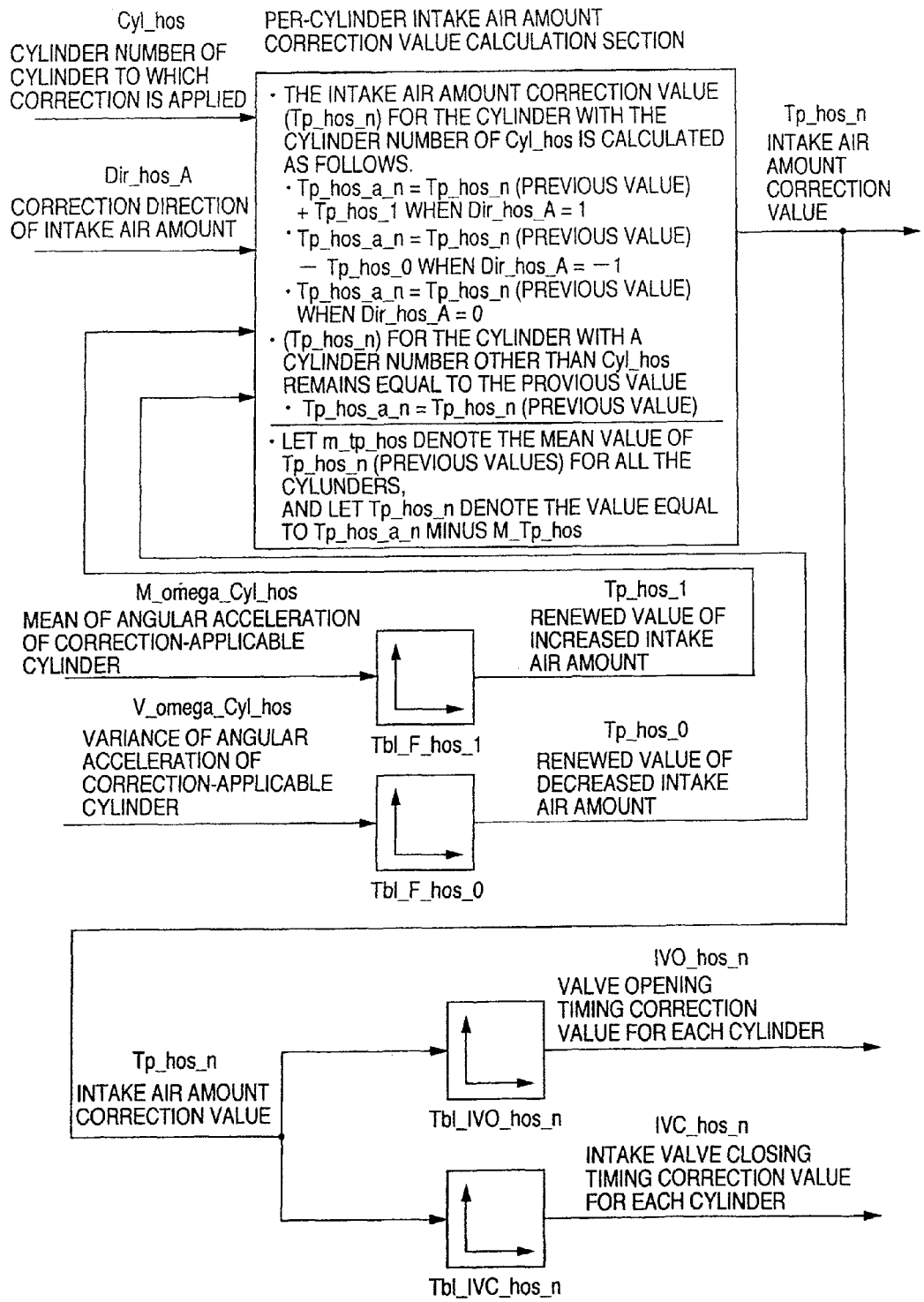
FIG. 37 shows in block diagram the per-cylinder intake air amount correction value calculation section used in the second embodiment of this invention.

This calculation section calculates the intake air amount correction value (Tp_hos_n) for each cylinder. The details are shown in FIG. 37: the intake air amount correction value (Tp_hos_n) for the cylinder with the cylinder number of Cyl_hos is calculated as follows.

$$Tp\_hos\_a\_n = Tp\_hos\_n(\text{previous value}) + Tp\_hos\_1 \text{ when Dir\_hos\_A}=1.$$

$$Tp\_hos\_a\_n = Tp\_hos\_n(\text{previous value}) - Tp\_hos\_0 \text{ when Dir\_hos\_A}=1.$$

$$Tp\_hos\_a\_n = Tp\_hos\_n(\text{previous value}) \text{ when Dir\_hos\_A}=0.$$

(Tp_hos_n) for the cylinder with a cylinder number other than Cyl_hos remains equal to the previous value, i.e. Tp_hos_a_n=Tp_hos_n (previous value).

The intake air valve opening time correction value (IVO_hos_n) for each cylinder is calculated from Tp_hos_n by referring to the table value (Tbl_IVO_hos_n).

The intake air valve closing time correction value (IVC_hos_n) for each cylinder is calculated from Tp_hos_n by referring to the table value (Tbl_IVC_hos_n).

Let M_Tp_hos denote the mean of Tp_hos_n (previous values) for all the cylinders, and let Tp_hos_n denote the value equal to Tp_hos_a_n minus M_Tp_hos. This process is equivalent to the correction of drift component.

Further, the renewed value (Tp_hos_0) of increased intake air amount is obtained from M_omega_Cyl_hos by referring to the table value (Tbl_Fp_hos_0). The renewed value (Tp_hos_0) of decreased intake air amount is obtained from V_omega_Cyl_hos by referring to the table value (Tbl_Tp_hos_0). The values obtained by referring to the table are determined depending on how much intake air amount should be corrected per one renewal with respect to the magnitude (decreased or increased amount) of a mean value of the angular acceleration. Moreover, the table values (Tbl_IVO_hos_n) and (Tbl_IVC_hos_n) are determined depending on what degrees the timings of opening and closing the fuel injection valve should be corrected to. The engine operating conditions such as rotational speed and intake air pressure may be referred to for the determination of those values.

Embodiment 3

Figure 16:
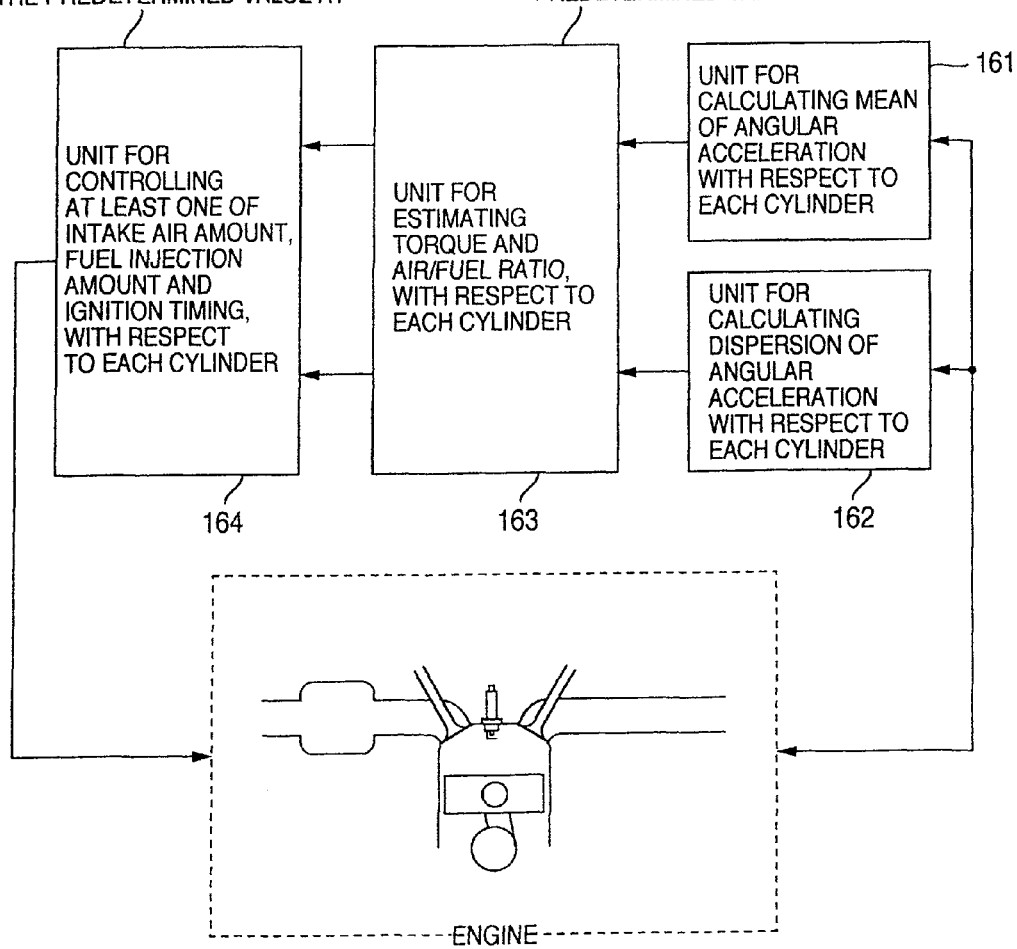
FIG. 16 shows in block diagram another engine control apparatus according to this invention.
Figure 17:
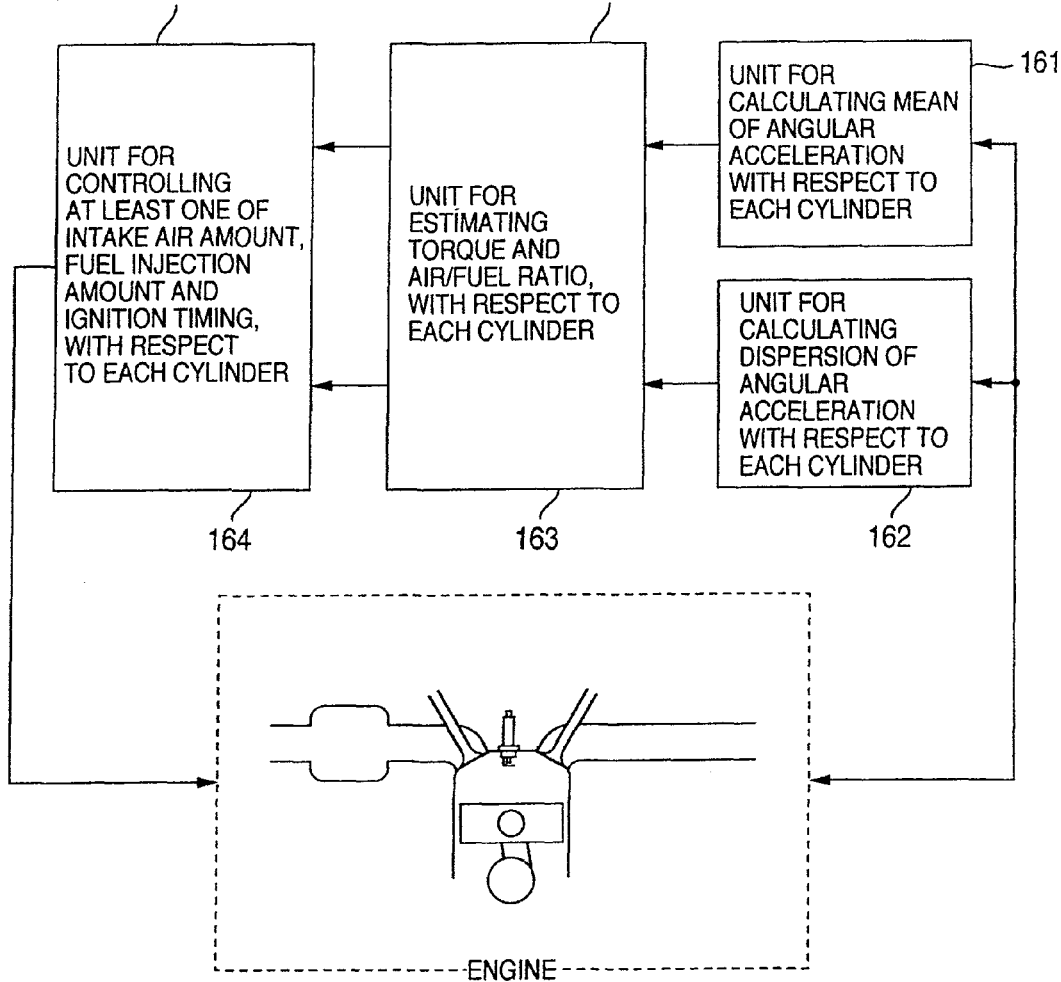
FIG. 17 shows in block diagram another engine control apparatus according to this invention.

This embodiment considers the control through the correction of ignition timing as described with FIGS. 16 and 17.

Figure 38:
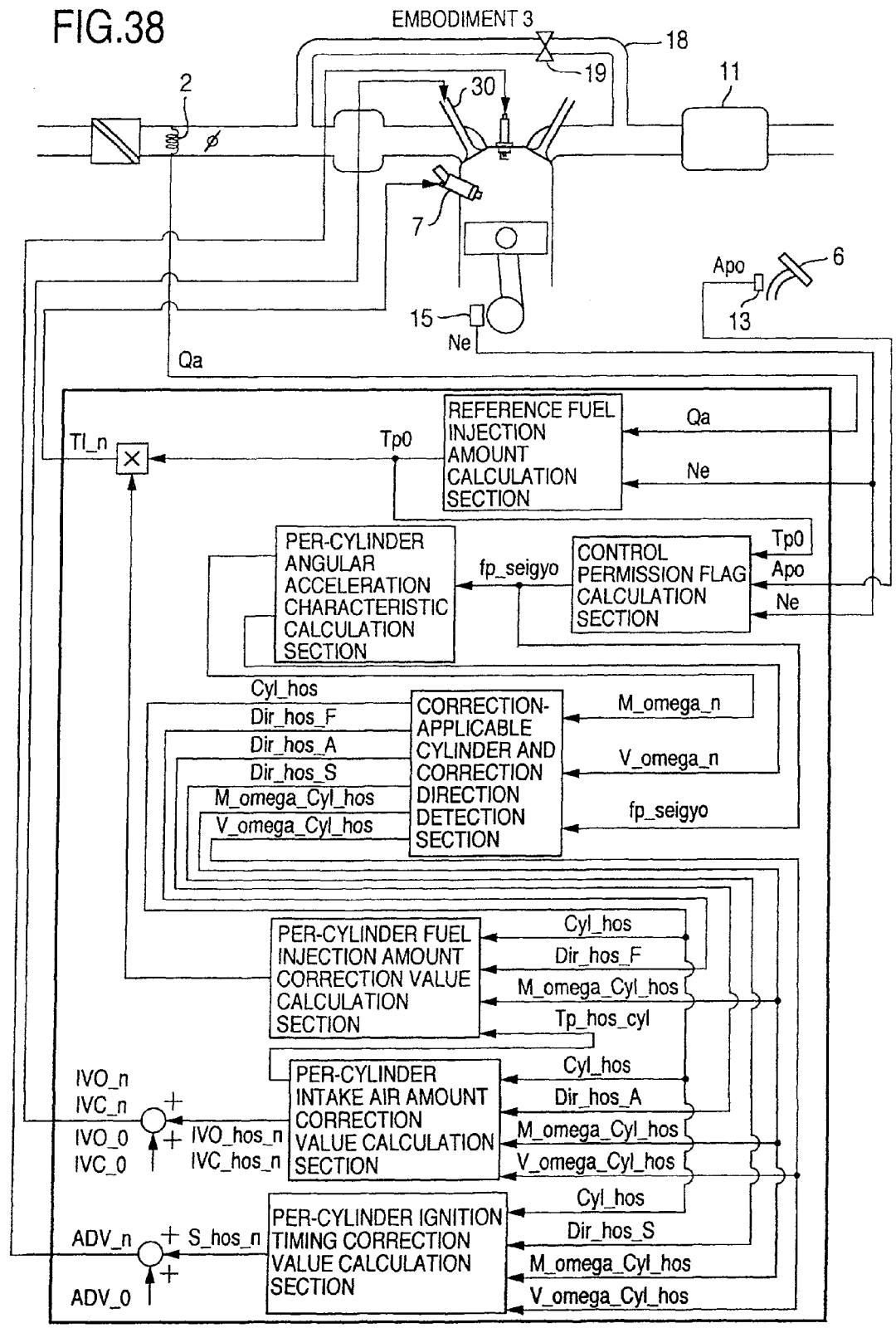
FIG. 38 shows in block diagram the entire control system used in the third embodiment of this invention.

FIG. 22 schematically shows an engine control system according to the third embodiment of this invention. Since this system is similar to the system described above as the first embodiment of this invention, the detailed description thereof is omitted. FIG. 23 schematically shows the internal structure of a control unit 16. Since the control unit 16 is the same as that described above in the first embodiment, its detailed description is omitted. FIG. 38 shows in block diagram an engine control system as a whole, which is the same as that described above in the first or second embodiment, except the addition of a per-cylinder ignition timing correction value calculation section. The ignition timing correction values (S_hos_n) for the respective cylinders are calculated on the basis of the parameters calculated by the correction-applicable cylinder and correction direction detection section. As shown in FIG. 38, S_hos_n is the correction amount added to the reference ignition timing (ADV0). Various procedures for calculating ADV0 have hitherto been proposed and since those procedures are not directly related to this invention, their details are not explained here. The detailed description of the respective calculation sections will be given below.

[Basic Fuel Injection Amount Calculation Section (FIG. 25)]

This calculation section calculates the basic fuel injection amount (Tp0). The procedure of the calculation is specifically shown in FIG. 18. However, since the procedure is the same as that described above in the first embodiment, the detail thereof is not explained.

[Control Permission Flag Calculation Section (FIG. 33)]

This calculation section calculates the control permission flag (fp_seigyo). The procedure of the calculation is specifically shown in FIG. 33. However, since the procedure is the same as that described above in the second embodiment, the detail thereof is not explained.

[Per-Cylinder Angular Acceleration Characteristic Calculation Section (FIG. 34)]

This calculation section calculates the mean (M_omega_n (n: cylinder number)) and the variance (V_omega_n (n: cylinder number)) of the angular acceleration for each cylinder representative of the angular acceleration characteristic of each cylinder. The flow of calculation is as shown in FIG. 34. However, since the flow of calculation is the same as that described above in the second embodiment, the detail thereof is not explained.

Figure 39:
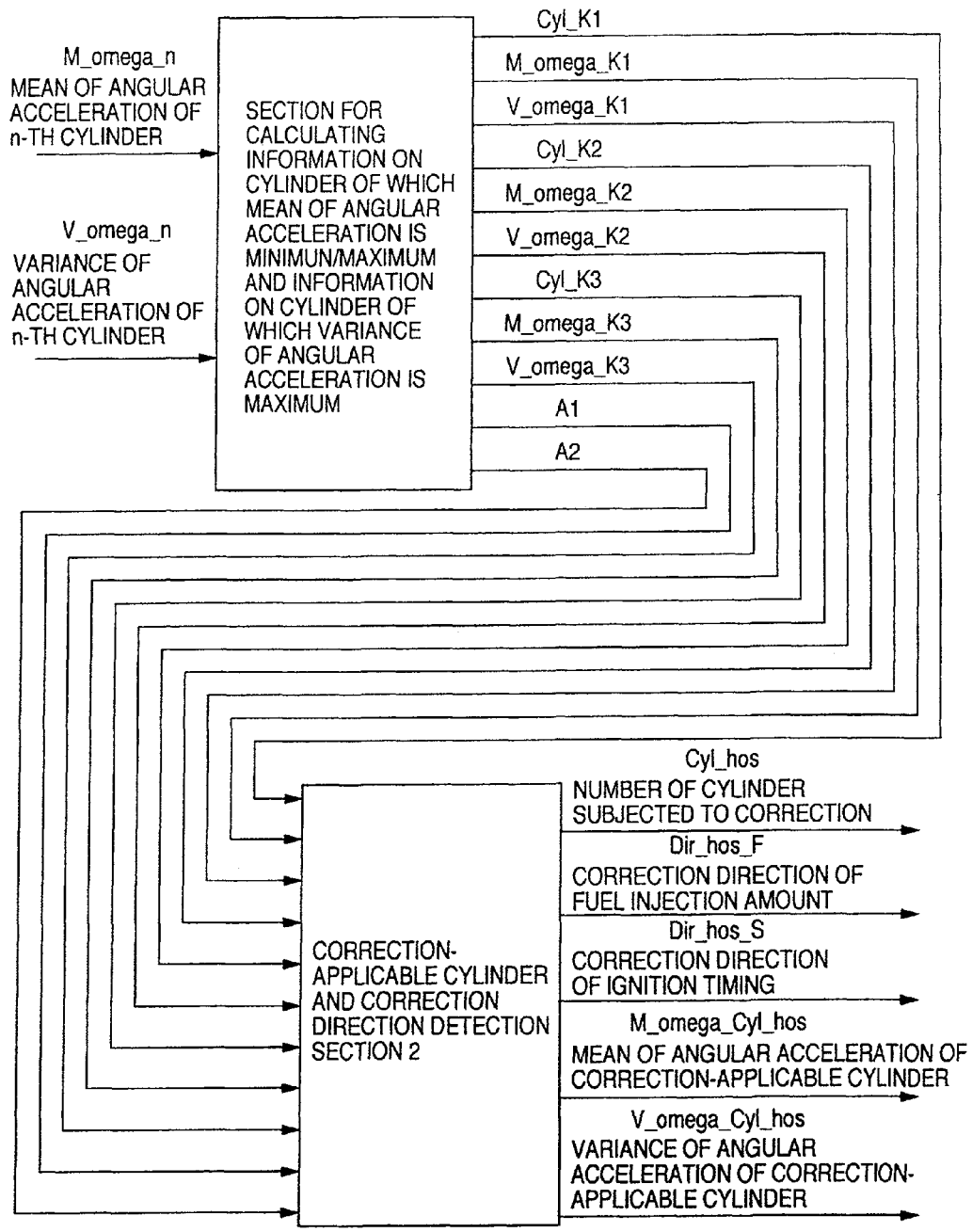
FIG. 39 shows in block diagram the correction-applicable cylinder and correction direction detection section used in the third embodiment of this invention.

[Correction-Applicable Cylinder and Correction Direction Detection Section (FIG. 39)]

This calculation section consists of a "section for calculating both the information on the cylinder of which a mean value of the angular acceleration is minimum/maximum and the information on the cylinder of which the variance of the angular acceleration is maximum" and a "correction-applicable cylinder and correction direction detection section 2".

[Section for Calculating both the Information on the Cylinder of which a Mean Value of the Angular Acceleration is Minimum/Maximum and the Information on the Cylinder of which the Variance of the Angular Acceleration is Maximum (FIG. 35)]

This calculation section calculates both the information on the cylinder of which a mean value of the angular acceleration is minimum/maximum and the information on the cylinder of which the variance of the angular acceleration is maximum. The flow of calculation is shown in FIG. 35. However, since the calculation section is the same as that described above in the second embodiment, the detail thereof is not explained.

[Correction-Applicable Cylinder and Correction Direction Detection Section 2 (FIG. 40)]

Figure 40:
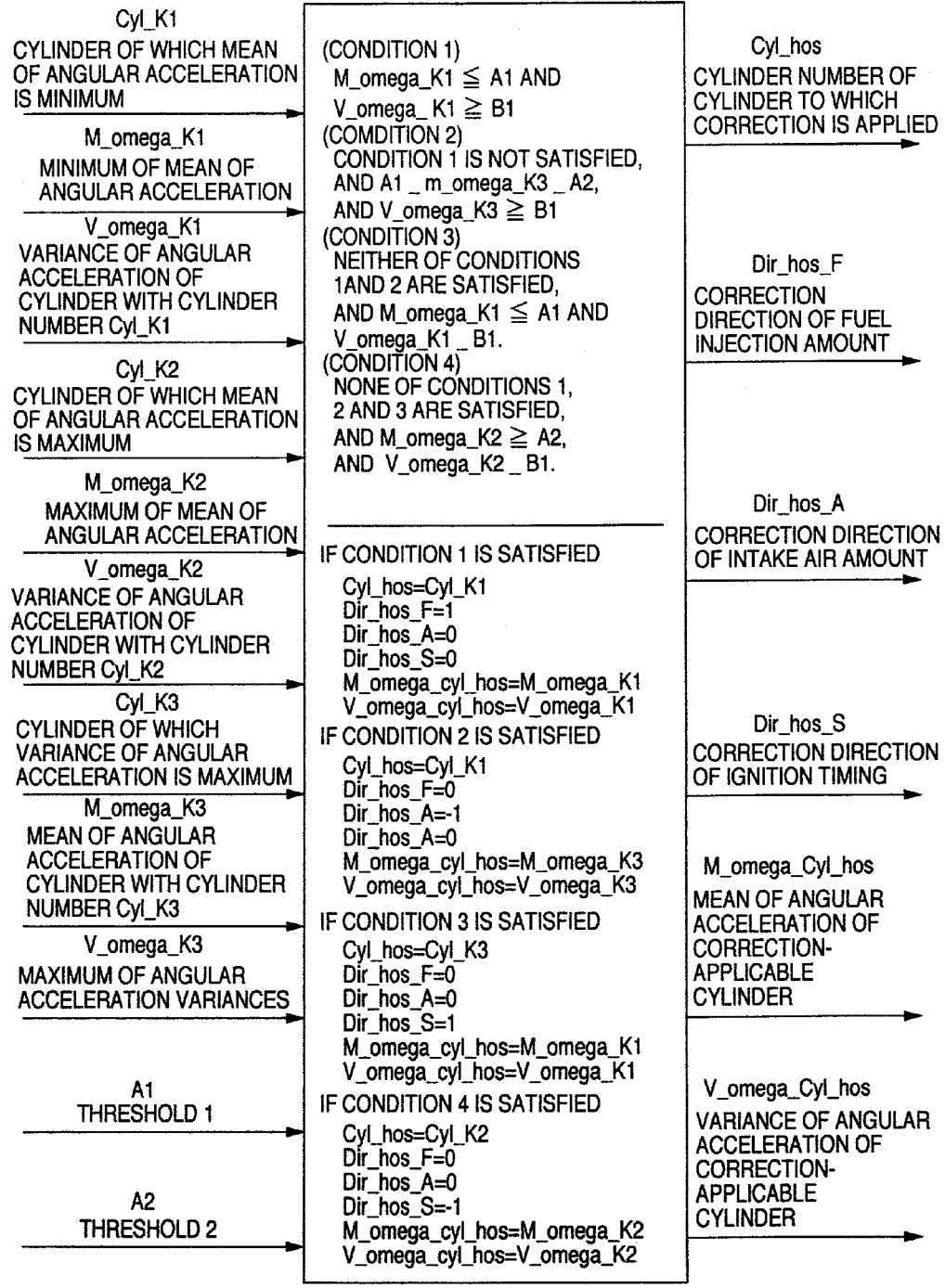
FIG. 40 shows in block diagram the correction-applicable cylinder and correction direction detection section used in the third embodiment of this invention.

This detection section detects the correction-applicable cylinders and the correction directions. The details are shown in FIG. 40.

$M\_omega\_K1 \leq A1$ and $V\_omega\_K1 \geq B1$.  [Condition 1]

Condition 1 is not satisfied, and $A1 < M\_omega\_K3 < A2$, and $V\_omega\_K3 \geq B1$.  [Condition 2]

Neither of Conditions 1 and 2 are satisfied, and $M\_omega\_K1 \leq A1$ and $V\_omega\_K1 < B1$.  [Condition 3]

None of Conditions 1, 2 and 3 are satisfied, and $M\_omega\_K2 \geq A2$, and $V\_omega\_K2 < B1$.  [Condition 4]

If Condition 1 is satisfied, then Cyl_hos=Cyl_K1, Dir_hos_F=1, Dir_hos_A=0, Dir_hos_S=0, M_omega_cyl_hos=M_omega_K1, and V_omega_cyl_hos=V_omega_K1.

If Condition 2 is satisfied, then Cyl_hos=Cyl_K1, Dir_hos_F=0, Dir_hos_A=−1, Dir_hos_S=0, M_omega_cyl_hos=M_omega_K3, and V_omega_cyl_hos=V_omega_K3.

If Condition 3 is satisfied, then Cyl_hos=Cyl_K3, Dir_hos_F=1, Dir_hos_A=1, Dir_hos_S=1, M_omega_cyl_hos=M_omega_K1, and V_omega_cyl_hos=V_omega_K1.

If Condition 4 is satisfied, then Cyl_hos=Cyl_K2, Dir_hos_F=−1, Dir_hos_A=0, Dir_hos_S=−1, M_omega_cyl_hos=M_omega_K2, and V_omega_cyl_hos=V_omega_K2.

When the correction direction flags (Dir_hos_F, Dir_hos_A) take the value of "1", correction is in the direction of increase. When they take the value of "−1", correction is in the direction of decrease. When they take the value of "0", no correction takes place. When the correction direction flag (Dir_hos_S) takes the value of "1", correction is in the direction of leading angle. When it takes the value of "−1", correction is in the direction of lagging angle. When it takes the value of "0", no correction takes place.

[Per-Cylinder Fuel Injection Amount Correction Value Calculation Section (FIG. 41)]

Figure 41:
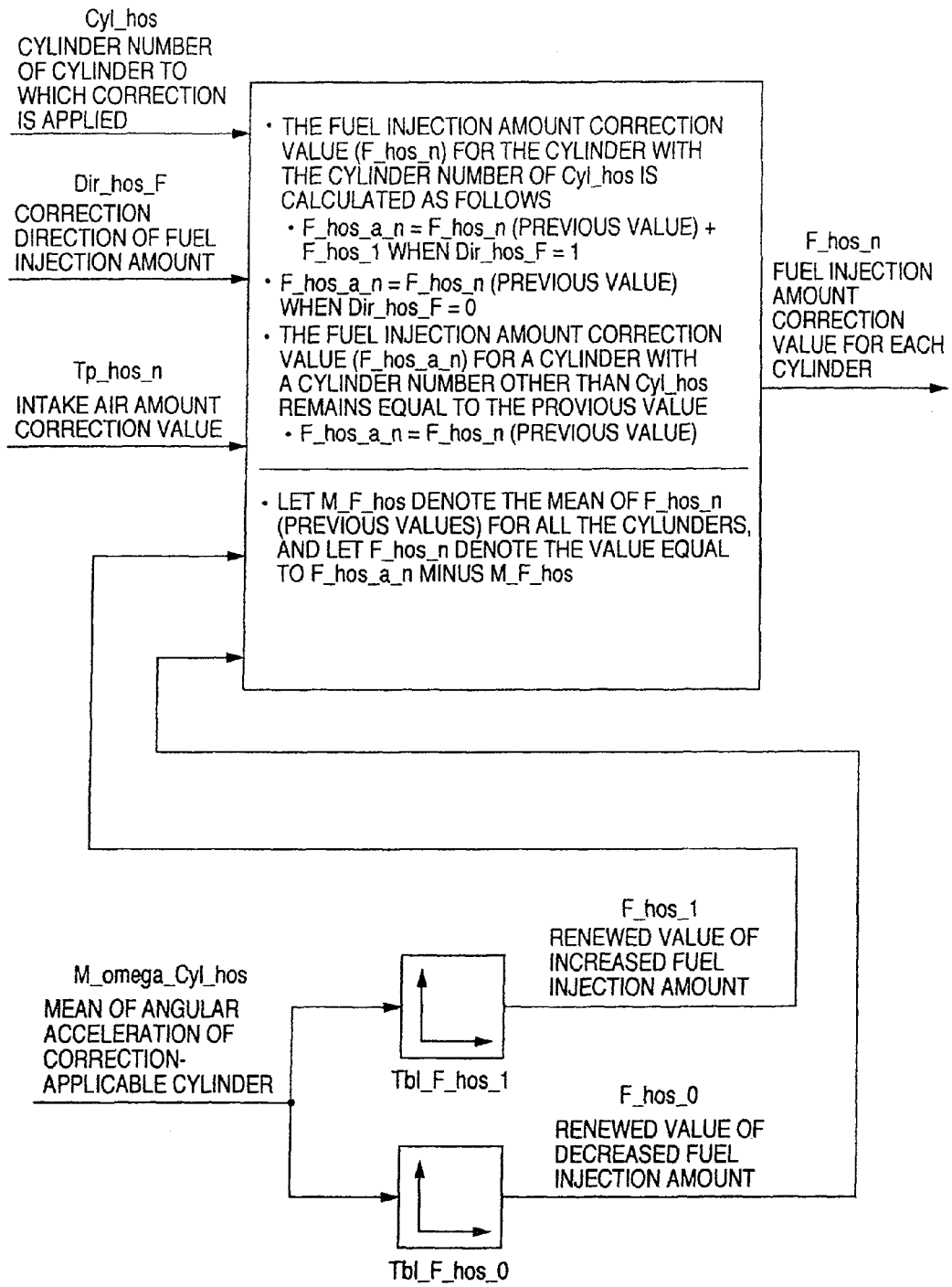
FIG. 41 shows in block diagram the per-cylinder fuel injection amount correction value calculation section used in the third embodiment of this invention.

This calculation section calculates the fuel injection amount correction value (F_hos_n) for each cylinder. The details are shown in FIG. 41: the fuel injection amount correction value (F_hos_n) for the cylinder with the cylinder number of Cyl_hos is calculated as follows.

$F\_hos\_a\_n = F\_hos\_n$(previous value)$+F\_hos\_1$ when Dir_$hos\_F=1$.

$F\_hos\_a\_n = F\_hos\_n$(previous value) when Dir_$hos\_F=0$.

The fuel injection amount correction value (F_hos_a_n) for a cylinder with a cylinder number other than Cyl_hos remains equal to the previous value, i.e. F_hos_a_n=F_hos_n (previous value).

Let M_F_hos denote the mean of F_hos_n (previous values) for all the cylinders, and let F_hos_n denote the value equal to F_hos_a_n minus M_F_hos. This process is equivalent to the correction of drift component.

[Per-Cylinder Intake Air Amount Correction Value Calculation Section (FIG. 42)]

This calculation section calculates the intake air amount correction value (Tp_hos_n) for each cylinder. The details are shown in FIG. 42: the intake air amount correction value (Tp_hos_n) for the cylinder with the cylinder number of Cyl_hos is calculated as follows.

$Tp\_hos\_a\_n = Tp\_hos\_n$(previous value)$-Tp\_hos\_0$ when Dir_$hos\_A=-1$.

$Tp\_hos\_a\_n = Tp\_hos\_n$(previous value) when Dir_$hos\_A=0$.

(Tp_hos_a_n) for the cylinder with a cylinder number other than Cyl_hos remains equal to the previous value, i.e. Tp_hos_a_n=Tp_hos_n (previous value).

The intake air valve opening timing correction value (IVO_hos_n) for each cylinder is calculated from Tp_hos_n by referring to the table value (Tbl_IVO_hos_n).

The intake air valve closing timing correction value (IVC_hos_n) for each cylinder is calculated from Tp_hos_n by referring to the table value (Tbl_IVC_hos_n).

Let M_Tp_hos denote the mean of F_hos_n (previous values) for all the cylinders, and let Tp_hos_n denote the value equal to Tp_hos_a_n minus M_Tp_hos. This process is equivalent to the correction of drift component.

Further, the renewed value (Tp_hos_1) of increased intake air amount is obtained from M_omega_Cyl_hos by referring to the table value (Tbl_Fp_hos_1). The renewed value (Tp_hos_0) of decreased intake air amount is obtained from V_omega_Cyl_hos by referring to the table value (Tbl_F_hos_0). The values obtained by referring to the table are determined depending on how much intake air amount should be corrected per one renewal with respect to the magnitude (decreased or increased amount) of a mean value of the angular acceleration. Moreover, the table values (Tbl_IVO_hos_n) and (Tbl_IVC_hos_n) are determined depending on what degrees the timings of opening and closing the fuel injection valve should be corrected to. The engine operating conditions such as rotational speed and intake air pressure may be referred to for the determination of those values.

[Ignition Timing Correction Value Calculation Section (FIG. 43)]

Figure 43:
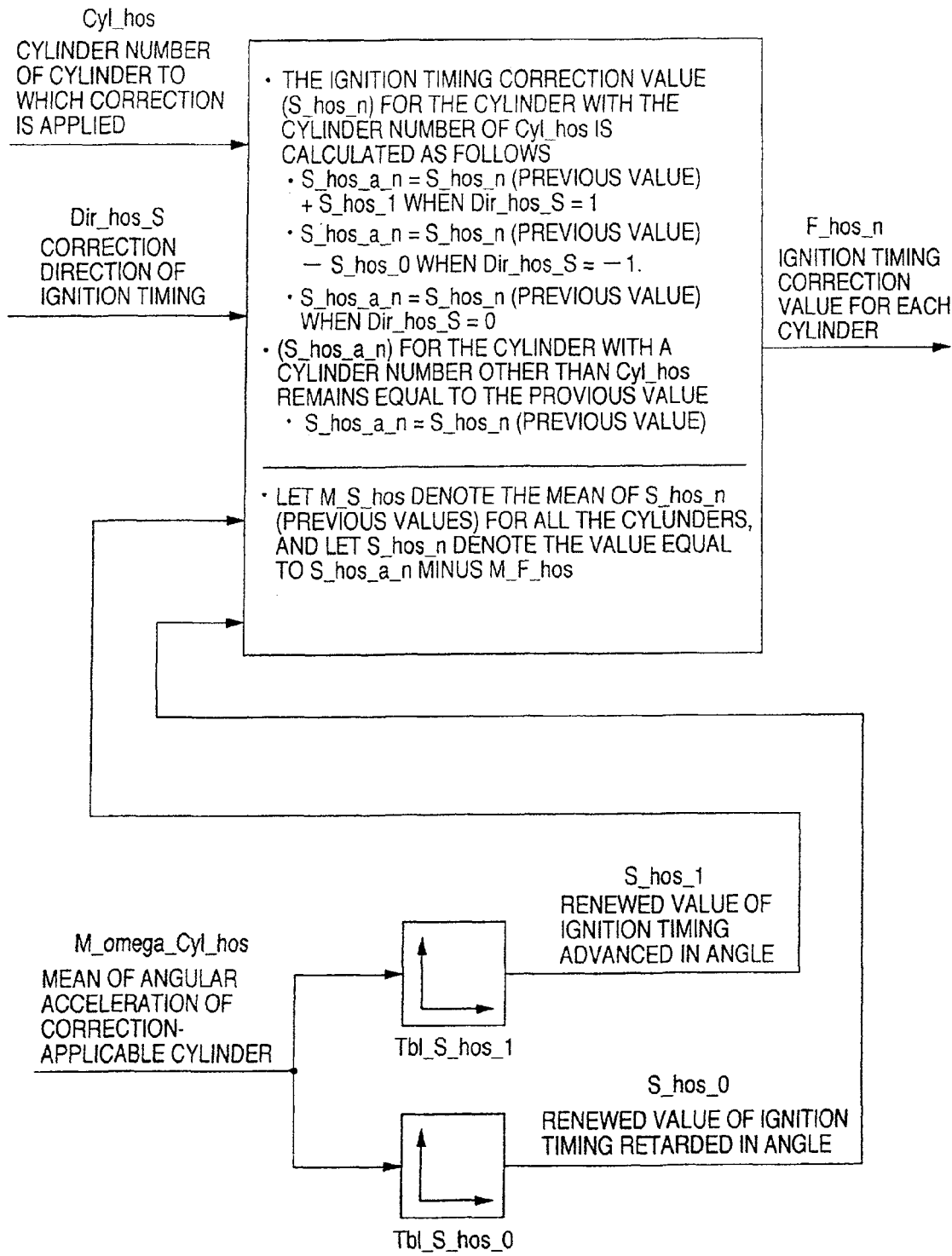
FIG. 43 shows in block diagram the per-cylinder ignition timing correction value calculation section used in the third embodiment of this invention.

This calculation section calculates the ignition timing correction values (S_hos_n) for each cylinder. The details are shown in FIG. 43: the ignition timing correction value (S_hos_n) for the cylinder with the cylinder number of Cyl_hos is calculated as follows.

$S\_hos\_a\_n = S\_hos\_n(\text{previous value}) + S\_hos\_1$ when $\text{Dir}\_hos\_S = 1$.

$S\_hos\_a\_n = S\_hos\_n(\text{previous value}) - S\_hos\_0$ when $\text{Dir}\_hos\_S = -1$.

$S\_hos\_a\_n = S\_hos\_n(\text{previous value})$ when $\text{Dir}\_hos\_S = 0$.

(S_hos_a_n) for the cylinder with a cylinder number other than Cyl_hos remains equal to the previous value, i.e. S_hos_a_n=S_hos_n (previous value).

Let M_S_hos denote the mean of S_hos_n (previous values) for all the cylinders, and let S_hos_n denote the value equal to S_hos_a_n minus M_F_hos. This process is equivalent to the correction of drift component.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A control apparatus for an engine provided with a plurality of cylinders, comprising:
 a unit for calculating a mean value of an angular acceleration with respect to each cylinder;
 a unit for calculating a dispersion of the angular acceleration with respect to each cylinder;
 a unit for estimating a torque and an air/fuel ratio, with respect to each cylinder on the basis of the mean value of the angular acceleration and the dispersion of the angular acceleration; and
 a unit for controlling an intake air amount and/or a fuel injection amount and/or an ignition timing, with respect to each cylinder on the basis of the estimated torque and the estimated air/fuel ratio;
 wherein the unit for estimating the torque and the air/fuel ratio of each cylinder specifies the cylinder of which the mean value of the angular acceleration is minimum, and judges that the torque of the specified cylinder is smaller than the torque of any other cylinders and that the air/fuel ratio of the specified cylinder is comparable with the air/fuel ratios of all the other cylinders, when the mean value of the angular acceleration of the specified cylinder is not greater than a predetermined value A1 and when the dispersion of the angular acceleration of the specified cylinder is smaller than a predetermined value B1;
 wherein, when it is judged that the torque of the specified cylinder is smaller than the torques of any other cylinder and the air/fuel ratio of the specified cylinder is comparable with the air/fuel ratios of all the other cylinders, the unit for controlling the intake air amount and/or the fuel injection amount and/or the ignition timing corrects the intake air amount of the specified cylinder to be increased until the mean value of the angular acceleration of the specific cylinder becomes greater than the predetermined value A1, and also corrects the fuel injection amount of the specific cylinder to also be increased so as to keep the air/fuel ratio of the specific cylinder in accordance with the increased intake air amount;
 wherein the unit for estimating the torque and the air/fuel ratio of each cylinder specifies the cylinder of which the dispersion of the angular acceleration is maximum, and judges that the torque of the specified cylinder is comparable with the torques of all the other cylinders and that the air/fuel ratio of the specified cylinder is lean as compared with the air/fuel ratios of all the other cylinders, when the mean value of the angular acceleration of the specified cylinder is greater than the predetermined value A1 and smaller than a predetermined value A2 and when the dispersion of the angular acceleration of the specified cylinder is not smaller than the predetermined value B1;
 wherein, when it is judged that the torque of the specified cylinder is comparable with the torques of all the other cylinders and that the air/fuel ratio of the specified cylinder is lean, the intake air amount of the specified cylinder is corrected to be decreased until the dispersion of the angular acceleration of the specific cylinder becomes smaller than the predetermined value B1.

2. The control apparatus as claimed in claim 1, wherein the unit for controlling the intake air amount and/or the fuel injection amount and/or the ignition timing, with respect to each cylinder on the basis of the estimated torque and the estimated air/fuel ratio in such a manner that differences among the torque and the air/fuel ratio, with respect to the respective cylinders, are minimized.

3. The engine control apparatus as claimed in claim 1, wherein the unit for estimating the torque and the air/fuel ratio of each cylinder specifies the cylinder of which the mean value of the angular acceleration is minimum, and judges that the torque of the specified cylinder is smaller than the torques of any other cylinders and that the air/fuel ratio of the specified cylinder is lean as compared with the air/fuel ratios of all the other cylinders, when the mean value of the angular acceleration of the specified cylinder is not greater than the predetermined value A1 and when the dispersion of the angular acceleration of the specified cylinder is not smaller than the predetermined value B1.

4. The control apparatus as claimed in claim 1, wherein the unit for estimating the torque and the air/fuel ratio of each cylinder specifies the cylinder of which the mean value of the angular acceleration is maximum, and judges that the torque of the specified cylinder is greater than the torques of any other cylinders and that the air/fuel ratio of the specified cylinder is comparable with or rich as compared with, the air/fuel ratios of all the other cylinders, when the mean value of the angular acceleration of the specified cylinder is not smaller than the predetermined value A2 and when the dispersion of the angular acceleration of the specified cylinder is smaller than the predetermined value B1.

5. The engine control apparatus as claimed in claim 1, wherein the predetermined value A1 is smaller than a mean value of the angular accelerations of all the cylinders during a predetermined period of time.

6. The control apparatus as claimed in claim 4, wherein the predetermined value A2 is greater than a mean value of the angular accelerations of all the cylinders during a predetermined period of time.

7. The engine control apparatus as claimed in a claim 1, wherein the predetermined value A1 is negative and the predetermined value A2 is positive, when the engine is idling.

8. The control apparatus as claimed in claim 1, wherein the dispersion of the angular acceleration of one of the cylinders is given as a standard deviation or a variance of the angular acceleration of that cylinder.

9. The control apparatus as claimed in claim 1, wherein the dispersion of the angular acceleration of one of the cylinders is calculated by applying a weighted moving average method to a square of an absolute value of the angular acceleration of that cylinder, or by applying the weighted moving averaging method to the absolute value of the angular acceleration of that cylinder.

10. The control apparatus as claimed in claim 3, wherein the fuel injection amount of the specific cylinder the torque of which is judged smaller than those of any other cylinders and the air/fuel ratio of which is judged lean as compared with those of all the other cylinders, is corrected and increased until the mean value of the angular acceleration of the specific cylinder becomes greater than the predetermined value A1 and until the dispersion of the angular acceleration of the specific cylinder becomes smaller than the predetermined value B1.

11. The control apparatus as claimed in claim 4, wherein the fuel injection amount of the specific cylinder the torque of which is judged greater than those of any other cylinders and the air/fuel ratio of which is judged comparable with or rich as compared with, those of all the other cylinders, is corrected and decreased until the mean value of the angular acceleration of the specific cylinder becomes smaller than the predetermined value A2.

12. The engine control apparatus as claimed in claim 1, wherein the ignition timing of the specific cylinder the torque of which is judged smaller than those of any other cylinders and the air/fuel ratio of which is judged comparable with those of all the other cylinders, is corrected and advanced in angle until the mean value of the angular acceleration of the specific cylinder becomes greater than the predetermined value A1.

13. The control apparatus as claimed in claim 4, wherein the ignition timing of the specific cylinder the torque of which is judged greater than those of any other cylinders and the air/fuel ratio of which is judged comparable with or rich as compared with, those of all the other cylinders, is corrected and retarded in angle until the mean value of the angular acceleration of the specific cylinder becomes smaller than the predetermined value A2.

14. The control apparatus as claimed in claim 1, wherein the specific cylinder with respect to which the mean value of the angular is minimum, is preferentially located; and when the mean value of the angular acceleration of the specific cylinder is not greater than the predetermined value A1 and when the dispersion of the angular acceleration of the specific cylinder is not smaller than the predetermined value B1, the fuel injection amount of the specific cylinder is preferentially corrected and increased until the mean value of the angular acceleration becomes greater than A1 and until the dispersion of the angular acceleration becomes smaller than B1.

15. The engine control apparatus as claimed in claim 1, wherein a mean value of the fuel injection amount correction values for all the cylinders is calculated, and a final fuel injection amount correction value for one of the cylinders is obtained by subtracting the mean value of the fuel injection amount correction values from the fuel injection amount correction value for that cylinder.

16. The control apparatus as claimed in claim 1, wherein a mean value of the intake air amount correction values for all the cylinders is calculated, and a final intake air amount correction value for one of the cylinders is obtained by subtracting the mean value of the intake air amount correction values from the intake air amount correction value for that cylinder.

* * * * *